(12) United States Patent
Minor et al.

(10) Patent No.: US 8,524,110 B2
(45) Date of Patent: *Sep. 3, 2013

(54) COMPOSITIONS COMPRISING A FLUOROOLEFIN

(75) Inventors: Barbara Haviland Minor, Elkton, MD (US); Velliyur Nott Mallikarjuna Rao, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,259

(22) Filed: Apr. 28, 2011

(65) Prior Publication Data

US 2011/0204279 A1 Aug. 25, 2011

Related U.S. Application Data

(60) Division of application No. 12/486,490, filed on Jun. 17, 2009, now Pat. No. 7,959,825, which is a division of application No. 11/486,791, filed on Jul. 13, 2006, now Pat. No. 7,569,170, which is a continuation-in-part of application No. 11/393,109, filed on Mar. 30, 2006, now abandoned, which is a continuation-in-part of application No. 11/369,227, filed on Mar. 2, 2006, now abandoned.

(60) Provisional application No. 60/732,769, filed on Nov. 1, 2005, provisional application No. 60/710,439, filed on Aug. 23, 2005, provisional application No. 60/658,543, filed on Mar. 4, 2005.

(51) Int. Cl.
*C09K 5/04* (2006.01)

(52) U.S. Cl.
USPC .................. 252/67; 264/53; 222/635

(58) Field of Classification Search
USPC .................. 252/67; 264/53; 222/635
See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,889,379 A | 6/1959 | Ruh et al. | |
| 2,917,480 A | 12/1959 | Bailey et al. | |
| 2,931,840 A | 4/1960 | Marquis | |
| 2,996,555 A | 8/1961 | Rausch | |
| 3,085,918 A | 4/1963 | Sherliker et al. | |
| 3,723,318 A | 3/1973 | Butler | |
| 3,884,828 A | 5/1975 | Butler | |
| 4,465,786 A | 8/1984 | Zimmer et al. | |
| 4,788,352 A | 11/1988 | Smutny | |
| 4,798,818 A | 1/1989 | Baizer et al. | |
| 5,516,946 A | 5/1996 | Jackson et al. | |
| 5,532,419 A | 7/1996 | Van Der Puy et al. | |
| 5,616,275 A | 4/1997 | Chisolm et al. | |
| 5,679,875 A | 10/1997 | Aoyama et al. | |
| 5,714,655 A | 2/1998 | Yamamoto et al. | |
| 5,736,063 A | 4/1998 | Richard et al. | |
| 5,744,052 A | 4/1998 | Bivens | |
| 5,788,886 A | 8/1998 | Minor et al. | |
| 5,969,198 A | 10/1999 | Thenappan et al. | |
| 6,053,008 A | 4/2000 | Arman et al. | |
| 6,065,305 A | 5/2000 | Arman et al. | |
| 6,076,372 A | 6/2000 | Acharya et al. | |
| 6,111,150 A | 8/2000 | Sakyu et al. | |
| 6,124,510 A | 9/2000 | Elsheikh et al. | |
| 6,176,102 B1 | 1/2001 | Novak et al. | |
| 6,300,378 B1 | 10/2001 | Tapscott | |
| 6,327,866 B1 | 12/2001 | Novak et al. | |
| 6,426,019 B1 | 7/2002 | Acharya et al. | |
| 6,503,417 B1 | 1/2003 | Bivens et al. | |
| 6,516,837 B2 | 2/2003 | Thomas et al. | |
| 6,526,764 B1 * | 3/2003 | Singh et al. | 62/84 |
| 6,783,691 B1 | 8/2004 | Bivens et al. | |
| 6,858,571 B2 | 2/2005 | Pham et al. | |
| 6,969,701 B2 | 11/2005 | Singh et al. | |
| 7,230,146 B2 | 6/2007 | Merkel et al. | |
| 7,279,451 B2 | 10/2007 | Singh et al. | |
| 8,163,196 B2 | 4/2012 | Basu et al. | |
| 2003/0034477 A1 | 2/2003 | Minor et al. | |
| 2003/0042463 A1 | 3/2003 | Arman et al. | |
| 2003/0209685 A1 | 11/2003 | Robin et al. | |
| 2004/0089839 A1 | 5/2004 | Thomas et al. | |
| 2004/0119047 A1 | 6/2004 | Singh et al. | |
| 2004/0127383 A1 | 7/2004 | Pham et al. | |
| 2004/0256594 A1 | 12/2004 | Singh et al. | |
| 2005/0077501 A1 | 4/2005 | Pham et al. | |
| 2005/0090698 A1 | 4/2005 | Merkel et al. | |
| 2005/0233923 A1 | 10/2005 | Singh et al. | |
| 2005/0233931 A1 | 10/2005 | Singh et al. | |
| 2005/0233932 A1 | 10/2005 | Singh et al. | |
| 2005/0233933 A1 | 10/2005 | Singh et al. | |
| 2005/0233934 A1 | 10/2005 | Singh et al. | |
| 2005/0241805 A1 | 11/2005 | Singh et al. | |
| 2005/0245421 A1 | 11/2005 | Singh et al. | |
| 2005/0247905 A1 | 11/2005 | Singh et al. | |
| 2006/0010872 A1 | 1/2006 | Singh et al. | |

(Continued)

FOREIGN PATENT DOCUMENTS

CN 1083474 C 4/2002
EP 0 398 147 B1 11/1994

(Continued)

OTHER PUBLICATIONS

M. S. Kim et al., "A Study to Determine the Existence of an Azeotropic R-22 'Drop-In' Substitute", NISTIR 5784, US Dept. of Commerce, Mar. 1996.*

(Continued)

*Primary Examiner* — John Hardee

(57) ABSTRACT

The present invention relates to compositions for use in refrigeration, air-conditioning, and heat pump systems wherein the composition comprises a fluoroolefin and at least one other component. The compositions of the present invention are useful in processes for producing cooling or heat, as heat transfer fluids, foam blowing agents, aerosol propellants, and fire suppression and fire extinguishing agents.

9 Claims, No Drawings

(56) References Cited

U.S. PATENT DOCUMENTS

| | | |
|---|---|---|
| 2006/0022166 A1 | 2/2006 | Wilson et al. |
| 2006/0025322 A1 | 2/2006 | Wilson et al. |
| 2006/0043330 A1 | 3/2006 | Wilson et al. |
| 2006/0043331 A1 | 3/2006 | Shankland et al. |
| 2006/0243944 A1 | 11/2006 | Minor et al. |
| 2007/0007488 A1 | 1/2007 | Singh et al. |
| 2007/0108403 A1 | 5/2007 | Sievert et al. |
| 2008/0230738 A1 | 9/2008 | Minor et al. |
| 2008/0314073 A1 | 12/2008 | Minor |
| 2009/0249809 A1 | 10/2009 | Minor et al. |
| 2009/0249864 A1 | 10/2009 | Minor et al. |
| 2009/0250650 A1 | 10/2009 | Minor et al. |
| 2009/0255285 A1 | 10/2009 | Minor et al. |
| 2009/0272931 A1 | 11/2009 | Minor et al. |
| 2009/0277194 A1 | 11/2009 | Minor et al. |
| 2009/0278072 A1 | 11/2009 | Minor et al. |

FOREIGN PATENT DOCUMENTS

| | | |
|---|---|---|
| EP | 0 802 252 A2 | 10/1997 |
| EP | 1 686 111 A1 | 8/2006 |
| GB | 950876 A | 2/1964 |
| JP | 4-110388 A | 4/1992 |
| JP | 10130685 A | 5/1998 |
| RU | 2 073 058 C1 | 2/1997 |
| WO | 99/48993 A1 | 9/1999 |
| WO | 2004/037752 A2 | 5/2004 |
| WO | 2004/037913 A2 | 5/2004 |
| WO | 2005/042663 A1 | 5/2005 |
| WO | 2005/103187 A1 | 11/2005 |
| WO | 2005/103188 A1 | 11/2005 |
| WO | 2005/103190 A1 | 11/2005 |
| WO | 2005/103191 A2 | 11/2005 |
| WO | 2005/103192 A1 | 11/2005 |
| WO | 2005108522 A1 | 11/2005 |
| WO | 2006/094303 A2 | 9/2006 |

OTHER PUBLICATIONS

M. S. Kim et al., "A Study to Determine the Existence of an Azeotropic 'Drop-In' Substitute", NISTIR 5784, Mar. 1996.*

Haszeldine, R. N., et al., "Free-Radical Additions to Unsaturated Systems. Part SVII. Reaction of Trifluoroiodomethane with Mixtures of Ethylene and Vinyl Fluoride and of Ethylene and Propene", Chemistry Department, University of Manchester Institute of Science and Technology, J. Chem. Soc. (C), 1970.

Henne, A. L., et al., "Fluorinated Derivatives of Propane and Propylene," Department of Chemistry,The Ohio State University, vol. 68, pp. 496-497 (Mar. 1946).

Knunyants, I. L., et al., "Reactions of Fluoro Olefins, Communication 13. Catalytic Hydrogenation of Perfluoro Olefins", Institute of Heteroorganic Compounds, Academy of Sciences of the USSR, Otdelenie Khimicheskikh Nauk, No. 8, pp. 1312-1317, (Aug. 1960).

Tarrant, P., et al., "Free Radical Additions Involving Fluorine Compounds. IV. The Addition of Dibromodifluoromethane to Some Fluoroolefins", Department of Chemistry, University of Florida, pp. 2783-2787 (May 20, 1955).

Vineyard, E. A., et al., "Selection of Ozone-Safe, Nonazeotropic Refrigerant Mixtures for Capacity Modulation in Residential Heat Pumps", ASHRAE Transactions, Technical and Symposium Papers, Chicago Technical Program, vol. 95, Part 1, pp. 34-46 (Jan. 29, 1989).

Saunders and Frisch, "Polyurethanes Chemistry & Technology," vol. XVI, Part I and Part II Technology, John Wiley and Sons, New York, NY (1962), pp. 193-201 and 219-223.

Downing, Ralph C., "Fluorocarbon Refrigerants Handbook," Prentice Hall, Chapter 3 (1988), pp. 17-34.

Office Action mailed Oct. 1, 2008, in U.S. Appl No. 11/486,791 (Granted U.S. Patent No. 7,569,170).

Office Action mailed Oct. 23, 2009, in U.S. Appl. No. 12/486,413 (Granted U.S. Patent No. 7,906037).

Office Action mailed Mar. 30, 2010, in U.S. Appl. No. 12/486,413 (Granted U.S. Patent No. 7,906037).

Office Action mailed Sep. 14, 2009, in U.S. Appl. No. 12/486,445 (Granted U.S. Patent No. 7,914,698).

Office Action mailed Feb. 2, 2010, in U.S. Appl. No. 12/486,445 (Granted U.S. Patent No. 7,914,698).

Office Action mailed Oct. 26, 2009, in U.S. Appl. No. 12/486,468 (Granted U.S. Patent No. 7,862,740).

Office Action mailed Mar. 31, 2010, in U.S. Appl. No. 12/486,468 (Granted U.S. Patent No. 7,862,740).

Office Action mailed Feb. 18, 2010, in U.S. Appl. No. 12/486,512 (Granted U.S. Appl. No. 7,862,741).

Office Action mailed Oct. 27, 2009 in co-pending U.S. Appl. No. 12/486,490.

Office Action mailed Feb. 17, 2010, U.S. Appl. No. 12/486,531 (Granted U.S. Patent No. 7,862,742).

Office Action mailed Oct. 27, 2009, U.S. Appl. No. 12/486,547 (Granted U.S. Patent No. 7,879,253).

Office Action mailed Mar. 29, 2010, U.S. Appl. No. 12/486,547 (Granted U.S. Patent No. 7,879,253).

Graham Morrison et al., Azeotropy in refrigerant mixtures, Rev. Int. Froid, 1993, vol. 16 No. 2.

Notification of Transmittal of the International Search Report (Date of Mailing: Mar. 19, 2007).

Written Opinion of the International Searching Authority (Date of Mailing Mar. 19, 2007).

* cited by examiner

COMPOSITIONS COMPRISING A FLUOROOLEFIN

CROSS REFERENCE(S) TO RELATED APPLICATION(S)

This application claims the priority benefit of and is a divisional of U. S. patent application Ser. No. 12/486,490, filed Jun. 17, 2009, now U.S. Pat. No. 7,959,825, which is a divisional of Ser. No. 11/486,791, filed Jul. 13, 2006, now granted as U.S. Pat. No. 7,569,170, which is a continuation-in-part of U.S. patent application Ser. No. 11/393,109, filed Mar. 30, 2006, now abandoned, which is a continuation-in-part of and claims the priority benefit of U.S. patent application Ser. No. 11/369,227, filed Mar. 2, 2006, now abandoned, which claims the priority benefit of U.S. Provisional Application 60/658,543, filed Mar. 4, 2005, and U.S. Provisional Application 60/710,439, filed Aug. 23, 2005, and U.S. Provisional Application 60/732,769, filed Nov. 1, 2005.

BACKGROUND OF THE INVENTION

1. Field of the Invention

The present invention relates to compositions for use in refrigeration, air-conditioning, and heat pump systems wherein the composition comprises a fluoroolefin and at least one other component. The compositions of the present invention are useful in processes for producing cooling or heat, as heat transfer fluids, foam blowing agents, aerosol propellants, and fire suppression and fire extinguishing agents.

2. Description of Related Art

The refrigeration industry has been working for the past few decades to find replacement refrigerants for the ozone depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. The new HFC refrigerants, HFC-134a being the most widely used at this time, have zero ozone depletion potential and thus are not affected by the current regulatory phase out as a result of the Montreal Protocol.

Further environmental regulations may ultimately cause global phase out of certain HFC refrigerants. Currently, the automobile industry is facing regulations relating to global warming potential for refrigerants used in mobile air-conditioning. Therefore, there is a great current need to identify new refrigerants with reduced global warming potential for the mobile air-conditioning market. Should the regulations be more broadly applied in the future, an even greater need will be felt for refrigerants that can be used in all areas of the refrigeration and air-conditioning industry.

Currently proposed replacement refrigerants for HFC-134a include HFC-152a, pure hydrocarbons such as butane or propane, or "natural" refrigerants such as $CO_2$. Many of these suggested replacements are toxic, flammable, and/or have low energy efficiency. Therefore, new alternative refrigerants are being sought.

The object of the present invention is to provide novel refrigerant compositions and heat transfer fluid compositions that provide unique characteristics to meet the demands of low or zero ozone depletion potential and lower global warming potential as compared to current refrigerants.

BRIEF SUMMARY OF THE INVENTION

The present invention relates to a composition comprising HFC-1225ye and at least one compound selected from the group consisting of: HFC-1234ze, HFC-1234yf, HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$, $NH_3$ and $CF_3I$.

The present invention further relates to a composition comprising HFC-1234ze and at least one compound selected from the group consisting of: HFC-1234yf, HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$, $NH_3$ and $CF_3I$. The present invention further relates to a composition comprising HFC-1234yf and at least one compound selected from the group consisting of: HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$ and $CF_3I$.

The present invention further relates to a composition comprising HFC-1234ye and at least one compound selected from the group consisting of: HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$ and $CF_3I$.

The present invention further relates to a composition comprising HFC-1243zf and at least one compound selected from the group consisting of: HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$ and $CF_3I$.

DETAILED DESCRIPTION OF THE INVENTION

The present invention relates to compositions comprising at least one fluoroolefin. The compositions of the present invention further comprise at least one additional component that may be a second fluoroolefin, hydrofluorocarbon (HFC), hydrocarbon, dimethyl ether, bis(trifluoromethyl)sulfide, $CF_3I$, or $CO_2$. The fluoroolefin compounds and other components of the present inventive compositions are listed in Table 1.

TABLE 1

| Compound | Chemical name | Chemical formula |
|---|---|---|
| HFC-1225ye | 1,2,3,3,3-pentafluoropropene | $CF_3CF=CHF$ |
| HFC-1234ze | 1,3,3,3-tetrafluoropropene | $CF_3CH=CHF$ |
| HFC-1234yf | 2,3,3,3-tetrafluoropropene | $CF_3CF=CH_2$ |
| HFC-1234ye | 1,2,3,3-tetrafluoropropene | $CHF_2CF=CHF$ |
| HFC-1243zf | 3,3,3-trifluoropropene | $CF_3CH=CH_2$ |
| HFC-32 | difluoromethane | $CH_2F_2$ |
| HFC-125 | pentafluoroethane | $CF_3CHF_2$ |
| HFC-134 | 1,1,2,2-tetrafluoroethane | $CHF_2CHF_2$ |
| HFC-134a | 1,1,1,2-tetrafluoroethane | $CH_2FCF_3$ |
| HFC-143a | 1,1,1-trifluoroethane | $CH_3CF_3$ |
| HFC-152a | 1,1-difluoroethane | $CHF_2CH_3$ |
| HFC-161 | fluoroethane | $CH_3CH_2F$ |
| HFC-227ea | 1,1,1,2,3,3,3-heptafluoropropane | $CF_3CHFCF_3$ |
| HFC-236ea | 1,1,1,2,3,3-hexafluoropropane | $CF_3CHFCHF_2$ |
| HFC-236fa | 1,1,1,3,3,3-hexafluoroethane | $CF_3CH_2CF_3$ |
| HFC-245fa | 1,1,1,3,3-pentafluoropropane | $CF_3CH_2CHF_2$ |

TABLE 1-continued

| Compound | Chemical name | Chemical formula |
|---|---|---|
| HFC-365mfc | 1,1,1,3,3-pentafluorobutane | $CF_3CH_2CH_2CHF_2$ |
| | Propane | $CH_3CH_2CH_3$ |
| | n-butane | $CH_3CH_2CH_2CH_3$ |
| i-butane | isobutane | $CH_3CH(CH_3)CH_3$ |
| | 2-methylbutane | $CH_3CH(CH_3)CH_2CH_3$ |
| | n-pentane | $CH_3CH_2CH_2CH_2CH_3$ |
| | cyclopentane | cyclo-$(CH_2)_5$— |
| DME | dimethylether | $CH_3OCH_3$ |
| $CO_2$ | carbon dioxide | $CO_2$ |
| $CF_3SCF_3$ | bis(trifluoromethyl)sulfide | $CF_3SCF_3$ |
| | iodotrifluoromethane | $CF_3I$ |
| $NH_3$ | Ammonia | $NH_3$ |

The individual components listed in Table 1 may be prepared by methods known in the art.

The fluoroolefin compounds used in the compositions of the present invention, HFC-1225ye, HFC-1234ze, and HFC-1234ye, may exist as different configurational isomers or stereoisomers. The present invention is intended to include all single configurational isomers, single stereoisomers or any combination or mixture thereof. For instance, 1,3,3,3-tetra-fluoropropene (HFC-1234ze) is meant to represent the cis-isomer, trans-isomer, or any combination or mixture of both isomers in any ratio. Another example is HFC-1225ye, by which is represented the cis-isomer, trans-isomer, or any combination or mixture of both isomers in any ratio. The compositions of the present invention contain primarily the cis or Z isomer of HFC-1225ye.

The compositions of the present invention include the following:

HFC-1225ye and at least one compound selected from the group consisting of HFC-1234ze, HFC-1234yf, HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$, $NH_3$, and $CF_3I$;

HFC-1234ze and at least one compound selected from the group consisting of HFC-1234yf, HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$ and $CF_3I$;

HFC-1234yf and at least one compound selected from the group consisting of HFC-1234ye, HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$, $NH_3$, and $CF_3I$;

HFC-1243zf and at least one compound selected from the group consisting of HFC-1234ye, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$ and $CF_3I$; and HFC-1234ye and at least one compound selected from the group consisting of HFC-1243zf, HFC-32, HFC-125, HFC-134, HFC-134a, HFC-143a, HFC-152a, HFC-161, HFC-227ea, HFC-236ea, HFC-236fa, HFC-245fa, HFC-365mfc, propane, n-butane, isobutane, 2-methylbutane, n-pentane, cyclopentane, dimethylether, $CF_3SCF_3$, $CO_2$ and $CF_3I$.

The compositions of the present invention may be generally useful when the fluoroolefin is present at about 1 weight percent to about 99 weight percent, preferably about 20 weight percent to about 99 weight percent, more preferably about 40 weight percent to about 99 weight percent and still more preferably 50 weight percent to about 99 weight percent.

The present invention further provides compositions as listed in Table 2.

TABLE 2

| | Concentration ranges (wt %) | | |
|---|---|---|---|
| Components | Preferred | More preferred | Most preferred |
| HFC-1225ye/HFC-32 | 1-99/99-1 | 30-99/70-1 | 90-99/10-1; 95/5/9/97/3 |
| HFC-1225ye/HFC-134a | 1-99/99-1 | 40-99/60-1 | 90/10 |
| HFC-1225ye/$CO_2$ | 0.1-99.9/99.9-0.1 | 70-99.7/30-0.3 | 99/1 |
| HFC-1225ye/ammonia | 0.1-99.9/0.1-99.9 | 40-99.9/0.1-60 | 90/10, 85/15, 80/20, 95/5 |
| HFC-1225ye/HFC-1234yf | 1-99/99-1 | 51-99/49-1 and 60-90/40-10 | 60/40, 51/49 |
| HFC-1225ye/HFC-152a/HFC-32 | 1-98/1-98/1-98 | 50-98/1-40/1-40 | 85/10/5 81/15/4 82/15/3 |
| HFC-1225ye/HFC-152a/$CO_2$ | 1-98/1-98/0.1-98 | 50-98/1-40/0.3-30 | 84/15/1 84/15.5/0.5 |
| HFC-1225ye/HFC-152a/propane | 1-98/1-98/1-98 | 50-98/1-40/1-20 | 85/13/2 |
| HFC-1225ye/HFC-152a/i-butane | 1-98/1-98/1-98 | 50-98/1-40/1-20 | 85/13/2 |
| HFC-1225ye/HFC-152a/DME | 1-98/1-98/1-98 | 50-98/1-40/1-20 | 85/13/2 |
| HFC-1225ye/HFC-152a/$CF_3I$ | 1-98/1-98/1-98 | 20-90/1-50/1-60 | |
| HFC-1225ye/HFC-134a/HFC-152a | 1-98/1-98/1-98 | 40-98/1-50/1-40 | 76/9/15 |
| HFC-1225ye/HFC-134a/HFC-32 | 1-98/1-98/1-98 | 1-80/1-80/1-80 | 88/9/3 |
| HFC-1225ye/HFC-134a/HFC-161 | 1-98/1-98/1-98 | 40-98/1-50/1-20 | 86/10/4 |
| HFC-1225ye/HFC-134a/$CO_2$ | 1-98/1-98/0.1-98 | 40-98/1-50/0.3-30 | 88.5/11/0.5 |
| HFC-1225ye/HFC-134a/propane | 1-98/1-98/1-98 | 40-98/1-50/1-20 | 87/10/3 |
| HFC-1225ye/HFC-134a/i-butane | 1-98/1-98/1-98 | 40-98/1-50/1-20 | 87/10/3 |
| HFC-1225ye/HFC-134a/DME | 1-98/1-98/1-98 | 40-98/1-50/1-20 | 87/10/3 |
| HFC-1225ye/HFC-134/HFC-32 | 1-98/1-98/1-98 | 40-98/1-50/1-40 | 88/9/3 |
| trans-HFC-1234ze/HFC-134a | 1-99/99-1 | 30-99/70-1 | 90/10 |
| trans-HFC-1234ze/HFC-32 | 1-99/99-1 | 40-99/60-1 | 95/5 |
| trans-HFC-1234ze/HFC-32/$CF_3I$ | 1-98/1-98/1-98 | 20-90/0.1-60/1-70 | |

TABLE 2-continued

| Components | Concentration ranges (wt %) Preferred | More preferred | Most preferred |
|---|---|---|---|
| trans-HFC-1234ze/HFC-152a | 1-99/99-1 | 40-99/60-1 | 80/20 |
| trans-HFC-1234ze/HFC-125 | 1-99/99-1 | 30-99/70-1 | |
| HFC-1234yf/HFC-134a | 1-99/99-1 | 30-99/70-1 | 90/10 |
| HFC-1234yf/HFC-32 | 1-99/99-1 | 40-99/60-1 | 95/5 |
| HFC-1234yf/HFC-125 | 0.1-99/99-0.1 | 40-99/1-60 | |
| HFC-1234yf/HFC-152a | 1-99/99-1 | 40-99/60-1 | 80/20 |
| HFC-1225ye/HFC-134a/HFC-152a/HFC-32 | 1-97/1-97/1-97/0.1-97 | 20-97/1-80/1-50/0.1-50 | 74/8/17/1 |
| HFC-1225ye/HFC-1234yf/HFC-134a | 1-98/1-98/0.1-98 | 10-90/10-90/0.1-50 | 70/20/10 and 20/70/10 |
| HFC-1225ye/HFC-1234yf/HFC-32 | 1-98/1-98/0.1-98 | 10-90/5-90/0.1-50 | 25/73/2, 75/23/2, 49/49/2, 85/10/5, 90/5/5 |
| HFC-1225ye/HFC-1234yf/HFC-32/CF$_3$I | 1-97/1-97/0.1-97/1-97 | 10-80/10-80/1-60/1-60 | |
| HFC-1225ye/HFC-1234yf/HFC-152a | 1-98/1-98/0.1-98 | 10-90/10-90/0.1-50 | 70/25/5 and 25/70/5 |
| HFC-1225ye/HFC-1234yf/HFC-125 | 1-98/1-98/0.1-98 | 10-90/10-90/0.1-50 | 25/71/4, 75/21/4, 75/24/1 and 25/74/1 |
| HFC-1225ye/HFC-1234yf/CF$_3$I | 1-98/1-98/1-98 | 9-90/9-90/1-60 | 40/40/20 and 45/45/10 |
| HFC-32/HFC-125/HFC-1225ye | 0.1-98/0.1-98/0.1-98 | 5-70/5-70/5-70 | 30/30/40 and 23/25/52 |
| HFC-32/HFC-125/trans-HFC-1234ze | 0.1-98/0.1-98/0.1-98 | 5-70/5-70/5-70 | 30/50/20 and 23/25/52 |
| HFC-32/HFC-125/HFC-1234yf | 0.1-98/0.1-98/0.1-98 | 5-70/5-70/5-70 | 40/50/10, 23/25/52, 15/45/40, and 10/60/30 |
| HFC-32/HFC-134a/HFC-1225ye/CF$_3$I | 1-97/1-97/1-97/1-97 | 1-60/1-60/1-60/1-60 | |
| HFC-32/HFC-134a/HFC-1225ye/HFC-1234yf/CF$_3$I | 1-96/1-96/1-96/1-96/1-96 | 1-50/1-50/1-50/1-50/1-50 | |
| HFC-32/HFC-125/HFC-134a/HFC-1225ye/CF$_3$I | 1-96/1-96/1-96/1-96/1-96 | 1-50/1-50/1-50/1-50/1-50 | |
| HFC-125/HFC-1225ye/n-butane | 0.1-98/0.1-98/0.1-98 | 5-70/5-70/1-20 | 65/32/3 and 85.1/11.5/3.4 |
| HFC-32/NH$_3$/HFC-1225ye | 1-98/1-98/1-98 | 1-60/10-60/10-90 | |
| HFC-32/NH$_3$/HFC-1225ye/CF$_3$I | 1-97/1-97/1-97/1-97 | 1-60/1-60/10-80/1-60 | |
| HFC-32/NH$_3$/HFC-1234yf/CF$_3$I | 1-97/1-97/1-97/1-97 | 1-60/1-60/10-80/5-80 | |
| HFC-125/trans-HFC-1234ze/n-butane | 0.1-98/0.1-98/0.1-98 | 5-70/5-70/1-20 | 66/32/2 and 86.1/11.5/2.4 |
| HFC-125/HFC-1234yf/n-butane | 0.1-98/0.1-98/0.1-98 | 5-70/5-70/1-20 | 67/32/1 and 87.1/11.5/1.4 |
| HFC-125/HFC-1225ye/isobutane | 0.1-98/0.1-98/0.1-98 | 5-70/5-70/1-20 | 85.1/11.5/3.4 and 65/32/3 |
| HFC-1225ye/HFC-125/ammonia | 0.1-98/0.1-98/0.1-98 | 20-98/1-60/0.1-40 | |
| HFC-1225ye/HFC-32/HFC-125/ammonia | 0.1-97/0.1-97/0.1-97/0.1-97 | 20-97/1-60/1-60/0.1-40 | |
| HFC-125/trans-HFC-1234ze/isobutane | 0.1-98/0.1-98/0.1-98 | 5-70/5-70/1-20 | 86.1/11.5/2.4 and 66/32/2 |
| HFC-125/HFC-1234yf/isobutane | 0.1-98/0.1-98/0.1-98 | 5-70/5-70/1-20 and 80-98/1-19/1-10 | 87.1/11.5/1.4 and 67/32/1 |
| HFC-1234yf/HFC-32/HFC-143a | 1-50/1-98/1-98 | 15-50/20-80/5-60 | |
| HFC-1234yf/HFC-32/isobutane | 1-40/59-98/1-30 | 10-40/59-90/1-10 | |
| HFC-1234yf/HFC-125/HFC-143a | 1-60/1-98/1-98 | 10-60/20-70/20-70 | |
| HFC-1234yf/HFC-125/isobutane | 1-40/59-98/1-20 | 10-40/59-90/1-10 | |
| HFC-1234yf/HFC-125/CF$_3$I | 1-98/0.1-98/1-98 | 10-80/1-60/1-60 | |
| HFC-1234yf/HFC-134/propane | 1-80/1-70/19-90 | 20-80/10-70/19-50 | |
| HFC-1234yf/HFC-134/DME | 1-70/1-98/29-98 | 20-70/10-70/29-50 | |
| HFC-1234yf/HFC-134a/propane | 1-80/1-80/19-98 | 10-80/10-80/19-50 | |
| HFC-1234yf/HFC-134a/n-butane | 1-98/1-98/1-30 | 10-80/10-80/1-20 | |
| HFC-1234yf/HFC-134a/isobutane | 1-98/1-98/1-30 | 10-80/10-80/1-20 | |
| HFC-1234yf/HFC-134a/DME | 1-98/1-98/1-40 | 10-80/10-80/1-20 | |
| HFC-1234yf/HFC-134a/CF$_3$I | 1-98/1-98/1-98 | 10-80/1-60/1-60 | |
| HFC-1234yf/HFC-143a/propane | 1-80/1-80/1-98 | 10-80/10-80/1-50 | |
| HFC-1234yf/HFC-143a/DME | 1-40/59-98/1-20 | 5-40/59-90/1-10 | |
| HFC-1234yf/HFC-152a/n-butane | 1-98/1-98/1-30 | 10-80/10-80/1-20 | |
| HFC-1234yf/HFC-152a/isobutane | 1-98/1-90/1-40 | 10-80/10-80/1-20 | |
| HFC-1234yf/HFC-152a/DME | 1-70/1-98/1-98 | 10-70/10-80/1-20 | |
| HFC-1234yf/HFC-152a/CF$_3$I | 1-98/1-98/1-98 | 10-80/1-60/1-60 | |

TABLE 2-continued

| Components | Concentration ranges (wt %) | | |
|---|---|---|---|
| | Preferred | More preferred | Most preferred |
| HFC-1234yf/HFC-227ea/propane | 1-80/1-70/29-98 | 10-60/10-60/29-50 | |
| HFC-1234yf/HFC-227ea/n-butane | 40-98/1-59/1-20 | 50-98/10-49/1-10 | |
| HFC-1234yf/HFC-227ea/isobutane | 30-98/1-69/1-30 | 50-98/10-49/1-10 | |
| HFC-1234yf/HFC-227ea/DME | 1-98/1-80/1-98 | 10-80/10-80/1-20 | |
| HFC-1234yf/n-butane/DME | 1-98/1-40/1-98 | 10-80/10-40/1-20 | |
| HFC-1234yf/isobutane/DME | 1-98/1-50/1-98 | 10-90/1-40/1-20 | |
| HFC-1234yf/DME/$CF_3I$ | 1-98/1-98/1-98 | 10-80/1-20/10-80 | |
| HFC-1234yf/DME/$CF_3SCF_3$ | 1-98/1-40/1-98 | 10-80/1-20/10-70 | |
| HFC-1225ye/trans-HFC-1234ze/HFC-134 | 1-98/1-98/1-98 | 10-80/10-80/10-80 | |
| HFC-1225ye/trans-HFC-1234ze/HFC-227ea | 1-98/1-98/1-98 | 10-80/10-80/10-80 | |
| HFC-1225ye/trans-HFC-1234ze/propane | 1-60/1-60/39-98 | 10-60/10-60/39-80 | |
| HFC-1225ye/trans-HFC-1234ze/n-butane | 1-98/1-98/1-30 | 10-80/10-80/1-20 | |
| HFC-1225ye/trans-HFC-1234ze/DME | 1-98/1-98/1-98 | 10-80/10-80/1-30 | |
| HFC-1225ye/trans-HFC-1234ze/$CF_3SCF_3$ | 1-98/1-98/1-98 | 10-80/10-80/10-80 | |
| HFC-1225ye/HFC-1243zf/HFC-134 | 1-98/1-98/1-98 | 10-80/10-80/10-80 | |
| HFC-1225ye/HFC-1243zf/n-butane | 1-98/1-98/1-30 | 10-80/10-80/1-20 | |
| HFC-1225ye/HFC-1243zf/isobutane | 1-98/1-98/1-40 | 10-80/10-80/1-30 | |
| HFC-1225ye/HFC-1243zf/DME | 1-98/1-98/1-98 | 10-80/10-80/1-30 | |
| HFC-1225ye/HFC-1243zf/$CF_3I$ | 1-98/1-98/1-98 | 10-80/10-80/10-80 | |
| HFC-1225ye/HFC-134/HFC-152a | 1-98/1-98/1-98 | 10-80/10-80/1-50 | |
| HFC-1225ye/HFC-134/HFC-227ea | 1-98/1-98/1-98 | 10-80/10-80/10-80 | |
| HFC-1225ye/HFC-134/n-butane | 1-98/1-90/1-40 | 10-80/10-80/1-30 | |
| HFC-1225ye/HFC-134/isobutane | 1-98/1-90/1-40 | 10-80/10-80/1-30 | |
| HFC-1225ye/HFC-134/DME | 1-98/1-98/1-40 | 10-80/10-80/1-30 | |
| HFC-1225ye/HFC-227ea/DME | 40-98/1-59/1-30 | 50-98/1-49/1-20 | |
| HFC-1225ye/n-butane/DME | 1-98/1-30/1-98 | 60-98/1-20/1-20 | |
| HFC-1225ye/n-butane/$CF_3SCF_3$ | 1-98/1-20/1-98 | 10-80/1-10/10-80 | |
| HFC-1225ye/isobutane/DME | 1-98/1-60/1-98 | 40-90/1-30/1-30 | |
| HFC-1225ye/isobutane/$CF_3I$ | 1-98/1-40/1-98 | 10-80/1-30/10-80 | |
| trans-HFC-1234ze/HFC-1243zf/HFC-227ea | 1-98/1-98/1-98 | 10-80/10-80/10-80 | |
| trans-HFC-1234ze/HFC-1243zf/n-butane | 1-98/1-98/1-30 | 10-80/10-80/1-20 | |
| trans-HFC-1234ze/HFC-1243zf/isobutane | 1-98/1-98/1-40 | 10-80/10-80/1-30 | |
| trans-HFC-1234ze/HFC-1243zf/DME | 1-98/1-98/1-98 | 10-80/10-80/1-40 | |
| trans-HFC-1234ze/HFC-32/CF3I | 1-98/1-98/1-98 | 10-80/1-70/1-80 | |
| trans-HFC-1234ze/HFC-134/HFC-152a | 1-98/1-98/1-98 | 10-80/10-80/1-50 | |
| trans-HFC-1234ze/HFC-134/HFC-227ea | 1-98/1-98/1-98 | 10-80/10-80/10-80 | |
| trans-HFC-1234ze/HFC-134/DME | 1-98/1-98/1-40 | 10-80/10-80/1-30 | |
| trans-HFC-1234ze/HFC-134a/HFC-152a | 1-98/1-98/1-98 | 10-80/10-80/1-50 | |
| trans-HFC-1234ze/HFC-152a/n-butane | 1-98/1-98/1-50 | 10-80/10-80/1-30 | |
| trans-HFC-1234ze/HFC-152a/DME | 1-98/1-98/1-98 | 20-90/1-50/1-30 | |
| trans-HFC-1234ze/HFC-227ea/n-butane | 1-98/1-98/1-40 | 10-80/10-80/1-30 | |
| trans-HFC-1234ze/n-butane/DME | 1-98/1-40/1-98 | 10-90/1-30/1-30 | |
| trans-HFC-1234ze/n-butane/$CF_3I$ | 1-98/1-30/1-98 | 10-80/1-20/10-80 | |
| trans-HFC-1234ze/isobutane/DME | 1-98/1-60/1-98 | 10-90/1-30/1-30 | |
| trans-HFC-1234ze/isobutane/$CF_3I$ | 1-98/1-40/1-98 | 10-80/1-20/10-80 | |
| trans-HFC-1234ze/isobutane/$CF_3SCF_3$ | 1-98/1-40/1-98 | 10-80/1-20/10-80 | |
| HFC-1243zf/HFC-134/HFC-227ea | 1-98/1-98/1-98 | 10-80/10-80/10-80 | |
| HFC-1243zf/HFC-134/n-butane | 1-98/1-98/1-40 | 10-80/10-80/1-30 | |
| HFC-1243zf/HFC-134/DME | 1-98/1-98/1-98 | 10-80/10-80/1-30 | |
| HFC-1243zf/HFC-134/$CF_3I$ | 1-98/1-98/1-98 | 10-80/10-80/10-80 | |

TABLE 2-continued

| Components | Concentration ranges (wt %) | | |
|---|---|---|---|
| | Preferred | More preferred | Most preferred |
| HFC-1243zf/HFC-134a/HFC-152a | 1-98/1-98/1-98 | 10-80/10-80/1-50 | |
| HFC-1243zf/HFC-134a/n-butane | 1-98/1-98/1-40 | 10-80/10-80/1-30 | |
| HFC-1243zf/HFC-152a/propane | 1-70/1-70/29-98 | 10-70/1-50/29-40 | |
| HFC-1243zf/HFC-152a/n-butane | 1-98/1-98/1-30 | 10-80/1-80/1-20 | |
| HFC-1243zf/HFC-152a/isobutane | 1-98/1-98/1-40 | 10-80/1-80/1-30 | |
| HFC-1243zf/HFC-152a/DME | 1-98/1-98/1-98 | 10-80/1-80/1-30 | |
| HFC-1243zf/HFC-227ea/n-butane | 1-98/1-98/1-40 | 10-80/1-80/1-30 | |
| HFC-1243zf/HFC-227ea/isobutane | 1-98/1-90/1-50 | 10-80/1-80/1-30 | |
| HFC-1243zf/HFC-227ea/DME | 1-98/1-80/1-90 | 10-80/1-80/1-30 | |
| HFC-1243zf/n-butane/DME | 1-98/1-40/1-98 | 10-90/1-30/1-30 | |
| HFC-1243zf/isobutane/DME | 1-98/1-60/1-98 | 10-90/1-30/1-30 | |
| HFC-1243zf/isobutane/$CF_3I$ | 1-98/1-40/1-98 | 10-80/1-30/10-80 | |
| HFC-1243zf/DME/$CF_3SCF_3$ | 1-98/1-40/1-90 | 10-80/1-30/10-80 | |
| HFC-1225ye/HFC-32/$CF_3I$ | 1-98/1-98/1-98 | 5-80/1-70/1-80 | |
| HFC-1225ye/HFC-1234yf/HFC-32/HFC-125 | 1-97/1-97/1-97/1-97 | 1-80/1-70/5-70/5-70 | |
| HFC-1225ye/HFC-1234yf/HFC-32/HFC-134a | 1-97/1-97/1-97/1-97 | 5-80/5-70/5-70/5-70 | |
| HFC-1225ye/HFC-1234yf/HFC-32/HFC-125/$CF_3I$ | 1-96/1-96/1-96/1-96/1-96 | 1-70/1-60/1-70/1-60/1-60 | |
| HFC-1225ye/HFC-32/HFC-125/HFC-152a | 1-97/1-97/1-97/1-97 | 10-80/5-70/5-70/5-70 | |
| HFC-1225ye/HFC-32/HFC-125/isobutane | 1-97/1-97/1-97/1-97 | 5-70/5-70/5-70/1-30 | |
| HFC-1225ye/HFC-32/HFC-125/propane | 1-97/1-97/1-97/1-50 | 5-70/5-70/5-70/1-30 | |
| HFC-1225ye/HFC-32/HFC-125/DME | 1-97/1-97/1-97/1-50 | 5-70/5-70/5-70/1-30 | |
| HFC-1225ye/HFC-32/$CF_3I$/DME | 1-97/1-97/1-97/1-50 | 5-70/5-70/5-70/1-30 | |
| HFC-1225ye/HFC-32/HFC-125/$CF_3I$ | 1-97/1-97/1-97/1-97 | 10-80/5-70/5-70/1-80 | |
| HFC-1234yf/HFC-32/$CF_3I$ | 1-98/1-98/1-98 | 10-80/1-70/1-80 | |
| HFC-1234yf/HFC-32/HFC-134a/$CF_3I$ | 1-97/1-97/1-97/1-97 | 5-70/5-80/1-70/5-70 | |
| HFC-1234yf/HFC-32/HFC-125 | 1-98/1-98/1-98 | 10-80/5-80/10-80 | |
| HFC-1234yf/HFC-32/HFC-125/CF3I | 1-97/1-97/1-97/1-97 | 10-80/5-70/10-80/5-80 | |

The most preferred compositions of the present invention listed in Table 2 are generally expected to maintain the desired properties and functionality when the components are present in the concentrations as listed +/−2 weight percent. The compositions containing $CO_2$ would be expected to maintain the desired properties and functionality when the $CO_2$ was present at the listed concentration +/−0.2 weight percent.

The compositions of the present invention may be azeotropic or near-azeotropic compositions. By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation, which may reduce efficiency of the system. Additionally, an azeotropic composition will not fractionate upon leakage from a refrigeration or air conditioning system. In the situation where one component of a mixture is flammable, fractionation during leakage could lead to a flammable composition either within the system or outside of the system.

A near-azeotropic composition (also commonly referred to as an "azeotrope-like composition") is a substantially constant boiling liquid admixture of two or more substances that behaves essentially as a single substance. One way to characterize a near-azeotropic composition is that the vapor produced by partial evaporation or distillation of the liquid has substantially the same composition as the liquid from which it was evaporated or distilled, that is, the admixture distills/refluxes without substantial composition change. Another way to characterize a near-azeotropic composition is that the bubble point vapor pressure and the dew point vapor pressure of the composition at a particular temperature are substantially the same. Herein, a composition is near-azeotropic if, after 50 weight percent of the composition is removed, such as by evaporation or boiling off, the difference in vapor pressure between the original composition and the composition remaining after 50 weight percent of the original composition has been removed is less than about 10 percent.

Azeotropic compositions of the present invention at a specified temperature are shown in Table 3.

TABLE 3

| Component A | Component B | Wt % A | Wt % B | Psia | kPa | T (C.) |
|---|---|---|---|---|---|---|
| HFC-1234yf | HFC-32 | 7.4 | 92.6 | 49.2 | 339 | −25 |
| HFC-1234yf | HFC-125 | 10.9 | 89.1 | 40.7 | 281 | −25 |
| HFC-1234yf | HFC-134a | 70.4 | 29.6 | 18.4 | 127 | −25 |
| HFC-1234yf | HFC-152a | 91.0 | 9.0 | 17.9 | 123 | −25 |
| HFC-1234yf | HFC-143a | 17.3 | 82.7 | 39.5 | 272 | −25 |
| HFC-1234yf | HFC-227ea | 84.6 | 15.4 | 18.0 | 124 | −25 |
| HFC-1234yf | propane | 51.5 | 48.5 | 33.5 | 231 | −25 |
| HFC-1234yf | n-butane | 98.1 | 1.9 | 17.9 | 123 | −25 |
| HFC-1234yf | isobutane | 88.1 | 11.9 | 19.0 | 131 | −25 |
| HFC-1234yf | DME | 53.5 | 46.5 | 13.1 | 90 | −25 |
| HFC-1225ye | trans-HFC-1234ze | 63.0 | 37.0 | 11.7 | 81 | −25 |
| HFC-1225ye | HFC-1243zf | 40.0 | 60.0 | 13.6 | 94 | −25 |
| HFC-1225ye | HFC-134 | 52.2 | 47.8 | 12.8 | 88 | −25 |
| HFC-1225ye | HFC-152a | 7.3 | 92.7 | 14.5 | 100 | −25 |
| HFC-1225ye | propane | 29.7 | 70.3 | 30.3 | 209 | −25 |
| HFC-1225ye | n-butane | 89.5 | 10.5 | 12.3 | 85 | −25 |
| HFC-1225ye | isobutane | 79.3 | 20.7 | 13.9 | 96 | −25 |
| HFC-1225ye | DME | 82.1 | 17.9 | 10.8 | 74 | −25 |
| HFC-1225ye | $CF_3SCF_3$ | 37.0 | 63.0 | 12.4 | 85 | −25 |
| trans-HFC-1234ze | HFC-1243zf | 17.0 | 83.0 | 13.0 | 90 | −25 |
| trans-HFC-1234ze | HFC-134 | 45.7 | 54.3 | 12.5 | 86 | −25 |
| trans-HFC-1234ze | HFC-134a | 9.5 | 90.5 | 15.5 | 107 | −25 |
| trans-HFC-1234ze | HFC-152a | 21.6 | 78.4 | 14.6 | 101 | −25 |
| trans-HFC-1234ze | HFC-227ea | 59.2 | 40.8 | 11.7 | 81 | −25 |
| trans-HFC-1234ze | propane | 28.5 | 71.5 | 30.3 | 209 | −25 |
| trans-HFC-1234ze | n-butane | 88.6 | 11.4 | 11.9 | 82 | −25 |
| trans-HFC-1234ze | isobutane | 77.9 | 22.1 | 12.9 | 89 | −25 |
| trans-HFC-1234ze | DME | 84.1 | 15.9 | 10.8 | 74 | −25 |
| trans-HFC-1234ze | $CF_3SCF_3$ | 34.3 | 65.7 | 12.7 | 88 | −25 |
| HFC-1243zf | HFC-134 | 63.0 | 37.0 | 13.5 | 93 | −25 |
| HFC-1243zf | HFC-134A | 25.1 | 74.9 | 15.9 | 110 | −25 |
| HFC-1243zf | HFC-152A | 40.7 | 59.3 | 15.2 | 104 | −25 |
| HFC-1243zf | HFC-227ea | 78.5 | 21.5 | 13.1 | 90 | −25 |
| HFC-1243zf | propane | 32.8 | 67.2 | 31.0 | 213 | −25 |
| HFC-1243zf | n-butane | 90.3 | 9.7 | 13.5 | 93 | −25 |
| HFC-1243zf | isobutane | 80.7 | 19.3 | 14.3 | 98 | −25 |
| HFC-1243zf | DME | 72.7 | 27.3 | 12.0 | 83 | −25 |
| cis-HFC-1234ze | HFC-236ea | 20.9 | 79.1 | 30.3 | 209 | 25 |
| cis-HFC-1234ze | HFC-245fa | 76.2 | 23.8 | 26.1 | 180 | 25 |
| cis-HFC-1234ze | n-butane | 51.4 | 48.6 | 6.08 | 42 | 25 |
| cis-HFC-1234ze | isobutane | 26.2 | 73.8 | 8.74 | 60 | 25 |
| cis-HFC-1234ze | 2-methylbutane | 86.6 | 13.4 | 27.2 | 188 | 25 |
| cis-HFC-1234ze | n-pentane | 92.9 | 7.1 | 26.2 | 181 | 25 |
| HFC-1234ye | HFC-236ea | 24.0 | 76.0 | 3.35 | 23.1 | −25 |
| HFC-1234ye | HFC-245fa | 42.5 | 57.5 | 22.8 | 157 | 25 |
| HFC-1234ye | n-butane | 41.2 | 58.8 | 38.0 | 262 | 25 |
| HFC-1234ye | isobutane | 16.4 | 83.6 | 50.9 | 351 | 25 |
| HFC-1234ye | 2-methylbutane | 80.3 | 19.7 | 23.1 | 159 | 25 |
| HFC-1234ye | n-pentane | 87.7 | 12.3 | 21.8 | 150 | 25 |

Additionally, ternary azeotropes composition have been found as listed in Table 4.

TABLE 4

| Component A | Component B | Component C | Wt % A | Wt % B | Wt % C | Pres (psi) | Pres (kPa) | Temp (° C.) |
|---|---|---|---|---|---|---|---|---|
| HFC-1234yf | HFC-32 | HFC-143A | 3.9 | 74.3 | 21.8 | 50.02 | 345 | −25 |
| HFC-1234yf | HFC-32 | isobutane | 1.1 | 92.1 | 6.8 | 50.05 | 345 | −25 |
| HFC-1234yf | HFC-125 | HFC-143A | 14.4 | 43.5 | 42.1 | 38.62 | 266 | −25 |
| HFC-1234yf | HFC-125 | isobutane | 9.7 | 89.1 | 1.2 | 40.81 | 281 | −25 |
| HFC-1234yf | HFC-134 | propane | 4.3 | 39.1 | 56.7 | 34.30 | 236 | −25 |
| HFC-1234yf | HFC-134 | DME | 15.2 | 67.0 | 17.8 | 10.38 | 71.6 | −25 |
| HFC-1234yf | HFC-134a | propane | 24.5 | 31.1 | 44.5 | 34.01 | 234 | −25 |
| HFC-1234yf | HFC-134a | n-butane | 60.3 | 35.2 | 4.5 | 18.58 | 128 | −25 |
| HFC-1234yf | HFC-134a | isobutane | 48.6 | 37.2 | 14.3 | 19.86 | 137 | −25 |
| HFC-1234yf | HFC-134a | DME | 24.0 | 67.9 | 8.1 | 17.21 | 119 | −25 |
| HFC-1234yf | HFC-143a | propane | 17.7 | 71.0 | 11.3 | 40.42 | 279 | −25 |
| HFC-1234yf | HFC-143a | DME | 5.7 | 93.0 | 1.3 | 39.08 | 269 | −25 |
| HFC-1234yf | HFC-152a | n-butane | 86.6 | 10.8 | 2.7 | 17.97 | 124 | −25 |
| HFC-1234yf | HFC-152a | isobutane | 75.3 | 11.8 | 12.9 | 19.12 | 132 | −25 |
| HFC-1234yf | HFC-152a | DME | 24.6 | 43.3 | 32.1 | 11.78 | 81.2 | −25 |
| HFC-1234yf | HFC-227ea | propane | 35.6 | 17.8 | 46.7 | 33.84 | 233 | −25 |
| HFC-1234yf | HFC-227ea | n-butane | 81.9 | 16.0 | 2.1 | 18.07 | 125 | −25 |
| HFC-1234yf | HFC-227ea | isobutane | 70.2 | 18.2 | 11.6 | 19.27 | 133 | −25 |
| HFC-1234yf | HFC-227ea | DME | 28.3 | 55.6 | 16.1 | 15.02 | 104 | −25 |
| HFC-1234yf | n-butane | DME | 48.9 | 4.6 | 46.4 | 13.15 | 90.7 | −25 |
| HFC-1234yf | isobutane | DME | 31.2 | 26.2 | 42.6 | 14.19 | 97.8 | −25 |
| HFC-1234yf | DME | $CF_3I$ | 16.3 | 10.0 | 73.7 | 15.65 | 108 | −25 |
| HFC-1234yf | DME | $CF_3SCF_3$ | 34.3 | 10.5 | 55.2 | 14.57 | 100 | −25 |
| HFC-1225ye | trans-HFC-1234ze | HFC-134 | 47.4 | 5.6 | 47.0 | 12.77 | 88.0 | −25 |
| HFC-1225ye | trans-HFC-1234ze | HFC-227ea | 28.4 | 52.6 | 19.0 | 11.63 | 80.2 | −25 |
| HFC-1225ye | trans-HFC-1234ze | propane | 20.9 | 9.1 | 70.0 | 30.36 | 209 | −25 |
| HFC-1225ye | trans-HFC-1234ze | n-butane | 65.8 | 24.1 | 10.1 | 12.39 | 85.4 | −25 |
| HFC-1225ye | trans-HFC-1234ze | DME | 41.0 | 40.1 | 18.9 | 10.98 | 75.7 | −25 |
| HFC-1225ye | trans-HFC-1234ze | $CF_3SCF_3$ | 1.0 | 33.7 | 65.2 | 12.66 | 87.3 | −25 |
| HFC-1225ye | HFC-1243zf | HFC-134 | 28.7 | 47.3 | 24.1 | 13.80 | 95.1 | −25 |
| HFC-1225ye | HFC-1243zf | n-butane | 37.5 | 55.0 | 7.5 | 13.95 | 96.2 | −25 |
| HFC-1225ye | HFC-1243zf | isobutane | 40.5 | 43.2 | 16.3 | 14.83 | 102 | −25 |
| HFC-1225ye | HFC-1243zf | DME | 19.1 | 51.0 | 29.9 | 12.15 | 83.8 | −25 |
| HFC-1225ye | HFC-1243zf | $CF_3I$ | 10.3 | 27.3 | 62.3 | 14.05 | 96.9 | −25 |
| HFC-1225ye | HFC-134 | HFC-152a | 63.6 | 26.8 | 9.6 | 12.38 | 85.4 | −25 |
| HFC-1225ye | HFC-134 | HFC-227ea | 1.3 | 52.3 | 46.4 | 12.32 | 84.9 | −25 |

TABLE 4-continued

| Component A | Component B | Component C | Wt % A | Wt % B | Wt % C | Pres (psi) | Pres (kPa) | Temp (° C.) |
|---|---|---|---|---|---|---|---|---|
| HFC-1225ye | HFC-134 | n-butane | 18.1 | 67.1 | 14.9 | 14.54 | 100 | −25 |
| HFC-1225ye | HFC-134 | isobutane | 0.7 | 74.0 | 25.3 | 16.68 | 115 | −25 |
| HFC-1225ye | HFC-134 | DME | 29.8 | 52.5 | 17.8 | 9.78 | 67.4 | −25 |
| HFC-1225ye | HFC-227ea | DME | 63.1 | 31.0 | 5.8 | 10.93 | 75.4 | −25 |
| HFC-1225ye | n-butane | DME | 66.0 | 13.0 | 21.1 | 11.34 | 78.2 | −25 |
| HFC-1225ye | n-butane | $CF_3SCF_3$ | 71.3 | 5.6 | 23.0 | 12.25 | 84.5 | −25 |
| HFC-1225ye | isobutane | DME | 49.9 | 29.7 | 20.4 | 12.83 | 88.5 | −25 |
| HFC-1225ye | isobutane | $CF_3I$ | 27.7 | 2.2 | 70.1 | 13.19 | 90.9 | −25 |
| trans-HFC-1234ze | HFC-1243zf | HFC-227ea | 7.1 | 73.7 | 19.2 | 13.11 | 90.4 | −25 |
| trans-HFC-1234ze | HFC-1243zf | n-butane | 9.5 | 81.2 | 9.3 | 13.48 | 92.9 | −25 |
| trans-HFC-1234ze | HFC-1243zf | isobutane | 3.3 | 77.6 | 19.1 | 14.26 | 98.3 | −25 |
| trans-HFC-1234ze | HFC-1243zf | DME | 2.6 | 70.0 | 27.4 | 12.03 | 82.9 | −25 |
| trans-HFC-1234ze | HFC-134 | HFC-152a | 52.0 | 42.9 | 5.1 | 12.37 | 85.3 | −25 |
| trans-HFC-1234ze | HFC-134 | HFC-227ea | 30.0 | 43.2 | 26.8 | 12.61 | 86.9 | −25 |
| trans-HFC-1234ze | HFC-134 | DME | 27.7 | 54.7 | 17.7 | 9.76 | 67.3 | −25 |
| trans-HFC-1234ze | HFC-134a | HFC-152a | 14.4 | 34.7 | 51.0 | 14.42 | 99.4 | −25 |
| trans-HFC-1234ze | HFC-152a | n-butane | 5.4 | 80.5 | 14.1 | 15.41 | 106 | −25 |
| trans-HFC-1234ze | HFC-152a | DME | 59.1 | 16.4 | 24.5 | 10.80 | 74.5 | −25 |
| trans-HFC-1234ze | HFC-227ea | n-butane | 40.1 | 48.5 | 11.3 | 12.61 | 86.9 | −25 |
| trans-HFC-1234ze | n-butane | DME | 68.1 | 13.0 | 18.9 | 11.29 | 77.8 | −25 |
| trans-HFC-1234ze | n-butane | $CF_3I$ | 81.2 | 9.7 | 9.1 | 11.87 | 81.8 | −25 |
| trans-HFC-1234ze | isobutane | DME | 55.5 | 28.7 | 15.8 | 12.38 | 85.4 | −25 |
| trans-HFC-1234ze | isobutane | $CF_3I$ | 34.9 | 6.1 | 59.0 | 12.57 | 86.7 | −25 |
| trans-HFC-1234ze | isobutane | $CF_3SCF_3$ | 37.7 | 1.1 | 61.7 | 12.66 | 87.3 | −25 |
| HFC-1243zf | HFC-134 | HFC-227ea | 58.6 | 34.1 | 7.3 | 13.54 | 93.4 | −25 |
| HFC-1243zf | HFC-134 | n-butane | 27.5 | 58.7 | 13.9 | 14.72 | 101 | −25 |
| HFC-1243zf | HFC-134 | DME | 18.7 | 63.5 | 17.8 | 10.11 | 69.7 | −25 |
| HFC-1243zf | HFC-134 | $CF_3I$ | 11.4 | 23.9 | 64.7 | 14.45 | 99.6 | −25 |
| HFC-1243zf | HFC-134a | HFC-152a | 41.5 | 21.5 | 37.1 | 14.95 | 103 | −25 |
| HFC-1243zf | HFC-134A | n-butane | 7.0 | 81.4 | 11.6 | 17.03 | 117 | −25 |
| HFC-1243zf | HFC-152a | propane | 2.9 | 34.0 | 63.0 | 31.73 | 219 | −25 |
| HFC-1243zf | HFC-152a | n-butane | 28.8 | 60.3 | 11.0 | 15.71 | 108 | −25 |
| HFC-1243zf | HFC-152a | isobutane | 6.2 | 68.5 | 25.3 | 17.05 | 118 | −25 |
| HFC-1243zf | HFC-152a | DME | 33.1 | 36.8 | 30.1 | 11.41 | 78.7 | −25 |
| HFC-1243zf | HFC-227ea | n-butane | 62.0 | 28.4 | 9.6 | 13.67 | 94.3 | −25 |
| HFC-1243zf | HFC-227ea | isobutane | 27.9 | 51.0 | 21.1 | 15.00 | 103 | −25 |
| HFC-1243zf | HFC-227ea | DME | 48.1 | 44.8 | 7.2 | 12.78 | 88.1 | −25 |
| HFC-1243zf | n-butane | DME | 60.3 | 10.1 | 29.6 | 12.28 | 84.7 | −25 |
| HFC-1243zf | isobutane | DME | 47.1 | 26.9 | 25.9 | 13.16 | 90.7 | −25 |
| HFC-1243zf | isobutane | $CF_3I$ | 32.8 | 1.1 | 66.1 | 13.97 | 96.3 | −25 |
| HFC-1243zf | DME | $CF_3SCF_3$ | 41.1 | 2.3 | 56.6 | 13.60 | 93.8 | −25 |

The near-azeotropic compositions of the present invention at a specified temperature are listed in Table 5.

TABLE 5

| Component A | Component B | (wt % A/wt % B) | T (C.) |
|---|---|---|---|
| HFC-1234yf | HFC-32 | 1-57/99-43 | −25 |
| HFC-1234yf | HFC-125 | 1-51/99-49 | −25 |
| HFC-1234yf | HFC-134 | 1-99/99-1 | −25 |
| HFC-1234yf | HFC-134a | 1-99/99-1 | −25 |
| HFC-1234yf | HFC-152a | 1-99/99-1 | −25 |
| HFC-1234yf | HFC-161 | 1-99/99-1 | −25 |
| HFC-1234yf | HFC-143a | 1-60/99-40 | −25 |
| HFC-1234yf | HFC-227ea | 29-99/71-1 | −25 |
| HFC-1234yf | HFC-236fa | 66-99/34-1 | −25 |
| HFC-1234yf | HFC-1225ye | 1-99/99-1 | −25 |
| HFC-1234yf | trans-HFC-1234ze | 1-99/99-1 | −25 |
| HFC-1234yf | HFC-1243zf | 1-99/99-1 | −25 |
| HFC-1234yf | propane | 1-80/99-20 | −25 |
| HFC-1234yf | n-butane | 71-99/29-1 | −25 |
| HFC-1234yf | isobutane | 60-99/40-1 | −25 |
| HFC-1234yf | DME | 1-99/99-1 | −25 |
| HFC-1225ye | trans-HFC-1234ze | 1-99/99-1 | −25 |
| HFC-1225ye | HFC-1243zf | 1-99/99-1 | −25 |
| HFC-1225ye | HFC-134 | 1-99/99-1 | −25 |
| HFC-1225ye | HFC-134a | 1-99/99-1 | −25 |
| HFC-1225ye | HFC-152a | 1-99/99-1 | −25 |

TABLE 5-continued

| Component A | Component B | (wt % A/wt % B) | T (C.) |
|---|---|---|---|
| HFC-1225ye | HFC-161 | 1-84/99-16, 90-99/10-1 | −25 |
| HFC-1225ye | HFC-227ea | 1-99/99-1 | −25 |
| HFC-1225ye | HFC-236ea | 57-99/43-1 | −25 |
| HFC-1225ye | HFC-236fa | 48-99/52-1 | −25 |
| HFC-1225ye | HFC-245fa | 70-99/30-1 | −25 |
| HFC-1225ye | propane | 1-72/99-28 | −25 |
| HFC-1225ye | n-butane | 65-99/35-1 | −25 |
| HFC-1225ye | isobutane | 50-99/50-1 | −25 |
| HFC-1225ye | DME | 1-99/99-1 | −25 |
| HFC-1225ye | $CF_3I$ | 1-99/99-1 | −25 |
| HFC-1225ye | $CF_3SCF_3$ | 1-99/99-1 | −25 |
| trans-HFC-1234ze | cis-HFC-1234ze | 73-99/27-1 | −25 |
| trans-HFC-1234ze | HFC-1243zf | 1-99/99-1 | −25 |
| trans-HFC-1234ze | HFC-134 | 1-99/99-1 | −25 |
| trans-HFC-1234ze | HFC-134a | 1-99/99-1 | −25 |
| trans-HFC-1234ze | HFC-152a | 1-99/99-1 | −25 |
| trans-HFC-1234ze | HFC-161 | 1-52/99-48, 87-99/13-1 | −25 |
| trans-HFC-1234ze | HFC-227ea | 1-99/99-1 | −25 |
| trans-HFC-1234ze | HFC-236ea | 54-99/46-1 | −25 |
| trans-HFC-1234ze | HFC-236fa | 44-99/56-1 | −25 |
| trans-HFC-1234ze | HFC-245fa | 67-99/33-1 | −25 |
| trans-HFC-1234ze | propane | 1-71/99-29 | −25 |
| trans-HFC-1234ze | n-butane | 62-99/38-1 | −25 |
| trans-HFC-1234ze | isobutane | 39-99/61-1 | −25 |
| trans-HFC-1234ze | DME | 1-99/99-1 | −25 |
| trans-HFC-1234ze | $CF_3SCF_3$ | 1-99/99-1 | −25 |
| trans-HFC-1234ze | $CF_3I$ | 1-99/99-1 | −25 |
| HFC-1243zf | HFC-134 | 1-99/99-1 | −25 |
| HFC-1243zf | HFC-134a | 1-99/99-1 | −25 |
| HFC-1243zf | HFC-152a | 1-99/99-1 | −25 |
| HFC-1243zf | HFC-161 | 1-99/99-1 | −25 |
| HFC-1243zf | HFC-227ea | 1-99/99-1 | −25 |
| HFC-1243zf | HFC-236ea | 53-99/47-1 | −25 |
| HFC-1243zf | HFC-236fa | 49-99/51-1 | −25 |
| HFC-1243zf | HFC-245fa | 66-99/34-1 | −25 |
| HFC-1243zf | propane | 1-71/99-29 | −25 |
| HFC-1243zf | n-butane | 62-99/38-1 | −25 |
| HFC-1243zf | isobutane | 45-99/55-1 | −25 |
| HFC-1243zf | DME | 1-99/99-1 | −25 |
| cis-HFC-1234ze | HFC-236ea | 1-99/99-1 | 25 |
| cis-HFC-1234ze | HFC-236fa | 1-99/99-1 | 25 |
| cis-HFC-1234ze | HFC-245fa | 1-99/99-1 | 25 |
| cis-HFC-1234ze | n-butane | 1-80/99-20 | −25 |
| cis-HFC-1234ze | isobutane | 1-69/99-31 | −25 |
| cis-HFC-1234ze | 2-methylbutane | 60-99/40-1 | 25 |
| cis-HFC-1234ze | n-pentane | 63-99/37-1 | 25 |
| HFC-1234ye | HFC-134 | 38-99/62-1 | 25 |
| HFC-1234ye | HFC-236ea | 1-99/99-1 | −25 |
| HFC-1234ye | HFC-236fa | 1-99/99-1 | 25 |
| HFC-1234ye | HFC-245fa | 1-99/99-1 | 25 |
| HFC-1234ye | Cis-HFC-1234ze | 1-99/99-1 | 25 |
| HFC-1234ye | n-butane | 1-78/99-22 | 25 |
| HFC-1234ye | cyclopentane | 70-99/30-1 | 25 |
| HFC-1234ye | isobutane | 1-68/99-32 | 25 |
| HFC-1234ye | 2-methylbutane | 47-99/53-1 | 25 |
| HFC-1234ye | n-pentane | 57-99/43-1 | 25 |

Ternary and higher order near-azeotrope compositions comprising fluoroolefin have also been identified as listed in Table 6.

TABLE 6

| Components | Near-azeotrope range (weight percent) | Temp (° C.) |
|---|---|---|
| HFC-1225ye/HFC-134a/HFC-152a | 1-98/1-98/1-98 | 25 |
| HFC-1225ye/HFC-134a/HFC-161 | 1-98/1-98/1-98 | 25 |
| HFC-1225ye/HFC-134a/isobutane | 1-98/1-98/1-40 | 25 |
| HFC-1225ye/HFC-134a/DME | 1-98/1-98/1-20 | 25 |
| HFC-1225ye/HFC-152a/isobutane | 1-98/1-98/1-50 | 25 |
| HFC-1225ye/HFC-152a/DME | 1-98/1-98/1-98 | 25 |
| HFC-1225ye/HFC-1234yf/HFC-134a | 1-98/1-98/1-98 | 25 |
| HFC-1225ye/HFC-1234yf/HFC-152a | 1-98/1-98/1-98 | 25 |
| HFC-1225ye/HFC-1234yf/HFC-125 | 1-98/1-98/1-20 | 25 |
| HFC-1225ye/HFC-1234yf/$CF_3I$ | 1-98/1-98/1-98 | 25 |
| HFC-1225ye/HFC-134a/HFC-152a/HFC-32 | 1-97/1-97/1-97/1-10 | 25 |
| HFC-125/HFC-1225ye/isobutane | 80-98/1-19/1-10 | 25 |
| HFC-125/trans-HFC-1234ze/isobutane | 80-98/1-19/1-10 | 25 |
| HFC-125/HFC-1234yf/isobutane | 80-98/1-19/1-10 | 25 |
| HFC-32/HFC-125/HFC-1225ye | 1-98/1-98/1-4 | 25 |
| HFC-32/HFC-125/trans-HFC-1234ze | 1-98/1-98/1-50 | 25 |
| HFC-32/HFC-125/HFC-1234yf | 1-98/1-98/1-55 | 25 |
| HFC-125/trans-HFC-1234ze/n-butane | 80-98/1-19/1-10 | 25 |
| HFC-125/HFC-1234yf/n-butane | 80-98/1-19/1-10 | 25 |
| HFC-1234yf/HFC-32/HFC-143a | 1-50/1-98/1-98 | −25 |
| HFC-1234yf/HFC-32/isobutane | 1-40/59-98/1-30 | −25 |
| HFC-1234yf/HFC-125/HFC-143a | 1-60/1-98/1-98 | −25 |
| HFC-1234yf/HFC-125/isobutane | 1-40/59-98/1-20 | −25 |
| HFC-1234yf/HFC-134/propane | 1-80/1-70/19-90 | −25 |
| HFC-1234yf/HFC-134/DME | 1-70/1-98/29-98 | −25 |
| HFC-1234yf/HFC-134a/propane | 1-80/1-80/19-98 | −25 |
| HFC-1234yf/HFC-134a/n-butane | 1-98/1-98/1-30 | −25 |
| HFC-1234yf/HFC-134a/isobutane | 1-98/1-98/1-30 | −25 |
| HFC-1234yf/HFC-134a/DME | 1-98/1-98/1-40 | −25 |
| HFC-1234yf/HFC-143a/propane | 1-80/1-98/1-98 | −25 |
| HFC-1234yf/HFC-143a/DME | 1-40/59-98/1-20 | −25 |
| HFC-1234yf/HFC-152a/n-butane | 1-98/1-98/1-30 | −25 |
| HFC-1234yf/HFC-152a/isobutane | 1-98/1-90/1-40 | −25 |
| HFC-1234yf/HFC-152a/DME | 1-70/1-98/1-98 | −25 |
| HFC-1234yf/HFC-227ea/propane | 1-80/1-70/29-98 | −25 |
| HFC-1234yf/HFC-227ea/n-butane | 40-98/1-59/1-20 | −25 |
| HFC-1234yf/HFC-227ea/isobutane | 30-98/1-69/1-30 | −25 |
| HFC-1234yf/HFC-227ea/DME | 1-98/1-80/1-98 | −25 |
| HFC-1234yf/n-butane/DME | 1-98/1-40/1-98 | −25 |
| HFC-1234yf/isobutane/DME | 1-98/1-50/1-98 | −25 |
| HFC-1234yf/DME/$CF_3I$ | 1-98/1-98/1-98 | −25 |
| HFC-1234yf/DME/$CF_3SCF_3$ | 1-98/1-40/1-80 | −25 |
| HFC-1225ye/trans-HFC-1234ze/HFC-134 | 1-98/1-98/1-98 | −25 |
| HFC-1225ye/trans-HFC-1234ze/HFC-227ea | 1-98/1-98/1-98 | −25 |
| HFC-1225ye/trans-HFC-1234ze/propane | 1-60/1-60/1-98 | −25 |
| HFC-1225ye/trans-HFC-1234ze/n-butane | 1-98/1-98/1-30 | −25 |
| HFC-1225ye/trans-HFC-1234ze/DME | 1-98/1-98/1-98 | −25 |
| HFC-1225ye/trans-HFC-1234ze/$CF_3SCF_3$ | 1-98/1-98/1-98 | −25 |
| HFC-1225ye/HFC-1243zf/HFC-134 | 1-98/1-98/1-98 | −25 |
| HFC-1225ye/HFC-1243zf/n-butane | 1-98/1-98/1-30 | −25 |
| HFC-1225ye/HFC-1243zf/isobutane | 1-98/1-98/1-40 | −25 |
| HFC-1225ye/HFC-1243zf/DME | 1-98/1-98/1-98 | −25 |
| HFC-1225ye/HFC-1243zf/$CF_3I$ | 1-98/1-98/1-98 | −25 |
| HFC-1225ye/HFC-134/HFC-152a | 1-98/1-98/1-98 | −25 |
| HFC-1225ye/HFC-134/HFC-227ea | 1-98/1-98/1-98 | −25 |
| HFC-1225ye/HFC-134/n-butane | 1-98/1-90/1-40 | −25 |
| HFC-1225ye/HFC-134/isobutane | 1-98/1-90/1-40 | −25 |
| HFC-1225ye/HFC-134/DME | 1-98/1-98/1-40 | −25 |
| HFC-1225ye/HFC-227ea/DME | 40-98/1-59/1-30 | −25 |
| HFC-1225ye/n-butane/DME | 1-98/1-30/1-98 | −25 |
| HFC-1225ye/n-butane/$CF_3SCF_3$ | 1-98/1-20/1-98 | −25 |
| HFC-1225ye/isobutane/DME | 1-98/1-60/1-98 | −25 |
| HFC-1225ye/isobutane/$CF_3I$ | 1-98/1-40/1-98 | −25 |
| trans-HFC-1234ze/HFC-1243zf/HFC-227ea | 1-98/1-98/1-98 | −25 |
| trans-HFC-1234ze/HFC-1243zf/n-butane | 1-98/1-98/1-30 | −25 |
| trans-HFC-1234ze/HFC-1243zf/isobutane | 1-98/1-98/1-40 | −25 |
| trans-HFC-1234ze/HFC-1243zf/DME | 1-98/1-98/1-98 | −25 |
| trans-HFC-1234ze/HFC-134/HFC-152a | 1-98/1-98/1-98 | −25 |
| trans-HFC-1234ze/HFC-134/HFC-227ea | 1-98/1-98/1-98 | −25 |
| trans-HFC-1234ze/HFC-134/DME | 1-98/1-98/1-40 | −25 |
| trans-HFC-1234ze/HFC-134a/HFC-152a | 1-98/1-98/1-98 | −25 |

TABLE 6-continued

| Components | Near-azeotrope range (weight percent) | Temp (° C.) |
|---|---|---|
| trans-HFC-1234ze/HFC-152a/n-butane | 1-98/1-98/1-50 | −25 |
| trans-HFC-1234ze/HFC-152a/DME | 1-98/1-98/1-98 | −25 |
| trans-HFC-1234ze/HFC-227ea/n-butane | 1-98/1-98/1-40 | −25 |
| trans-HFC-1234ze/n-butane/DME | 1-98/1-40/1-98 | −25 |
| trans-HFC-1234ze/n-butane/CF$_3$I | 1-98/1-30/1-98 | −25 |
| trans-HFC-1234ze/isobutane/DME | 1-98/1-60/1-98 | −25 |
| trans-HFC-1234ze/isobutane/CF$_3$I | 1-98/1-40/1-98 | −25 |
| trans-HFC-1234ze/isobutane/CF$_3$SCF$_3$ | 1-98/1-40/1-98 | −25 |
| HFC-1243zf/HFC-134/HFC-227ea | 1-98/1-98/1-98 | −25 |
| HFC-1243zf/HFC-134/n-butane | 1-98/1-98/1-40 | −25 |
| HFC-1243zf/HFC-134/DME | 1-98/1-98/1-98 | −25 |
| HFC-1243zf/HFC-134/CF$_3$I | 1-98/1-98/1-98 | −25 |
| HFC-1243zf/HFC-134a/HFC-152a | 1-98/1-98/1-98 | −25 |
| HFC-1243zf/HFC-134a/n-butane | 1-98/1-98/1-40 | −25 |
| HFC-1243zf/HFC-152a/propane | 1-70/1-70/29-98 | −25 |
| HFC-1243zf/HFC-152a/n-butane | 1-98/1-98/1-30 | −25 |
| HFC-1243zf/HFC-152a/isobutane | 1-98/1-98/1-40 | −25 |
| HFC-1243zf/HFC-152a/DME | 1-98/1-98/1-98 | −25 |
| HFC-1243zf/HFC-227ea/n-butane | 1-98/1-98/1-40 | −25 |
| HFC-1243zf/HFC-227ea/isobutane | 1-98/1-90/1-50 | −25 |
| HFC-1243zf/HFC-227ea/DME | 1-98/1-80/1-90 | −25 |
| HFC-1243zf/n-butane/DME | 1-98/1-40/1-98 | −25 |
| HFC-1243zf/isobutane/DME | 1-98/1-60/1-98 | −25 |
| HFC-1243zf/isobutane/CF$_3$I | 1-98/1-40/1-98 | −25 |
| HFC-1243zf/DME/CF$_3$SCF$_3$ | 1-98/1-40/1-90 | −25 |

Certain of the compositions of the present invention are non-azeotropic compositions. Those compositions of the present invention falling within the preferred ranges of Table 2, but outside of the near-azeotropic ranges of Table 5 and Table 6 may be considered to be non-azeotropic.

A non-azeotropic composition may have certain advantages over azeotropic or near azeotropic mixtures. A non-azeotropic composition is a mixture of two or more substances that behaves as a mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

The compositions of the present invention may be prepared by any convenient method to combine the desired amounts of the individual components. A preferred method is to weigh the desired component amounts and thereafter combine the components in an appropriate vessel. Agitation may be used, if desired.

An alternative means for making compositions of the present invention may be a method for making a refrigerant blend composition, wherein said refrigerant blend composition comprises a composition as disclosed herein, said method comprising (i) reclaiming a volume of one or more components of a refrigerant composition from at least one refrigerant container, (ii) removing impurities sufficiently to enable reuse of said one or more of the reclaimed components, (iii) and optionally, combining all or part of said reclaimed volume of components with at least one additional refrigerant composition or component.

A refrigerant container may be any container in which is stored a refrigerant blend composition that has been used in a refrigeration apparatus, air-conditioning apparatus or heat pump apparatus. Said refrigerant container may be the refrigeration apparatus, air-conditioning apparatus or heat pump apparatus in which the refrigerant blend was used. Additionally, the refrigerant container may be a storage container for collecting reclaimed refrigerant blend components, including but not limited to pressurized gas cylinders.

Residual refrigerant means any amount of refrigerant blend or refrigerant blend component that may be moved out of the refrigerant container by any method known for transferring refrigerant blends or refrigerant blend components.

Impurities may be any component that is in the refrigerant blend or refrigerant blend component due to its use in a refrigeration apparatus, air-conditioning apparatus or heat pump apparatus. Such impurities include but are not limited to refrigeration lubricants, being those described earlier herein, particulates including but not limited to metal, metal salt or elastomer particles, that may have come out of the refrigeration apparatus, air-conditioning apparatus or heat pump apparatus, and any other contaminants that may adversely effect the performance of the refrigerant blend composition.

Such impurities may be removed sufficiently to allow reuse of the refrigerant blend or refrigerant blend component without adversely effecting the performance or equipment within which the refrigerant blend or refrigerant blend component will be used.

It may be necessary to provide additional refrigerant blend or refrigerant blend component to the residual refrigerant blend or refrigerant blend component in order to produce a composition that meets the specifications required for a given product. For instance, if a refrigerant blend has 3 components in a particular weight percentage range, it may be necessary to add one or more of the components in a given amount in order to restore the composition to within the specification limits.

Compositions of the present invention have zero or low ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000, less than 500, less than 150, less than 100, or less than 50. Another aspect of the present invention is to reduce the net GWP of refrigerant mixtures by adding fluoroolefins to said mixtures.

The compositions of the present invention may be useful as low global warming potential (GWP) replacements for currently used refrigerants, including but not limited to R134a (or HFC-134a, 1,1,1,2-tetrafluoroethane), R22 (or HCFC-22, chlorodifluoromethane), R123 (or HFC-123, 2,2-dichloro-1,1,1-trifluoroethane), R11 (CFC-11, fluorotrichloromethane), R12 (CFC-12, dichlorodifluoromethane), R245fa (or HFC-245fa, 1,1,1,3,3-pentafluoropropane), R114 (or CFC-114, 1,2-dichloro-1,1,2,2-tetrafluoroethane), R236fa (or HFC-236fa, 1,1,1,3,3,3-hexafluoropropane), R124 (or HCFC-124, 2-chloro-1,1,1,2-tetrafluoroethane), R407c (ASHRAE designation for a blend of 52 weight percent R134a, 25 weight percent R125 (pentafluoroethane), and 23 weight percent R32 (difluoromethane), R410A (ASHRAE designation for a blend of 50 weight percent R125 and 50 weight percent R32), R417A, (ASHRAE designation for a blend of 46.6 weight percent R125, 50.0 weight percent R134a, and 3.4 weight percent n-butane), R422A, R422B, R422c and R422D, (ASHRAE designation for a blend of 85.1 weight percent R125, 11.5 weight percent R134a, and 3.4 weight percent isobutane), R404A, (ASHRAE designation for a blend of 44 weight percent R125, 52 weight percent R143a (1,1,1-trifluoroethane), and 4.0 weight percent R134a) and R507A (ASHRAE designation for a blend of 50 weight percent R125 and 50 weight percent R143a). Additionally, the compositions of the present invention may be useful as replacements for R12 (CFC-12, dichlorodifluoromethane) or R502 (ASHRAE designation for a blend of 51.2 weight percent CFC-115 (chloropentafluoroethane) and 48.8 weight percent HCFC-22).

Often replacement refrigerants are most useful if capable of being used in the original refrigeration equipment designed for a different refrigerant. The compositions of the present invention may be useful as replacements for the above-mentioned refrigerants in original equipment. Additionally, the compositions of the present invention may be useful as replacements for the above mentioned refrigerants in equipment designed to use the above-mentioned refrigerants.

The compositions of the present invention may further comprise a lubricant. Lubricants of the present invention comprise refrigeration lubricants, i.e. those lubricants suitable for use with refrigeration, air-conditioning, or heat pump apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Representative conventional lubricants of the present invention are the commercially available BVM 100 N (paraffinic mineral oil sold by BVA Oils), Suniso® 3GS and Suniso® 5GS (naphthenic mineral oil sold by Crompton Co.), Sontex® 372LT (naphthenic mineral oil sold by Pennzoil), Calumet® RO-30 (naphthenic mineral oil sold by Calumet Lubricants), Zerol® 75, Zerol® 150 and Zerol® 500 (linear alkylbenzenes sold by Shrieve Chemicals) and HAB 22 (branched alkylbenzene sold by Nippon Oil).

Lubricants of the present invention further comprise those that have been designed for use with hydrofluorocarbon refrigerants and are miscible with refrigerants of the present invention under compression refrigeration, air-conditioning, or heat pump apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs). These lubricants are readily available from various commercial sources.

Lubricants of the present invention are selected by considering a given compressor's requirements and the environment to which the lubricant will be exposed. Lubricants of the present invention preferably have a kinematic viscosity of at least about 5 cs (centistokes) at 40° C.

Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, free radical scavengers, foaming and antifoam control agents, leak detectants and the like. In general, these additives are present only in small amounts relative to the overall lubricant composition. They are typically used at concentrations of from less than about 0.1% to as much as about 3% of each additive. These additives are selected on the basis of the individual system requirements. Some typical examples of such additives may include, but are not limited to, lubrication enhancing additives, such as alkyl or aryl esters of phosphoric acid and of thiophosphates. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and assymetrical polyhydroxyl lubrication additives such as Synergol TMS (International Lubricants). Similarly, stabilizers such as anti oxidants, free radical scavengers, and water scavengers may be employed. Compounds in this category can include, but are not limited to, butylated hydroxy toluene (BHT) and epoxides.

The compositions of the present invention may further comprise about 0.01 weight percent to about 5 weight percent of an additive such as, for example, a stabilizer, free radical scavenger and/or antioxidant. Such additives include but are not limited to, nitromethane, hindered phenols, hydroxylamines, thiols, phosphites, or lactones. Single additives or combinations may be used.

The compositions of the present invention may further comprise about 0.01 weight percent to about 5 weight percent of a water scavenger (drying compound). Such water scavengers may comprise ortho esters such as trimethyl-, triethyl-, or tripropylortho formate.

The compositions of the present invention may further comprise a tracer selected from the group consisting of hydrofluorocarbons (HFCs), deuterated hydrocarbons, deuterated hydrofluorocarbons, perfluorocarbons, fluoroethers, brominated compounds, iodated compounds, alcohols, aldehydes, ketones, nitrous oxide ($N_2O$) and combinations thereof. The tracer compounds are added to the compositions in previously determined quantities to allow detection of any dilution, contamination or other alteration of the composition, as described in U.S. patent application Ser. No. 11/062,044, filed Feb. 18, 2005.

Typical tracer compounds for use in the present compositions are listed in Table 7.

TABLE 7

| Compound | Structure |
|---|---|
| Deuterated hydrocarbons and hydrofluorocarbons | |
| Ethane-d6 | $CD_3CD_3$ |
| Propane-d8 | $CD_3CD_2CD_3$ |
| HFC-32-d2 | $CD_2F_2$ |
| HFC-134a-d2 | $CD_2FCF_3$ |
| HFC-143a-d3 | $CD_3CF_3$ |
| HFC-125-d | $CDF_2CF_3$ |

TABLE 7-continued

| Compound | Structure |
|---|---|
| HFC-227ea-d | CF$_3$CDFCF$_3$ |
| HFC-227ca-d | CF$_3$CF$_2$CDF$_2$ |
| HFC-134-d2 | CDF$_2$CDF$_2$ |
| HFC-236fa-d2 | CF$_3$CD$_2$CF$_3$ |
| HFC-245cb-d3 | CF$_3$CF$_2$CD$_3$ |
| HFC-263fb-d2* | CF$_3$CD$_2$CH$_3$ |
| HFC-263fb-d3 | CF$_2$CH$_2$CD$_3$ |
| Fluoroethers | |
| HFOC-125E | CHF$_2$OCF$_3$ |
| HFOC-134aE | CH$_2$FOCF$_3$ |
| HFOC-143aE | CH$_3$OCF$_3$ |
| HFOC-227eaE | CF$_3$OCHFCF$_3$ |
| HFOC-236faE | CF$_3$OCH$_2$CF$_3$ |
| HFOC-245faEβγ or HFOC-245faEαβ | CHF$_2$OCH$_2$CF$_3$ (or CHF$_2$CH$_2$OCF$_3$) |
| HFOC-245cbEβγ or HFOC-245cbαβ | CH$_3$OCF$_2$CF$_3$ (or CH$_3$CF$_2$OCF$_3$) |
| HFE-42-11mcc (or Freon® E1) | CF$_3$CF$_2$CF$_2$OCHFCF$_3$ |
| Freon® E2 | CF$_3$CF$_2$CF$_2$OCF(CF$_3$) CF$_2$OCHFCF$_3$ |
| Hydrofluorocarbons | |
| HFC-23 | CHF$_3$ |
| HFC-161 | CH$_3$CH$_2$F |
| HFC-152a | CH$_3$CHF$_2$ |
| HFC-134 | CHF$_2$CHF$_2$ |
| HFC-227ea | CF$_3$CHFCF$_3$ |
| HFC-227ca | CHF$_2$CF$_2$CF$_3$ |
| HFC-236cb | CH$_2$FCF$_2$CF$_3$ |
| HFC-236ea | CF$_3$CHFCHF$_2$ |
| HFC-236fa | CF$_3$CH$_2$CF$_3$ |
| HFC-245cb | CF$_3$CF$_2$CH$_3$ |
| HFC-245fa | CHF$_2$CH$_2$CF$_3$ |
| HFC-254cb | CHF$_2$CF$_2$CH$_3$ |
| HFC-254eb | CF$_3$CHFCH$_3$ |
| HFC-263fb | CF$_3$CH$_2$CH$_3$ |
| HFC-272ca | CH$_3$CF$_2$CH$_3$ |
| HFC-281ea | CH$_3$CHFCH$_3$ |
| HFC-281fa | CH$_2$FCH$_2$CH$_3$ |
| HFC-329p | CHF$_2$CF$_2$CF$_2$CF$_3$ |
| HFC-329mmz | (CH$_3$)$_2$CHCF$_3$ |
| HFC-338mf | CF$_3$CH$_2$CF$_2$CF$_3$ |
| HFC-338pcc | CHF$_2$CF$_2$CF$_2$CHF$_2$ |
| HFC-347s | CH$_3$CF$_2$CF$_2$CF$_3$ |
| HFC-43-10mee | CF$_3$CHFCHFCF$_2$CF$_3$ |
| Perfluorocarbons | |
| PFC-116 | CF$_3$CF$_3$ |
| PFC-C216 | Cyclo(—CF$_2$CF$_2$CF$_2$—) |
| PFC-218 | CF$_3$CF$_2$CF$_3$ |
| PFC-C318 | Cyclo(—CF$_2$CF$_2$CF$_2$CF$_2$—) |
| PFC-31-10mc | CF$_3$CF$_2$CF$_2$CF$_3$ |
| PFC-31-10my | (CF$_3$)$_2$CFCF$_3$ |
| PFC-C51-12mycm | Cyclo(—CF(CF$_3$)CF$_2$CF(CF$_3$)CF$_2$—) |
| PFC-C51-12mym, trans | trans-cyclo(—CF$_2$CF(CF$_3$)CF(CF$_3$)CF$_2$—) |
| PFC-C51-12mym, cis | cis-cyclo(—CF$_2$CF(CF$_3$)CF(CF$_3$)CF$_2$—) |
| Perfluoromethylcyclo-pentane | Cyclo(—CF$_2$CF$_2$(CF$_3$)CF$_2$CF$_2$CF$_2$—) |
| Perfluoromethylcyclo-hexane | Cyclo(—CF$_2$CF$_2$(CF$_3$)CF$_2$CF$_2$CF$_2$CF$_2$—) |
| Perfluorodimethylcyclo-hexane (ortho, meta, or para) | Cyclo(—CF$_2$CF$_2$(CF$_3$)CF$_2$CF$_2$(CF$_3$)CF$_2$—) |
| Perfluoroethylcyclohexane | Cyclo(—CF$_2$CF$_2$(CF$_2$CF$_3$)CF$_2$CF$_2$CF$_2$CF$_2$—) |
| Perfluoroindan | C$_9$F$_{10}$ (see structure below) |

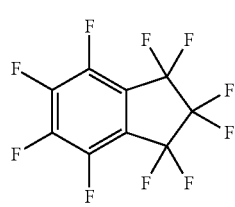 [SMILES: Fc1c(F)c(F)c2c(c1F)C(F)(F)C(F)(F)C2(F)F]

| Compound | Structure |
|---|---|
| Perfluorotrimethylcyclo-hexane (all possible isomers) | Cyclo (—CF$_2$(CF$_3$)CF$_2$(CF$_3$)CF$_2$CF$_2$(CF$_3$)CF$_2$—) |
| Perfluoroisopropylcyclo-hexane | Cyclo (—CF$_2$CF$_2$(CF$_2$(CF$_3$)$_2$)CF$_2$CF$_2$CF$_2$CF$_2$—) |
| Perfluorodecalin (cis or trans, trans shown) | C$_{10}$F$_{18}$ (see structure below) |
| Perfluoromethyldecalin (cis or trans and all additional possible isomers) | C$_{11}$F$_{20}$ (see structure below) |
| Brominated compounds | |
| Bromomethane | CH$_3$Br |
| Bromofluoromethane | CH$_2$FBr |
| Bromodifluoromethane | CHF$_2$Br |
| Dibromofluoromethane | CHFBr$_2$ |
| Tribromomethane | CHBr$_3$ |
| Bromoethane | CH$_3$CH$_2$Br |
| Bromoethene | CH$_2$=CHBr |
| 1,2-dibromoethane | CH$_2$BrCH$_2$Br |
| 1-bromo-1,2-difluoroethene | CFBr=CHF |
| Iodated compounds | |
| Iodotrifluoromethane | CF$_3$I |
| Difluoroiodomethane | CHF$_2$I |
| Fluoroiodomethane | CH$_2$FI |
| 1,1,2-trifluoro-1-iodoethane | CF$_2$ICH$_2$F |
| 1,1,2,2-tetrafluoro-1-iodoethane | CF$_2$ICHF$_2$ |
| 1,1,2,2-tetrafluoro-1,2-diiodoethane | CF$_2$ICF$_2$I |
| Iodopentafluorobenzene | C$_6$F$_5$I |
| Alcohols | |
| Ethanol | CH$_3$CH$_2$OH |
| n-propanol | CH$_3$CH$_2$CH$_2$OH |
| Isopropanol | CH$_3$CH(OH)CH$_3$ |
| Aldehydes and Ketones | |
| Acetone (2-propanone) | CH$_3$C(O)CH$_3$ |
| n-propanal | CH$_3$CH$_2$CHO |
| n-butanal | CH$_3$CH$_2$CH$_2$CHO |
| Methyl ethyl ketone (2-butanone) | CH$_3$C(O)CH$_2$CH$_3$ |
| Other | |
| Nitrous oxide | N$_2$O |

The compounds listed in Table 7 are available commercially (from chemical supply houses) or may be prepared by processes known in the art.

Single tracer compounds may be used in combination with a refrigeration/heating fluid in the compositions of the present invention or multiple tracer compounds may be combined in any proportion to serve as a tracer blend. The tracer blend may contain multiple tracer compounds from the same class of compounds or multiple tracer compounds from different classes of compounds. For example, a tracer blend may contain 2 or more deuterated hydrofluorocarbons, or one deuterated hydrofluorocarbon in combination with one or more perfluorocarbons.

Additionally, some of the compounds in Table 7 exist as multiple isomers, structural or optical. Single isomers or multiple isomers of the same compound may be used in any proportion to prepare the tracer compound. Further, single or multiple isomers of a given compound may be combined in any proportion with any number of other compounds to serve as a tracer blend.

The tracer compound or tracer blend may be present in the compositions at a total concentration of about 50 parts per million by weight (ppm) to about 1000 ppm. Preferably, the tracer compound or tracer blend is present at a total concentration of about 50 ppm to about 500 ppm and most preferably, the tracer compound or tracer blend is present at a total concentration of about 100 ppm to about 300 ppm.

The compositions of the present invention may further comprise a compatibilizer selected from the group consisting of polyoxyalkylene glycol ethers, amides, nitriles, ketones, chlorocarbons, esters, lactones, aryl ethers, fluoroethers and 1,1,1-trifluoroalkanes. The compatibilizer is used to improve solubility of hydrofluorocarbon refrigerants in conventional refrigeration lubricants. Refrigeration lubricants are needed to lubricate the compressor of a refrigeration, air-conditioning or heat pump apparatus. The lubricant must move throughout the apparatus with the refrigerant in particular it must return from the non-compressor zones to the compressor to continue to function as lubricant and avoid compressor failure.

Hydrofluorocarbon refrigerants are generally not compatible with convention refrigeration lubricants such as mineral oils, alkylbenzenes, synthetic paraffins, synthetic napthenes and poly(alpha)olefins. Many replacement lubricants have been proposed, however, the polyalkylene glycols, polyol esters and polyvinyl ethers, suggested for use with hydrofluorocarbon refrigerants are expensive and absorb water readily. Water in a refrigeration, air-conditioning system or heat pump can lead to corrosion and the formation of particles that may plug the capillary tubes and other small orifices in the system, ultimately causing system failure. Additionally, in existing equipment, time-consuming and costly flushing procedures are required to change to a new lubricant. Therefore, it is desirable to continue to use the original lubricant if possible.

The compatibilizers of the present invention improve solubility of the hydrofluorocarbon refrigerants in conventional refrigeration lubricants and thus improve oil return to the compressor.

Polyoxyalkylene glycol ether compatibilizers of the present invention are represented by the formula $R^1[(OR^2)_xOR^3]_y$, wherein: x is an integer from 1-3; y is an integer from 1-4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen and aliphatic and alicyclic hydrocarbon radicals having from 1 to 6 carbon atoms; at least one of $R^1$ and $R^3$ is said hydrocarbon radical; and wherein said polyoxyalkylene glycol ethers have a molecular weight of from about 100 to about 300 atomic mass units. As used herein, bonding sites mean radical sites available to form covalent bonds with other radicals. Hydrocarbylene radicals mean divalent hydrocarbon radicals. In the present invention, preferred polyoxyalkylene glycol ether compatibilizers are represented by $R^1[(OR^2)_xOR^3]_y$: x is preferably 1-2; y is preferably 1; $R^1$ and $R^3$ are preferably independently selected from hydrogen and aliphatic hydrocarbon radicals having 1 to 4 carbon atoms; $R^2$ is preferably selected from aliphatic hydrocarbylene radicals having from 2 or 3 carbon atoms, most preferably 3 carbon atoms; the polyoxyalkylene glycol ether molecular weight is preferably from about 100 to about 250 atomic mass units, most preferably from about 125 to about 250 atomic mass units. The $R^1$ and $R^3$ hydrocarbon radicals having 1 to 6 carbon atoms may be linear, branched or cyclic. Representative $R^1$ and $R^3$ hydrocarbon radicals include methyl, ethyl, propyl, isopropyl, butyl, isobutyl, sec-butyl, tert-butyl, pentyl, isopentyl, neopentyl, tert-pentyl, cyclopentyl, and cyclohexyl. Where free hydroxyl radicals on the present polyoxyalkylene glycol ether compatibilizers may be incompatible with certain compression refrigeration apparatus materials of construction (e.g. Mylar®), $R^1$ and $R^3$ are preferably aliphatic hydrocarbon radicals having 1 to 4 carbon atoms, most preferably 1 carbon atom. The $R^2$ aliphatic hydrocarbylene radicals having from 2 to 4 carbon atoms form repeating oxyalkylene radicals —$(OR^2)_x$— that include oxyethylene radicals, oxypropylene radicals, and oxybutylene radicals. The oxyalkylene radical comprising $R^2$ in one polyoxyalkylene glycol ether compatibilizer molecule may be the same, or one molecule may contain different $R^2$ oxyalkylenegroups. The present polyoxyalkylene glycol ether compatibilizers preferably comprise at least one oxypropylene radical. Where $R^1$ is an aliphatic or alicyclic hydrocarbon radical having 1 to 6 carbon atoms and y bonding sites, the radical may be linear, branched or cyclic. Representative $R^1$ aliphatic hydrocarbon radicals having two bonding sites include, for example, an ethylene radical, a propylene radical, a butylene radical, a pentylene radical, a hexylene radical, a cyclopentylene radical and a cyclohexylene radical. Representative $R^1$ aliphatic hydrocarbon radicals having three or four bonding sites include residues derived from polyalcohols, such as trimethylolpropane, glycerin, pentaerythritol, 1,2,3-trihydroxycyclohexane and 1,3,5-trihydroxycyclohexane, by removing their hydroxyl radicals.

Representative polyoxyalkylene glycol ether compatibilizers include but are not limited to: $CH_3OCH_2CH(CH_3)O(H$ or $CH_3)$ (propylene glycol methyl (or dimethyl)ether), $CH_3O[CH_2CH(CH_3)O]_2(H$ or $CH_3)$ (dipropylene glycol methyl (or dimethyl)ether), $CH_3O[CH_2CH(CH_3)O]_3(H$ or $CH_3)$ (tripropylene glycol methyl (or dimethyl)ether), $C_2H_5OCH_2CH(CH_3)O(H$ or $C_2H_5)$ (propylene glycol ethyl (or diethyl)ether), $C_2H_5O[CH_2CH(CH_3)O]_2(H$ or $C_2H_5)$ (dipropylene glycol ethyl (or diethyl)ether), $C_2H_5O[CH_2CH(CH_3)O]_3(H$ or $C_2H_5)$ (tripropylene glycol ethyl (or diethyl)ether), $C_3H_7OCH_2CH(CH_3)O(H$ or $C_3H_7)$ (propylene glycol n-propyl (or di-n-propyl)ether), $C_3H_7O[CH_2CH(CH_3)O]_2(H$ or $C_3H_7)$ (dipropylene glycol n-propyl (or di-n-propyl)ether), $C_3H_7O[CH_2CH(CH_3)O]_3(H$ or $C_3H_7)$ (tripropylene glycol n-propyl (or di-n-propyl)ether), $C_4H_9OCH_2CH(CH_3)OH$ (propylene glycol n-butyl ether), $C_4H_9O[CH_2CH(CH_3)O]_2(H$ or $C_4H_9)$ (dipropylene glycol n-butyl (or di-n-butyl)ether), $C_4H_9O[CH_2CH(CH_3)O]_3(H$ or $C_4H_9)$ (tripropylene glycol n-butyl (or di-n-butyl)ether), $(CH_3)_3COCH_2CH(CH_3)OH$ (propylene glycol t-butyl ether), $(CH_3)_3CO[CH_2CH(CH_3)O]_2(H$ or $(CH_3)_3)$ (dipropylene glycol t-butyl (or di-t-butyl)ether), $(CH_3)_3CO[CH_2CH(CH_3)O]_3(H$ or $(CH_3)_3)$ (tripropylene glycol t-butyl (or di-t-butyl)ether), $C_5H_{11}OCH_2CH(CH_3)OH$ (propylene glycol n-pentyl ether), $C_4H_9OCH_2CH(C_2H_5)OH$ (butylene glycol n-butyl ether), $C_4H_9O[CH_2CH(C_2H_5)O]_2H$ (dibutylene glycol n-butyl ether), trimethylolpropane tri-n-butyl ether $(C_2H_5C(CH_2—O—(CH_2)_3CH_3)_3)$ and trimethylolpropane di-n-butyl ether $(C_2H_5C(CH_2OC(CH_2)_3CH_3)_2CH_2OH)$.

Amide compatibilizers of the present invention comprise those represented by the formulae $R^1C(O)NR^2R^3$ and cyclo-$[R^4C(O)N(R^5)]$, wherein $R^1$, $R^2$, $R^3$ and $R^5$ are independently selected from aliphatic and alicyclic hydrocarbon radicals having from 1 to 12 carbon atoms; $R^4$ is selected from aliphatic hydrocarbylene radicals having from 3 to 12 carbon atoms; and wherein said amides have a molecular weight of from about 100 to about 300 atomic mass units. The molecular weight of said amides is preferably from about 160 to about 250 atomic mass units. $R^1$, $R^2$, $R^3$ and $R^5$ may optionally include substituted hydrocarbon radicals, that is, radicals containing non-hydrocarbon substituents selected from halogens (e.g., fluorine, chlorine) and alkoxides (e.g. methoxy). $R^1$, $R^2$, $R^3$ and $R^5$ may optionally include heteroatom-substituted hydrocarbon radicals, that is, radicals, which contain the atoms nitrogen (aza-), oxygen (oxa-) or sulfur (thia-) in a radical chain otherwise composed of carbon atoms. In general, no more than three non-hydrocarbon substituents and heteroatoms, and preferably no more than one, will be present for each 10 carbon atoms in $R^{1-3}$, and the presence of any such non-hydrocarbon substituents and heteroatoms must be considered in applying the aforementioned molecular weight limitations. Preferred amide compatibilizers consist of carbon, hydrogen, nitrogen and oxygen. Representative $R^1$, $R^2$, $R^3$ and $R^5$ aliphatic and alicyclic hydrocarbon radicals include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers. A preferred embodiment of amide compatibilizers are those wherein $R^4$ in the aforementioned formula cyclo-$[R^4C(O)N(R^5)-]$ may be represented by the hydrocarbylene radical $(CR^6R^7)_n$, in other words, the formula: cyclo-$[(CR^6R^7)_nC(O)N(R^5)-]$ wherein: the previously-stated values for molecular weight apply; n is an integer from 3 to 5; $R^5$ is a saturated hydrocarbon radical containing 1 to 12 carbon atoms; $R^6$ and $R^7$ are independently selected (for each n) by the rules previously offered defining $R^{1-3}$. In the lactams represented by the formula: cyclo-$[RCR^6R^7)_nC(O)N(R^5)-]$, all $R^6$ and $R^7$ are preferably hydrogen, or contain a single saturated hydrocarbon radical among the n methylene units, and $R^5$ is a saturated hydrocarbon radical containing 3 to 12 carbon atoms. For example, 1-(saturated hydrocarbon radical)-5-methylpyrrolidin-2-ones.

Representative amide compatibilizers include but are not limited to: 1-octylpyrrolidin-2-one, 1-decylpyrrolidin-2-one, 1-octyl-5-methylpyrrolidin-2-one, 1-butylcaprolactam, 1-cyclohexylpyrrolidin-2-one, 1-butyl-5-methylpiperid-2-one, 1-pentyl-5-methylpiperid-2-one, 1-hexylcaprolactam, 1-hexyl-5-methylpyrrolidin-2-one, 5-methyl-1-pentylpiperid-2-one, 1,3-dimethylpiperid-2-one, 1-methylcaprolactam, 1-butyl-pyrrolidin-2-one, 1,5-dimethylpiperid-2-one, 1-decyl-5-methylpyrrolidin-2-one, 1-dodecylpyrrolid-2-one, N,N-dibutylformamide and N,N-diisopropylacetamide.

Ketone compatibilizers of the present invention comprise ketones represented by the formula $R^1C(O)R^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units. $R^1$ and $R^2$ in said ketones are preferably independently selected from aliphatic and alicyclic hydrocarbon radicals having 1 to 9 carbon atoms. The molecular weight of said ketones is preferably from about 100 to 200 atomic mass units. $R^1$ and $R^2$ may together form a hydrocarbylene radical connected and forming a five, six, or seven-membered ring cyclic ketone, for example, cyclopentanone, cyclohexanone, and cycloheptanone. $R^1$ and $R^2$ may optionally include substituted hydrocarbon radicals, that is, radicals containing non-hydrocarbon substituents selected from halogens (e.g., fluorine, chlorine) and alkoxides (e.g. methoxy). $R^1$ and $R^2$ may optionally include heteroatom-substituted hydrocarbon radicals, that is, radicals, which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$ and $R^2$, and the presence of any such non-hydrocarbon substituents and heteroatoms must be considered in applying the aforementioned molecular weight limitations. Representative $R^1$ and $R^2$ aliphatic, alicyclic and aryl hydrocarbon radicals in the general formula $R^1C(O)R^2$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl.

Representative ketone compatibilizers include but are not limited to: 2-butanone, 2-pentanone, acetophenone, butyrophenone, hexanophenone, cyclohexanone, cycloheptanone, 2-heptanone, 3-heptanone, 5-methyl-2-hexanone, 2-octanone, 3-octanone, diisobutyl ketone, 4-ethylcyclohexanone, 2-nonanone, 5-nonanone, 2-decanone, 4-decanone, 2-decalone, 2-tridecanone, dihexyl ketone and dicyclohexyl ketone.

Nitrile compatibilizers of the present invention comprise nitriles represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units. $R^1$ in said nitrile compatibilizers is preferably selected from aliphatic and alicyclic hydrocarbon radicals having 8 to 10 carbon atoms. The molecular weight of said nitrile compatibilizers is preferably from about 120 to about 140 atomic mass units. $R^1$ may optionally include substituted hydrocarbon radicals, that is, radicals containing non-hydrocarbon substituents selected from halogens (e.g., fluorine, chlorine) and alkoxides (e.g. methoxy). $R^1$ may optionally include heteroatom-substituted hydrocarbon radicals, that is, radicals, which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$, and the presence of any such non-hydrocarbon substituents and heteroatoms must be considered in applying the aforementioned molecular weight limitations. Representative $R^1$ aliphatic, alicyclic and aryl hydrocarbon radicals in the general formula $R^1CN$ include pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl.

Representative nitrile compatibilizers include but are not limited to: 1-cyanopentane, 2,2-dimethyl-4-cyanopentane, 1-cyanohexane, 1-cyanoheptane, 1-cyanooctane, 2-cyanooctane, 1-cyanononane, 1-cyanodecane, 2-cyanodecane, 1-cyanoundecane and 1-cyanododecane.

Chlorocarbon compatibilizers of the present invention comprise chlorocarbons represented by the formula $RCl_x$, wherein; x is selected from the integers 1 or 2; R is selected from aliphatic and alicyclic hydrocarbon radicals having 1 to 12 carbon atoms; and wherein said chlorocarbons have a molecular weight of from about 100 to about 200 atomic mass units. The molecular weight of said chlorocarbon compatibilizers is preferably from about 120 to 150 atomic mass units. Representative R aliphatic and alicyclic hydrocarbon radicals in the general formula $RCl_x$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers.

Representative chlorocarbon compatibilizers include but are not limited to: 3-(chloromethyl)pentane, 3-chloro-3-methylpentane, 1-chlorohexane, 1,6-dichlorohexane, 1-chloroheptane, 1-chlorooctane, 1-chlorononane, 1-chlorodecane, and 1,1,1-trichlorodecane.

Ester compatibilizers of the present invention comprise esters represented by the general formula $R^1CO_2R^2$, wherein $R^1$ and $R^2$ are independently selected from linear and cyclic, saturated and unsaturated, alkyl and aryl radicals. Preferred esters consist essentially of the elements C, H and O, have a molecular weight of from about 80 to about 550 atomic mass units.

Representative esters include but are not limited to: $(CH_3)_2CHCH_2OOC(CH_2)_{2-4}OCOCH_2CH(CH_3)_2$ (diisobutyl dibasic ester), ethyl hexanoate, ethyl heptanoate, n-butyl propionate, n-propyl propionate, ethyl benzoate, di-n-propyl phthalate, benzoic acid ethoxyethyl ester, dipropyl carbonate, "Exxate 700" (a commercial $C_7$ alkyl acetate), "Exxate 800" (a commercial $C_8$ alkyl acetate), dibutyl phthalate, and tert-butyl acetate.

Lactone compatibilizers of the present invention comprise lactones represented by structures [A], [B], and [C]:

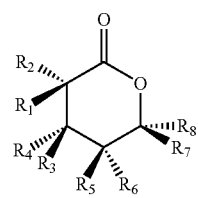

[A]

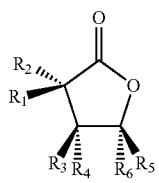

[B]

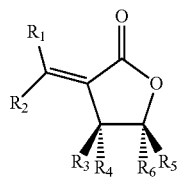

[C]

These lactones contain the functional group $-CO_2-$ in a ring of six (A), or preferably five atoms (B), wherein for structures [A] and [B], $R_1$ through $R_8$ are independently selected from hydrogen or linear, branched, cyclic, bicyclic, saturated and unsaturated hydrocarbyl radicals. Each $R_1$ though $R_8$ may be connected forming a ring with another $R_1$ through $R_8$. The lactone may have an exocyclic alkylidene group as in structure [C], wherein $R_1$ through $R_6$ are independently selected from hydrogen or linear, branched, cyclic, bicyclic, saturated and unsaturated hydrocarbyl radicals. Each $R_1$ though $R_6$ may be connected forming a ring with another $R_1$ through $R_6$. The lactone compatibilizers have a molecular weight range of from about 100 to about 300 atomic mass units, preferred from about 100 to about 200 atomic mass units.

Representative lactone compatibilizers include but are not limited to the compounds listed in Table 8.

TABLE 8

| Additive | Molecular Structure | Molecular Formula | Molecular Weight (amu) |
|---|---|---|---|
| (E,Z)-3-ethylidene-5-methyl-dihydro-furan-2-one | | $C_7H_{10}O_2$ | 126 |
| (E,Z)-3-propylidene-5-methyl-dihydro-furan-2-one | | $C_8H_{12}O_2$ | 140 |
| (E,Z)-3-butylidene-5-methyl-dihydro-furan-2-one | | $C_9H_{14}O_2$ | 154 |
| (E,Z)-3-pentylidene-5-methyl-dihydro-furan-2-one | | $C_{10}H_{16}O_2$ | 168 |
| (E,Z)-3-Hexylidene-5-methyl-dihydro-furan-2-one | | $C_{11}H_{18}O_2$ | 182 |

TABLE 8-continued

| Additive | Molecular Structure | Molecular Formula | Molecular Weight (amu) |
|---|---|---|---|
| (E,Z)-3-Heptylidene-5-methyl-dihydro-furan-2-one | | $C_{12}H_{20}O_2$ | 196 |
| (E,Z)-3-octylidene-5-methyl-dihydro-furan-2-one | | $C_{13}H_{22}O_2$ | 210 |
| (E,Z)-3-nonylidene-5-methyl-dihydro-furan-2-one | | $C_{14}H_{24}O_2$ | 224 |
| (E,Z)-3-decylidene-5-methyl-dihydro-furan-2-one | | $C_{15}H_{26}O_2$ | 238 |
| (E,Z)-3-(3,5,5-trimethylhexylidene)-5-methyl-dihydrofuran-2-one | | $C_{14}H_{24}O_2$ | 224 |
| (E,Z)-3-cyclohexylmethylidene-5-methyl-dihydrofuran-2-one | | $C_{12}H_{18}O_2$ | 194 |
| gamma-octalactone | | $C_8H_{14}O_2$ | 142 |
| gamma-nonalactone | | $C_9H_{16}O_2$ | 156 |
| gamma-decalactone | | $C_{10}H_{18}O_2$ | 170 |
| gamma-undecalactone | | $C_{11}H_{20}O_2$ | 184 |
| gamma-dodecalactone | | $C_{12}H_{22}O_2$ | 198 |
| 3-hexyldihydro-furan-2-one | | $C_{10}H_{18}O_2$ | 170 |
| 3-heptyldihydro-furan-2-one | | $C_{11}H_{20}O_2$ | 184 |

TABLE 8-continued

| Additive | Molecular Formula | Molecular Weight (amu) |
|---|---|---|
| cis-3-ethyl-5-methyl-dihydro-furan-2-one | $C_7H_{12}O_2$ | 128 |
| cis-(3-propyl-5-methyl)-dihydro-furan-2-one | $C_8H_{14}O_2$ | 142 |
| cis-(3-butyl-5-methyl)-dihydro-furan-2-one | $C_9H_{16}O_2$ | 156 |
| cis-(3-pentyl-5-methyl)-dihydro-furan-2-one | $C_{10}H_{18}O_2$ | 170 |
| cis-3-hexyl-5-methyl-dihydro-furan-2-one | $C_{11}H_{20}O_2$ | 184 |
| cis-3-heptyl-5-methyl-dihydro-furan-2-one | $C_{12}H_{22}O_2$ | 198 |
| cis-3-octyl-5-methyl-dihydro-furan-2-one | $C_{13}H_{24}O_2$ | 212 |
| cis-3-(3,5,5-trimethylhexyl)-5-methyl-dihydro-furan-2-one | $C_{14}H_{26}O_2$ | 226 |
| cis-3-cyclohexylmethyl-5-methyl-dihydro-furan-2-one | $C_{12}H_{20}O_2$ | 196 |

TABLE 8-continued

| Additive | Molecular Structure | Molecular Formula | Molecular Weight (amu) |
|---|---|---|---|
| 5-methyl-5-hexyl-dihydro-furan-2-one | | $C_{11}H_{20}O_2$ | 184 |
| 5-methyl-5-octyl-dihydro-furan-2-one | | $C_{13}H_{24}O_2$ | 212 |
| Hexahydro-isobenzofuran-1-one | | $C_8H_{12}O_2$ | 140 |
| delta-decalactone | | $C_{10}H_{18}O_2$ | 170 |
| delta-undecalactone | | $C_{11}H_{20}O_2$ | 184 |
| delta-dodecalactone | | $C_{12}H_{22}O_2$ | 198 |
| mixture of 4-hexyl-dihydrofuran-2-one and 3-hexyl-dihydro-furan-2-one | | $C_{10}H_{18}O_2$ | 170 |

Lactone compatibilizers generally have a kinematic viscosity of less than about 7 centistokes at 40° C. For instance, gamma-undecalactone has kinematic viscosity of 5.4 centistokes and cis-(3-hexyl-5-methyl)dihydrofuran-2-one has viscosity of 4.5 centistokes both at 40° C. Lactone compatibilizers may be available commercially or prepared by methods as described in U.S. patent application Ser. No. 10/910,495 filed Aug. 3, 2004, incorporated herein by reference.

Aryl ether compatibilizers of the present invention further comprise aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units. Representative $R^1$ aryl radicals in the general formula $R^1OR^2$ include phenyl, biphenyl, cumenyl, mesityl, tolyl, xylyl, naphthyl and pyridyl. Representative $R^2$ aliphatic hydrocarbon radicals in the general formula $R^1OR^2$ include methyl, ethyl, propyl, isopropyl, butyl, isobutyl, sec-butyl and tert-butyl. Representative aromatic ether compatibilizers include but are not limited to: methyl phenyl ether (anisole), 1,3-dimethyoxybenzene, ethyl phenyl ether and butyl phenyl ether.

Fluoroether compatibilizers of the present invention comprise those represented by the general formula $R^1OCF_2CF_2H$, wherein $R^1$ is selected from aliphatic, alicyclic, and aromatic hydrocarbon radicals having from about 5 to about 15 carbon atoms, preferably primary, linear, saturated, alkyl radicals. Representative fluoroether compatibilizers include but are not limited to: $C_8H_{17}OCF_2CF_2H$ and $C_6H_{13}OCF_2CF_2H$. It should be noted that if the refrigerant is a fluoroether, then the compatibilizer may not be the same fluoroether.

Fluoroether compatibilizers may further comprise ethers derived from fluoroolefins and polyols. The fluoroolefins may be of the type $CF_2=CXY$, wherein X is hydrogen, chlorine or fluorine, and Y is chlorine, fluorine, $CF_3$ or $OR_f$, wherein $R_f$ is $CF_3$, $C_2F_5$, or $C_3F_7$. Representative fluoroolefins are tetrafluoroethylene, chlorotrifluoroethylene, hexafluoropropylene, and perfluoromethylvinyl ether. The polyols may be linear or branched. Linear polyols may be of the type $HOCH_2(CHOH)_x(CRR')_yCH_2OH$, wherein R and R' are hydrogen, or $CH_3$, or $C_2H_5$ and wherein x is an integer from 0-4, and y is an integer from 0-4. Branched polyols may be of the type $C(OH)_t(R)_u(CH_2OH)_v[(CH_2)_mCH_2OH]_w$, wherein R may be hydrogen, $CH_3$ or $C_2H_5$, m may be an integer from 0 to 3, t and u may be 0 or 1, v and w are integers from 0 to 4, and also wherein t+u+v+w=4. Representative polyols are trimethylol propane, pentaerythritol, butanediol, and ethylene glycol.

1,1,1-trifluoroalkane compatibilizers of the present invention comprise 1,1,1-trifluoroalkanes represented by the general formula $CF_3R^1$, wherein $R^1$ is selected from aliphatic and alicyclic hydrocarbon radicals having from about 5 to about 15 carbon atoms, preferably primary, linear, saturated, alkyl radicals. Representative 1,1,1-trifluoroalkane compatibilizers include but are not limited to: 1,1,1-trifluorohexane and 1,1,1-trifluorododecane.

By effective amount of compatibilizer is meant that amount of compatibilizer that leads to efficient solubilizing of the lubricant in the composition and thus provides adequate oil return to optimize operation of the refrigeration, air-conditioning or heat pump apparatus.

The compositions of the present invention will typically contain from about 0.1 to about 40 weight percent, preferably from about 0.2 to about 20 weight percent, and most preferably from about 0.3 to about 10 weight percent compatibilizer in the compositions of the present invention.

The present invention further relates to a method for improving oil-return to the compressor in a compression refrigeration, air-conditioning or heat pump apparatus, said method comprising using a composition of the present invention comprising a compatibilizer in said apparatus. The compatibilizer is selected from the group consisting of hydrocarbons, dimethylether, polyoxyalkylene glycol ethers, amides, ketones, nitriles, chlorocarbons, esters, lactones, aryl ethers, hydrofluoroethers, hydrocarbon ethers and 1,1,11-trifluoroalkanes.

The present invention further relates to a method of solubilizing a refrigerant or heat transfer fluid composition comprising the compositions of the present invention in a refrigeration lubricant selected from the group consisting of mineral oils, alkylbenzenes, synthetic paraffins, synthetic napthenes, and poly(alpha)olefins, wherein said method comprises contacting said lubricant with said composition in the presence of an effective amount of a compatibilizer, wherein said compatibilizer is selected from the group consisting of polyoxyalkylene glycol ethers, amides, nitriles, ketones, chlorocarbons, esters, lactones, aryl ethers, fluoroethers and 1,1,1-trifluoroalkanes.

The compositions of the present invention may further comprise an ultra-violet (UV) dye and optionally a solubilizing agent. The UV dye is a useful component for detecting leaks of the composition by permitting one to observe the fluorescence of the dye in the composition at a leak point or in the vicinity of refrigeration, air-conditioning, or heat pump apparatus. One may observe the fluoroscence of the dye under an ultra-violet light. Solubilizing agents may be needed due to poor solubility of such UV dyes in some compositions.

By "ultra-violet" dye is meant a UV fluorescent composition that absorbs light in the ultra-violet or "near" ultra-violet region of the electromagnetic spectrum. The fluorescence produced by the UV fluorescent dye under illumination by a UV light that emits radiation with wavelength anywhere from 10 nanometer to 750 nanometer may be detected. Therefore, if a composition containing such a UV fluorescent dye is leaking from a given point in a refrigeration, air-conditioning, or heat pump apparatus, the fluorescence can be detected at the leak point. Such UV fluorescent dyes include but are not limited to naphthalimides, perylenes, coumarins, anthracenes, phenanthracenes, xanthenes, thioxanthenes, naphthoxanthenes, fluoresceins, and derivatives or combinations thereof.

In accordance with the present invention, there is provided a method for detecting the composition of the present invention comprising the dye as described in the previous sentence in a compression refrigeration, air conditioning or heat pump apparatus. This method comprises providing the composition to the apparatus and providing a suitable means for detecting this composition at a leak point or in the vicinity of the apparatus.

Solubilizing agents of the present invention comprise at least one compound selected from the group consisting of hydrocarbons, hydrocarbon ethers, dimethylether, polyoxyalkylene glycol ethers, amides, nitriles, ketones, chlorocarbons, esters, lactones, aryl ethers, fluoroethers and 1,1,1-trifluoroalkanes. The polyoxyalkylene glycol ethers, amides, nitriles, ketones, chlorocarbons, esters, lactones, aryl ethers, fluoroethers and 1,1,1-trifluoroalkanes solubilizing agents have been defined previously herein as being compatibilizers for use with conventional refrigeration lubricants.

Hydrocarbon solubilizing agents of the present invention comprise hydrocarbons including straight chained, branched chain or cyclic alkanes or alkenes containing 5 or fewer carbon atoms and only hydrogen with no other functional groups. Representative hydrocarbon solubilizing agents comprise propane, propylene, cyclopropane, n-butane, isobutane, 2-methylbutane and n-pentane. It should be noted that if the composition contains a hydrocarbon, then the solubilizing agent may not be the same hydrocarbon.

Hydrocarbon ether solubilizing agents of the present invention comprise ethers containing only carbon, hydrogen and oxygen, such as dimethyl ether (DME).

Solubilizing agents of the present invention may be present as a single compound, or may be present as a mixture of more than one solubilizing agent. Mixtures of solubilizing agents may contain two solubilizing agents from the same class of compounds, say two lactones, or two solubilizing agents from two different classes, such as a lactone and a polyoxyalkylene glycol ether.

In the present compositions comprising refrigerant and UV fluorescent dye, or comprising heat transfer fluid and UV fluorescent dye, from about 0.001 weight percent to about 1.0 weight percent of the composition is UV dye, preferably from about 0.005 weight percent to about 0.5 weight percent, and most preferably from 0.01 weight percent to about 0.25 weight percent.

Solubilizing agents such as ketones may have an objectionable odor, which can be masked by addition of an odor masking agent or fragrance. Typical examples of odor masking agents or fragrances may include Evergreen, Fresh Lemon, Chemy, Cinnamon, Peppermint, Floral or Orange Peel all commercially available, as well as d-limonene and pinene.

Such odor masking agents may be used at concentrations of from about 0.001% to as much as about 15% by weight based on the combined weight of odor masking agent and solubilizing agent.

Solubility of these UV fluorescent dyes in the compositions of the present invention may be poor. Therefore, methods for introducing these dyes into the refrigeration, air-conditioning, or heat pump apparatus have been awkward, costly and time consuming. U.S. Pat. No. RE 36,951 describes a method, which utilizes a dye powder, solid pellet or slurry of dye that may be inserted into a component of the refrigeration, air-conditioning, or heat pump apparatus. As refrigerant and lubricant are circulated through the apparatus, the dye is dissolved or dispersed and carried throughout the apparatus. Numerous other methods for introducing dye into a refrigeration or air conditioning apparatus are described in the literature.

Ideally, the UV fluorescent dye could be dissolved in the refrigerant itself thereby not requiring any specialized method for introduction to the refrigeration, air conditioning apparatus, or heat pump. The present invention relates to compositions including UV fluorescent dye, which may be introduced into the system as a solution in the refrigerant. The inventive compositions will allow the storage and transport of dye-containing compositions even at low temperatures while maintaining the dye in solution.

In the present compositions comprising refrigerant, UV fluorescent dye and solubilizing agent, or comprising heat transfer fluid and UV fluorescent dye and solubilizing agent, from about 1 to about 50 weight percent, preferably from about 2 to about 25 weight percent, and most preferably from about 5 to about 15 weight percent of the combined composition is solubilizing agent. In the compositions of the present invention the UV fluorescent dye is present in a concentration from about 0.001 weight percent to about 1.0 weight percent, preferably from 0.005 weight percent to about 0.5 weight percent, and most preferably from 0.01 weight percent to about 0.25 weight percent.

The present invention further relates to a method of using the compositions further comprising ultraviolet fluorescent dye, and optionally, solubilizing agent, in refrigeration, air-conditioning, or heat pump apparatus. The method comprises introducing the composition into the refrigeration, air-conditioning, or heat pump apparatus. This may be done by dissolving the UV fluorescent dye in the composition in the presence of a solubilizing agent and introducing the combination into the apparatus. Alternatively, this may be done by combining solubilizing agent and UV fluorescent dye and introducing said combination into refrigeration or air-conditioning apparatus containing refrigerant and/or heat transfer fluid. The resulting composition may be used in the refrigeration, air-conditioning, or heat pump apparatus.

The present invention further relates to a method of using the compositions comprising ultraviolet fluorescent dye to detect leaks. The presence of the dye in the compositions allows for detection of leaking refrigerant in a refrigeration, air-conditioning, or heat pump apparatus. Leak detection helps to address, resolve or prevent inefficient operation of the apparatus or system or equipment failure. Leak detection also helps one contain chemicals used in the operation of the apparatus.

The method comprises providing the composition according to the present invention comprising refrigerant, ultraviolet fluorescent dye, as described herein, and optionally, a solubilizing agent as described herein, to refrigeration, air-conditioning, or heat pump apparatus and employing a suitable means for detecting the UV fluorescent dye-containing refrigerant at a leak point or in the vicinity of the apparatus. Suitable means for detecting the dye include, but are not limited to, ultra-violet lamps, often referred to as a "black light" or "blue light". Such ultra-violet lamps are commercially available from numerous sources specifically designed for this purpose. Once the ultra-violet fluorescent dye containing composition has been introduced to the refrigeration, air-conditioning, or heat pump apparatus and has been allowed to circulate throughout the system, a leak can be found by shining said ultra-violet lamp on the apparatus and observing the fluorescence of the dye in the vicinity of any leak point.

The present invention further relates to a method for replacing a high GWP refrigerant in a refrigeration, air-conditioning, or heat pump apparatus, wherein said high GWP refrigerant is selected from the group consisting of R134a, R22, R11, R245fa, R114, R236fa, R124, R410A, R407c, R417A, R422A, R422B, R422c and R422D, R507A, and R404A, said method comprising providing a composition of the present invention to said refrigeration, air-conditioning, or heat pump apparatus that uses, used or is designed to use said high GWP refrigerant.

In a particular embodiment of the method as described in the paragraph above the high GWP refrigerant is selected from the group consisting of R134a, R22, R123, R11, R245fa, R114, R236fa, R124, R12, R410A, R407c, R417A, R422A, R422B, R422c and R422D, R507A, R502, and R404A as described above. The method further comprises providing a composition to said refrigeration, air-conditioning, or heat pump apparatus that uses, used or designed to use said high GWP refrigerant, wherein the composition is selected from the group consisting of: about 1 weight percent to about 99 weight percent HFC-1225ye and about 99 weight percent to about 1 weight percent HFC-152a; about 1 weight percent to about 99 weight percent HFC-1225ye and about 99 weight percent to about 1 weight percent HFC-1234yf; about 1 weight percent to about 99 weight percent HFC-1225ye and about 99 weight percent to about 1 weight percent trans-HFC-1234ze; about 1 weight percent to about 99 weight percent HFC-1225ye and about 99 weight percent to about 1 weight percent HFC-1243zf; about 1 weight percent to about 99 weight percent trans-HFC-1234ze and about 99 weight percent to about 1 weight percent HFC-134a; about 1 weight percent to about 99 weight percent trans-HFC-1234ze and about 99 weight percent to about 1 weight percent HFC-152a; about 1 weight percent to about 99 weight percent trans-HFC-1234ze and about 99 weight percent to about 1 weight percent HFC-227ea; and about 1 weight percent to about 99 weight percent trans-HFC-1234ze and about 99 weight percent to about 1 weight percent $CF_3I$.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

According to the present invention, there is provided a refrigeration, air-conditioning or heat pump apparatus containing a composition of the present invention. In particular, the refrigeration or air-conditioning apparatus may be a mobile apparatus.

As used herein, mobile refrigeration apparatus or mobile air-conditioning apparatus refers to any refrigeration or air-conditioning apparatus incorporated into a transportation unit for the road, rail, sea or air. In addition, apparatus, which are meant to provide refrigeration or air-conditioning for a system independent of any moving carrier, known as "intermodal" systems, are included in the present invention. Such intermodal systems include "containers" (combined sea/land transport) as well as "swap bodies" (combined road and rail transport). The present invention is particularly useful for road transport refrigerating or air-conditioning apparatus, such as automobile air-conditioning apparatus or refrigerated road transport equipment.

The compositions of the present invention may also be useful in stationary air-conditioning and heat pumps, e.g. chillers, high temperature heat pumps, residential and light commercial and commercial air-conditioning systems. In stationary refrigeration applications, the present compositions may be useful in equipment such as domestic refrigerators, ice machines, walk-in and reach-in coolers and freezers, and supermarket systems.

The present invention further relates to a method of producing cooling comprising evaporating any of the compositions of the present invention in the vicinity of a body to be cooled, and thereafter condensing said composition.

The present invention further relates to a method of producing heat comprising condensing any of the compositions of the present invention in the vicinity of a body to be heated, and thereafter evaporating said compositions.

The present invention further relates to a refrigeration, air-conditioning, or heat pump apparatus containing a composition of the present invention wherein said composition comprises at least one fluoroolefin.

The present invention further relates to a mobile air-conditioning apparatus containing a composition of the present invention wherein said composition comprises at least one fluoroolefin.

The present invention further relates to a method for early detection of a refrigerant leak in a refrigeration, air-conditioning or heat pump apparatus. The method comprising using a non-azeotropic composition in said apparatus, and monitoring for a reduction in cooling performance. The non-azeotropic compositions will fractionate upon leakage from a refrigeration, air-conditioning or heat pump apparatus and the lower boiling (higher vapor pressure) component will leak out of the apparatus first. When this occurs, if the lower boiling component in that composition provides the majority of the refrigeration capacity, there will be a marked reduction in the capacity and thus performance of the apparatus. In an automobile air-conditioning system, as an example, the passengers in the automobile will detect a reduction in the cooling capability of the system. This reduction in cooling capability can be interpreted to mean that refrigerant is being leaked and that the system requires repair.

The present invention further relates to a method of using the composition of the present invention as a heat transfer fluid composition. The method comprises transporting said composition from a heat source to a heat sink.

Heat transfer fluids are utilized to transfer, move or remove heat from one space, location, object or body to a different space, location, object or body by radiation, conduction, or convection. A heat transfer fluid may function as a secondary coolant by providing means of transfer for cooling (or heating) from a remote refrigeration (or heating) system. In some systems, the heat transfer fluid may remain in a constant state throughout the transfer process (i.e., not evaporate or condense). Alternatively, evaporative cooling processes may utilize heat transfer fluids as well.

A heat source may be defined as any space, location, object or body from which it is desirable to transfer, move or remove heat. Examples of heat sources may be spaces (open or enclosed) requiring refrigeration or cooling, such as refrigerator or freezer cases in a supermarket, building spaces requiring air-conditioning, or the passenger compartment of an automobile requiring air-conditioning. A heat sink may be defined as any space, location, object or body capable of absorbing heat. A vapor compression refrigeration system is one example of such a heat sink.

In certain embodiments, particular combinations of the components described above may be used, and in particular weight percentages. The following compositions are meant to be exemplary of such embodiments, without limiting the scope of the compositions of the present invention to the following.

In one embodiment, the present invention relates to a composition comprising: at least one lubricant selected from the group consisting of polyol esters, polyalkylene glycol, polyvinyl ethers, mineral oils, alkylbenzenes, synthetic paraffins, synthetic napthenes, and poly(alpha)olefins; and a composition selected from the group consisting of: about 1 weight percent to about 99 weight percent HFC-1225ye and about 99 weight percent to about 1 weight percent HFC-152a; about 1 weight percent to about 99 weight percent HFC-1225ye and about 99 weight percent to about 1 weight percent HFC-1234yf; about 1 weight percent to about 99 weight percent HFC-1225ye and about 99 weight percent to about 1 weight percent trans-HFC-1234ze; about 1 weight percent to about 99 weight percent HFC-1225ye and about 99 weight percent to about 1 weight percent HFC-1243zf; about 1 weight percent to about 99 weight percent trans-HFC-1234ze and about 99 weight percent to about 1 weight percent HFC-134a; about 1 weight percent to about 99 weight percent trans-HFC-1234ze and about 99 weight percent to about 1 weight percent HFC-152a; about 1 weight percent to about 99 weight percent trans-HFC-1234ze and about 99 weight percent to about 1 weight percent HFC-227ea; and about 1 weight percent to about 99 weight percent trans-HFC-1234ze and about 99 weight percent to about 1 weight percent $CF_3I$.

In another embodiment, the present invention relates to a composition comprising: a refrigerant or heat transfer fluid composition selected from the group consisting of: about 1 weight percent to about 99 weight percent HFC-1225ye and about 99 weight percent to about 1 weight percent HFC-152a; about 1 weight percent to about 99 weight percent HFC-1225ye and about 99 weight percent to about 1 weight percent HFC-1234yf; about 1 weight percent to about 99 weight percent HFC-1225ye and about 99 weight percent to about 1 weight percent trans-HFC-1234ze; about 1 weight percent to about 99 weight percent HFC-1225ye and about 99 weight percent to about 1 weight percent HFC-1243zf; about 1 weight percent to about 99 weight percent trans-HFC-1234ze and about 99 weight percent to about 1 weight percent HFC- 134a; about 1 weight percent to about 99 weight percent trans-HFC-1234ze and about 99 weight percent to about 1 weight percent HFC-152a; about 1 weight percent to about 99 weight percent trans-HFC-1234ze and about 99 weight percent to about 1 weight percent HFC-227ea; and about 1 weight percent to about 99 weight percent trans-HFC-1234ze and about 99 weight percent to about 1 weight percent $CF_3I$. The composition also comprises a compatibilizer selected from the group consisting of: i) polyoxyalkylene glycol ethers represented by the formula $R^1[(OR^2)_xOR^3]_y$, wherein: x is an integer from 1 to 3; y is an integer from 1 to 4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen, and aliphatic and alicyclic hydrocarbon radicals having from 1 to 6 carbon atoms; at least one of $R^1$ and $R^3$ is selected from said hydrocarbon radicals; and wherein said polyoxyalkylene glycol ethers have a molecular weight of from about 100 to about 300 atomic mass units; ii) amides represented by the formulae $R^1C(O)NR^2R^3$ and cyclo-$[R^4CON(R^5)$-$]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 100 to about 300 atomic mass units; iii) ketones represented by the formula $R^1C(O)R^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units; iv) nitriles represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units; v) chlorocarbons represented by the formula $RCl_x$, wherein; x is 1 or 2; R is selected from aliphatic and alicyclic hydrocarbon radicals having from 1 to 12 carbon atoms; and wherein said chlorocarbons have a molecular weight of from about 100 to about 200 atomic mass units; vi) aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units; vii) 1,1,1-trifluoroalkanes represented by the formula $CF_3R^1$, wherein $R^1$ is selected from aliphatic and alicyclic hydrocarbon radicals having from about 5 to about 15 carbon atoms; viii) fluoroethers represented by the formula $R^1OCF_2CF_2H$, wherein $R^1$ is selected from aliphatic, alicyclic, and aromatic hydrocarbon radicals having from about 5 to about 15 carbon atoms; or wherein said fluoroethers are derived from fluoroolefins and polyols, wherein said fluoroolefins are of the type $CF_2=CXY$, wherein X is hydrogen, chlorine or fluorine, and Y is chlorine, fluorine, $CF_3$ or $OR_f$, wherein $R_f$ is $CF_3$, $C_2F_5$, or $C_3F_7$; and said polyols are linear or branched, wherein said linear polyols are of the type $HOCH_2(CHOH)_x(CRR')_yCH_2OH$, wherein R and R' are hydrogen, $CH_3$ or $C_2H_5$, x is an integer from 0-4, y is an integer from 0-3 and z is either zero or 1, and said branched polyols are of the type $C(OH)_t(R)_u(CH_2OH)_v[(CH_2)_mCH_2OH]_w$, wherein R may be hydrogen, $CH_3$ or $C_2H_5$, m is an integer from 0 to 3, t and u are 0 or 1, v and w are integers from 0 to 4, and also wherein $t+u+v+w=4$; and ix) lactones represented by structures [B], [C], and [D]:

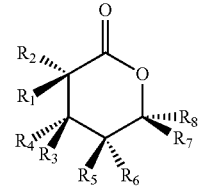

[B]

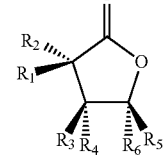

[C]

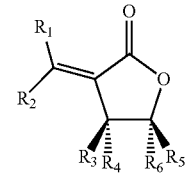

[D]

wherein, $R_1$ through $R_8$ are independently selected from hydrogen, linear, branched, cyclic, bicyclic, saturated and unsaturated hydrocarbyl radicals; and the molecular weight is from about 100 to about 300 correct atomic mass units; and x) esters represented by the general formula $R^1CO_2R^2$, wherein $R^1$ and $R^2$ are independently selected from linear and cyclic, saturated and unsaturated, alkyl and aryl radicals; and wherein said esters have a molecular weight of from about 80 to about 550 atomic mass units.

According to the present invention, there is provided a refrigeration, air-conditioning or heat pump apparatus containing a composition as described in the paragraph above. In particular, the refrigeration or air-conditioning apparatus may be a mobile apparatus.

Further in accordance with this particular embodiment, the present invention relates to a method for improving oil-return to a compressor in a compression refrigeration, air-conditioning or heat pump apparatus. The method comprises using the composition as described in the paragraph above in the compression refrigeration, air-conditioning or heat pump apparatus.

In another particular embodiment, the present invention relates to a composition comprising (a) at least one ultraviolet fluorescent dye selected from the group consisting of naphthalimides, perylenes, coumarins, anthracenes, phenanthracenes, xanthenes, thioxanthenes, naphthoxanthenes, fluoresceins, derivatives of said dye and combinations thereof; and (b) a composition selected from the group consisting of: about 1 weight percent to about 99 weight percent HFC-1225ye and about 99 weight percent to about 1 weight percent HFC-152a; about 1 weight percent to about 99 weight percent HFC-1225ye and about 99 weight percent to about 1 weight percent HFC-1234yf; about 1 weight percent to about 99 weight percent HFC-1225ye and about 99 weight percent to about 1 weight percent trans-HFC-1234ze; about 1 weight percent to about 99 weight percent HFC-1225ye and about 99 weight percent to about 1 weight percent HFC-1243zf; about 1 weight percent to about 99 weight percent trans-HFC-1234ze and about 99 weight percent to about 1 weight percent HFC-134a; about 1 weight percent to about 99 weight percent trans-HFC-1234ze and about 99 weight percent to about 1 weight percent HFC-152a; about 1 weight percent to about 99 weight percent trans-HFC-1234ze and about 99 weight percent to about 1 weight percent HFC-227ea; and about 1 weight percent to about 99 weight percent trans-HFC-1234ze and about 99 weight percent to about 1 weight percent $CF_3I$.

In accordance with the present invention, there is provided a method for detecting the composition comprising the dye as described in the previous paragraph in a compression refrigeration, air conditioning or heat pump apparatus. This method comprises providing the composition to the apparatus and providing a suitable means for detecting this composition at a leak point or in the vicinity of the apparatus.

According to the present invention, there is provided a refrigeration, air-conditioning or heat pump apparatus containing a composition as described two paragraphs above. In particular, the refrigeration or air-conditioning apparatus may be a mobile apparatus.

Further in accordance with this particular embodiment, the composition including (a) and (b) described three paragraphs above further includes a solubilizing agent selected from the group consisting of hydrocarbons, dimethylether, polyoxyalkylene glycol ethers, amides, ketones, nitriles, chlorocarbons, esters, lactones, aryl ethers, hydrofluoroethers and 1,1,1-trifluoroalkanes.

In accordance with the present invention, there is provided a method for detecting the composition comprising the dye as described in the previous paragraph in a compression refrigeration, air conditioning or heat pump apparatus. This method comprises providing the composition to the apparatus and providing a suitable means for detecting this composition at a leak point or in the vicinity of the apparatus.

The solubilizing agent of the composition described in the paragraph above is selected from the group consisting of: i) polyoxyalkylene glycol ethers represented by the formula $R^1[(OR^2)_xOR^3]_y$, wherein: x is an integer from 1 to 3; y is an integer from 1 to 4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen, and aliphatic and alicyclic hydrocarbon radicals having from 1 to 6 carbon atoms; at least one of $R^1$ and $R^3$ is selected from said hydrocarbon radicals; and wherein said polyoxyalkylene glycol ethers have a molecular weight of from about 100 to about 300 atomic mass units; ii) amides represented by the formulae $R^1C(O)NR^2R^3$ and cyclo-$[R^4CON(R^5)—]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 100 to about 300 atomic mass units; iii) ketones represented by the formula $R^1C(O)R^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units; iv) nitriles represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units; v) chlorocarbons represented by the formula $RCl_x$, wherein; x is 1 or 2; R is selected from aliphatic and alicyclic hydrocarbon radicals having from 1 to 12 carbon atoms; and wherein said chlorocarbons have a molecular weight of from about 100 to about 200 atomic mass units; vi) aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units; vii) 1,1,1-trifluoroalkanes represented by the formula $CF_3R^1$, wherein $R^1$ is selected from aliphatic and alicyclic hydrocarbon radicals having from about 5 to about 15 carbon atoms; viii) fluoroethers represented by the formula $R^1OCF_2CF_2H$, wherein $R^1$ is selected from aliphatic, alicyclic, and aromatic hydrocarbon radicals having from about 5 to about 15 carbon atoms; or wherein said fluoroethers are derived from fluoroolefins and polyols, wherein said fluoroolefins are of the type $CF_2=CXY$, wherein X is hydrogen, chlorine or fluorine, and Y is chlorine, fluorine, $CF_3$ or $OR_f$, wherein $R_f$ is $CF_3$, $C_2F_5$, or $C_3F_7$; and said polyols are linear or branched, wherein said linear polyols are of the type $HOCH_2(CHOH)_x(CRR')_yCH_2OH$, wherein R and R' are hydrogen, $CH_3$ or $C_2H_5$, x is an integer from 0-4, y is an integer from 0-3 and z is either zero or 1, and said branched polyols are of the type $C(OH)_t(R)_u(CH_2OH)_v[(CH_2)_mCH_2OH]_w$, wherein R may be hydrogen, $CH_3$ or $C_2H_5$, m is an integer from 0 to 3, t and u are 0 or 1, v and w are integers from 0 to 4, and also wherein t+u+v+w=4; and ix) lactones represented by structures [B], [C], and [D]:

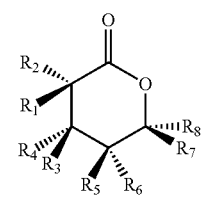

[B]

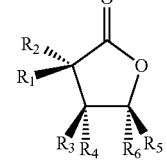

[C]

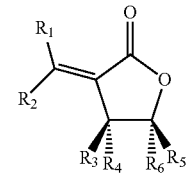

[D]

wherein, $R_1$ through $R_8$ are independently selected from hydrogen, linear, branched, cyclic, bicyclic, saturated and unsaturated hydrocarbyl radicals; and the molecular weight is from about 100 to about 300 atomic mass units; and x) esters represented by the general formula $R^1CO_2R^2$, wherein $R^1$ and $R^2$ are independently selected from linear and cyclic, saturated and unsaturated, alkyl and aryl radicals; and wherein said esters have a molecular weight of from about 80 to about 550 atomic mass units.

The particular composition which includes a compatibilizer as described above, or which includes a dye as described above, or which includes a dye and a solubilizing agent as described above may be used in a method of producing cooling. The method of producing cooling comprises evaporating this composition in the vicinity of a body to be cooled and thereafter condensing said composition. These particular compositions may also be used in a method of producing heat. The method of producing heat comprises condensing this composition in the vicinity of a body to be heated and thereafter evaporating said composition.

In another particular embodiment, the present invention further relates to a method of solubilizing a refrigerant or heat transfer fluid composition of the present invention in a refrigeration lubricant selected from the group consisting of mineral oils, alkylbenzenes, synthetic paraffins, synthetic napthenes, and poly(alpha)olefins, wherein said method comprises contacting said lubricant with said refrigerant or heat transfer fluid composition in the presence of an effective amount of a compatibilizer, wherein said compatibilizer is selected from the group consisting of:
a) polyoxyalkylene glycol ethers represented by the formula $R^1[(OR^2)_xOR^3]_y$, wherein: x is an integer from 1 to 3; y is an integer from 1 to 4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen, and aliphatic and alicyclic hydrocarbon radicals having from 1 to 6 carbon atoms; at least one of $R^1$ and $R^3$ is selected from said hydrocarbon radicals; and wherein said polyoxyalkylene glycol ethers have a molecular weight of from about 100 to about 300 atomic mass units; b) amides represented by the formulae $R^1C(O)NR^2R^3$ and cyclo-$[R^4CON(R^5)-]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 100 to about 300 atomic mass units; c) ketones represented by the formula $R^1C(O)R^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units; d) nitriles represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units; e) chlorocarbons represented by the formula $RCl_x$, wherein; x is 1 or 2; R is selected from aliphatic and alicyclic hydrocarbon radicals having from 1 to 12 carbon atoms; and wherein said chlorocarbons have a molecular weight of from about 100 to about 200 atomic mass units; f) aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units; g) 1,1,1-trifluoroalkanes represented by the formula $CF_3R^1$, wherein $R^1$ is selected from aliphatic and alicyclic hydrocarbon radicals having from about 5 to about 15 carbon atoms; h) fluoroethers represented by the formula $R^1OCF_2CF_2H$, wherein $R^1$ is selected from aliphatic and alicyclic hydrocarbon radicals having from about 5 to about 15 carbon atoms; or wherein said fluoroethers are derived from fluoro-olefins and polyols, wherein said fluoro-olefins are of the type $CF_2=CXY$, wherein X is hydrogen, chlorine or fluorine, and Y is chlorine, fluorine, $CF_3$ or $OR_f$, wherein $R_f$ is $CF_3$, $C_2F_5$, or $C_3F_7$; and said polyols are of the type $HOCH_2CRR'(CH_2)_z(CHOH)_xCH_2(CH_2OH)_y$, wherein R and R' are hydrogen, $CH_3$ or $C_2H_5$, x is an integer from 0-4, y is an integer from 0-3 and z is either zero or 1; and i) lactones represented by structures [B], [C], and [D]:

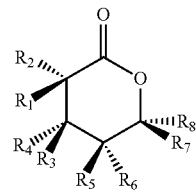

[B]

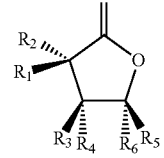

[C]

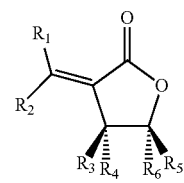

[D]

wherein, $R_1$ through $R_8$ are independently selected from hydrogen, linear, branched, cyclic, bicyclic, saturated and unsaturated hydrocarbyl radicals; and the molecular weight is from about 100 to about 300 atomic mass units; and j) esters represented by the general formula $R^1CO_2R^2$, wherein $R^1$ and $R^2$ are independently selected from linear and cyclic, saturated and unsaturated, alkyl and aryl radicals; and wherein said esters have a molecular weight of from about 80 to about 550 atomic mass units.

In a particular embodiment, the refrigerant or heat transfer fluid composition of the paragraph above is selected from the group consisting of: wherein said refrigerant or heat transfer fluid comprises a composition selected from the group consisting of: about 1 weight percent to about 99 weight percent HFC-1225ye and about 99 weight percent to about 1 weight percent HFC-152a; about 1 weight percent to about 99 weight percent HFC-1225ye and about 99 weight percent to about 1 weight percent HFC-1234yf; about 1 weight percent to about 99 weight percent HFC-1225ye and about 99 weight percent to about 1 weight percent trans-HFC-1234ze; about 1 weight percent to about 99 weight percent HFC-1225ye and about 99 weight percent to about 1 weight percent HFC-1243zf; about 1 weight percent to about 99 weight percent trans-HFC-1234ze and about 99 weight percent to about 1 weight percent HFC-134a; about 1 weight percent to about 99 weight percent trans-HFC-1234ze and about 99 weight percent to about 1 weight percent HFC-152a; about 1 weight percent to about 99 weight percent trans-HFC-1234ze and about 99 weight percent to about 1 weight percent HFC-227ea; and about 1 weight percent to about 99 weight percent trans-HFC-1234ze and about 99 weight percent to about 1 weight percent $CF_3I$.

In another embodiment, the present invention relates to blowing agent compositions comprising the fluoroolefin-containing compositions of the present invention as described herein for use in preparing foams. In other embodiments the invention provides foamable compositions, and preferably polyurethane and polyisocyanate foam compositions, and method of preparing foams. In such foam embodiments, one or more of the present fluoroolefin-containing compositions are included as a blowing agent in foamable compositions, which composition preferably includes one or more additional components capable of reacting and foaming under the proper conditions to form a foam or cellular structure. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

The present invention further relates to a method of forming a foam comprising: (a) adding to a foamable composition a fluoroolefin-containing composition of the present invention; and (b) reacting the foamable composition under conditions effective to form a foam.

Another embodiment of the present invention relates to the use of the fluoroolefin-containing compositions as described herein for use as propellants in sprayable compositions. Additionally, the present invention relates to a sprayable composition comprising the fluoroolefin-containing compositions as described herein. The active ingredient to be sprayed together with inert ingredients, solvents and other materials may also be present in a sprayable composition. Preferably, the sprayable composition is an aerosol. Suitable active materials to be sprayed include, without limitations, cosmetic materials, such as deodorants, perfumes, hair sprays, cleaners, and polishing agents as well as medicinal materials such as anti-asthma and anti-halitosis medications.

The present invention further relates to a process for producing aerosol products comprising the step of adding a fluoroolefin-containing composition as described herein to active ingredients in an aerosol container, wherein said composition functions as a propellant.

A further aspect provides methods of suppressing a flame, said methods comprising contacting a flame with a fluid comprising a fluoroolefin-containing composition of the present disclosure. Any suitable methods for contacting the flame with the present composition may be used. For example, a fluoroolefin-containing composition of the present disclosure may be sprayed, poured, and the like onto the flame, or at least a portion of the flame may be immersed in the flame suppression composition. In light of the teachings herein, those of skill in the art will be readily able to adapt a variety of conventional apparatus and methods of flame suppression for use in the present disclosure.

A further embodiment provides methods of extinguishing or suppressing a fire in a total-flood application comprising providing an agent comprising a fluoroolefin-containing composition of the present disclosure; disposing the agent in a pressurized discharge system; and discharging the agent into an area to extinguish or suppress fires in that area.

Another embodiment provides methods of inerting an area to prevent a fire or explosion comprising providing an agent comprising a fluoroolefin-containing composition of the present disclosure; disposing the agent in a pressurized discharge system; and discharging the agent into the area to prevent a fire or explosion from occurring.

The term "extinguishment" is usually used to denote complete elimination of a fire; whereas, "suppression" is often used to denote reduction, but not necessarily total elimination, of a fire or explosion. As used herein, terms "extinguishment" and "suppression" will be used interchangeably. There are four general types of halocarbon fire and explosion protection applications. (1) In total-flood fire extinguishment and/or suppression applications, the agent is discharged into a space to achieve a concentration sufficient to extinguish or suppress an existing fire. Total flooding use includes protection of enclosed, potentially occupied spaces such, as computer rooms as well as specialized, often unoccupied spaces such as aircraft engine nacelles and engine compartments in vehicles. (2) In streaming applications, the agent is applied directly onto a fire or into the region of a fire. This is usually accomplished using manually operated wheeled or portable units. A second method, included as a streaming application, uses a "localized" system, which discharges agent toward a fire from one or more fixed nozzles. Localized systems may be activated either manually or automatically. (3) In explosion suppression, a fluoroolefin-containing composition of the present disclosure is discharged to suppress an explosion that has already been initiated. The term "suppression" is normally used in this application because the explosion is usually self-limiting. However, the use of this term does not necessarily imply that the explosion is not extinguished by the agent. In this application, a detector is usually used to detect an expanding fireball from an explosion, and the agent is discharged rapidly to suppress the explosion. Explosion suppression is used primarily, but not solely, in defense applications. (4) In inertion, a fluoroolefin-containing composition of the present disclosure is discharged into a space to prevent an explosion or a fire from being initiated. Often, a system similar or identical to that used for total-flood fire extinguishment or suppression is used. Usually, the presence of a dangerous condition (for example, dangerous concentrations of flammable or explosive gases) is detected, and the fluoroolefin-containing composition of the present disclosure is then discharged to prevent the explosion or fire from occurring until the condition can be remedied.

The extinguishing method can be carried out by introducing the composition into an enclosed area surrounding a fire. Any of the known methods of introduction can be utilized provided that appropriate quantities of the composition are metered into the enclosed area at appropriate intervals. For example, a composition can be introduced by streaming, e.g., using conventional portable (or fixed) fire extinguishing equipment; by misting; or by flooding, e.g., by releasing (using appropriate piping, valves, and controls) the composition into an enclosed area surrounding a fire. The composition can optionally be combined with an inert propellant, e.g., nitrogen, argon, decomposition products of glycidyl azide polymers or carbon dioxide, to increase the rate of discharge of the composition from the streaming or flooding equipment utilized.

Preferably, the extinguishing process involves introducing a fluoroolefin-containing composition of the present disclosure to a fire or flame in an amount sufficient to extinguish the fire or flame. One skilled in this field will recognize that the amount of flame suppressant needed to extinguish a particular fire will depend upon the nature and extent of the hazard. When the flame suppressant is to be introduced by flooding, cup burner test data is useful in determining the amount or concentration of flame suppressant required to extinguish a particular type and size of fire.

Laboratory tests useful for determining effective concentration ranges of fluoroolefin-containing compositions when used in conjunction with extinguishing or suppressing a fire in a total-flood application or fire inertion are described, for example, in U.S. Pat. No. 5,759,430.

EXAMPLES

Example 1

Impact of Vapor Leakage

A vessel is charged with an initial composition at a temperature of either −25° C. or if specified, at 25° C., and the initial vapor pressure of the composition is measured. The composition is allowed to leak from the vessel, while the temperature is held constant, until 50 weight percent of the initial composition is removed, at which time the vapor pressure of the composition remaining in the vessel is measured. Results are shown in Table 9.

TABLE 9

| Composition wt % | Initial P (Psia) | Initial P (kPa) | After 50% Leak (Psia) | After 50% Leak (kPa) | Delta P (%) |
|---|---|---|---|---|---|
| HFC-1234yf/HFC-32 | | | | | |
| 7.4/92.6 | 49.2 | 339 | 49.2 | 339 | 0.0% |
| 1/99 | 49.2 | 339 | 49.2 | 339 | 0.0% |
| 20/80 | 49.0 | 338 | 48.8 | 337 | 0.3% |
| 40/60 | 47.5 | 327 | 47.0 | 324 | 1.0% |
| 57/43 | 44.9 | 309 | 40.5 | 280 | 9.6% |
| 58/42 | 44.6 | 308 | 40.1 | 276 | 10.2% |
| HFC-1234yf/HFC-125 | | | | | |
| 10.9/89.1 | 40.8 | 281 | 40.8 | 281 | 0.0% |
| 1/99 | 40.3 | 278 | 40.2 | 277 | 0.0% |
| 20/80 | 40.5 | 279 | 40.3 | 278 | 0.4% |
| 40/60 | 38.7 | 267 | 37.0 | 255 | 4.4% |
| 50/50 | 37.4 | 258 | 34.0 | 235 | 9.0% |
| 51/49 | 37.3 | 257 | 33.7 | 232 | 9.6% |
| 52/48 | 37.1 | 256 | 33.3 | 229 | 10.3% |
| HFC-1234yf/HFC-134 | | | | | |
| 1/99 | 11.7 | 81 | 11.6 | 80 | 0.7% |
| 10/90 | 12.8 | 88 | 12.2 | 84 | 4.5% |
| 20/80 | 13.7 | 95 | 13.0 | 89 | 5.6% |
| 40/60 | 15.2 | 105 | 14.6 | 101 | 4.1% |
| 60/40 | 16.3 | 113 | 16.0 | 110 | 2.0% |
| 80/20 | 17.2 | 119 | 17.1 | 118 | 0.6% |
| 90/10 | 17.6 | 121 | 17.5 | 121 | 0.2% |
| 99/1 | 17.8 | 123 | 17.8 | 123 | 0.0% |
| HFC-1234yf/HFC-134a | | | | | |
| 70.4/29.6 | 18.4 | 127 | 18.4 | 127 | 0.0% |
| 80/20 | 18.3 | 126 | 18.3 | 126 | 0.1% |
| 90/10 | 18.2 | 125 | 18.1 | 125 | 0.1% |
| 99/1 | 17.9 | 123 | 17.9 | 123 | 0.1% |
| 40/60 | 17.9 | 123 | 17.8 | 123 | 0.7% |
| 20/80 | 17.0 | 117 | 16.7 | 115 | 1.7% |
| 10/90 | 16.4 | 113 | 16.1 | 111 | 1.5% |
| 1/99 | 15.6 | 107 | 15.6 | 107 | 0.3% |
| HFC-1234yf/HFC-152a | | | | | |
| 91.0/9.0 | 17.9 | 123 | 17.9 | 123 | 0.0% |
| 99/1 | 17.9 | 123 | 17.8 | 123 | 0.1% |
| 60/40 | 17.4 | 120 | 17.2 | 119 | 0.7% |
| 40/60 | 16.6 | 115 | 16.4 | 113 | 1.6% |
| 20/80 | 15.7 | 108 | 15.4 | 106 | 2.0% |
| 10/90 | 15.1 | 104 | 14.9 | 103 | 1.5% |
| 1/99 | 14.6 | 100 | 14.5 | 100 | 0.2% |
| HFC-1234yf/HFC-161 | | | | | |
| 1/99 | 25.3 | 174 | 25.3 | 174 | 0.0% |
| 10/90 | 25.2 | 174 | 25.2 | 174 | 0.1% |
| 20/80 | 24.9 | 172 | 24.8 | 171 | 0.8% |
| 40/60 | 23.8 | 164 | 23.2 | 160 | 2.6% |
| 60/40 | 22.0 | 152 | 21.3 | 147 | 3.2% |
| 80/20 | 19.8 | 137 | 19.5 | 134 | 1.9% |
| 90/10 | 18.8 | 129 | 18.6 | 128 | 0.9% |
| 99/1 | 17.9 | 123 | 17.9 | 123 | 0.1% |
| HFC-1234yf/FC-143a | | | | | |
| 17.3/82.7 | 39.5 | 272 | 39.5 | 272 | 0.0% |
| 10/90 | 39.3 | 271 | 39.3 | 271 | 0.1% |
| 1/99 | 38.7 | 267 | 38.6 | 266 | 0.1% |
| 40/60 | 38.5 | 266 | 37.8 | 260 | 1.9% |
| 60/40 | 36.3 | 250 | 32.8 | 226 | 9.5% |
| 61/39 | 36.1 | 249 | 32.4 | 223 | 10.2% |
| HFC-1234yf/HFC-227ea | | | | | |
| 84.6/15.4 | 18.0 | 124 | 18.0 | 124 | 0.0% |
| 90/10 | 18.0 | 124 | 18.0 | 124 | 0.0% |
| 99/1 | 17.9 | 123 | 17.9 | 123 | 0.0% |
| 60/40 | 17.6 | 121 | 17.4 | 120 | 1.2% |
| 40/60 | 16.7 | 115 | 15.8 | 109 | 5.4% |
| 29/71 | 15.8 | 109 | 14.2 | 98 | 9.7% |
| 28/72 | 15.7 | 108 | 14.1 | 97 | 10.2% |
| HFC-1234yf/HFC-236fa | | | | | |
| 99/1 | 17.8 | 122 | 17.7 | 122 | 0.2% |
| 90/10 | 17.0 | 117 | 16.6 | 115 | 2.4% |
| 80/20 | 16.2 | 112 | 15.4 | 106 | 5.1% |
| 70/30 | 15.3 | 106 | 14.0 | 97 | 8.5% |
| 66/34 | 15.0 | 103 | 13.5 | 93 | 10.0% |
| HFC-1234yf/HFC-1225ye | | | | | |
| 1/99 | 11.6 | 80 | 11.5 | 79 | 0.5% |
| 10/90 | 12.6 | 87 | 12.2 | 84 | 3.2% |
| 20/80 | 13.5 | 93 | 12.9 | 89 | 4.3% |
| 40/60 | 15.0 | 103 | 14.4 | 99 | 3.7% |
| 60/40 | 16.2 | 111 | 15.8 | 109 | 2.2% |
| 80/20 | 17.1 | 118 | 16.9 | 117 | 0.9% |
| 90/10 | 17.5 | 120 | 17.4 | 120 | 0.3% |
| 99/1 | 17.8 | 123 | 17.8 | 123 | 0.0% |
| HFC-1234yf/trans-HFC-1234ze | | | | | |
| 1/99 | 11.3 | 78 | 11.3 | 78 | 0.4% |
| 10/90 | 12.2 | 84 | 11.8 | 81 | 3.3% |
| 20/80 | 13.1 | 90 | 12.5 | 86 | 4.6% |
| 40/60 | 14.6 | 101 | 14.0 | 96 | 4.3% |
| 60/40 | 15.8 | 109 | 15.4 | 106 | 2.7% |
| 80/20 | 16.9 | 117 | 16.7 | 115 | 1.1% |
| 90/10 | 17.4 | 120 | 17.3 | 119 | 0.5% |
| 99/1 | 17.8 | 123 | 17.8 | 123 | 0.1% |
| HFC-1234yf/HFC-1243zf | | | | | |
| 1/99 | 13.1 | 90 | 13.0 | 90 | 0.2% |
| 10/90 | 13.7 | 94 | 13.5 | 93 | 1.6% |
| 20/80 | 14.3 | 99 | 14.0 | 97 | 2.4% |
| 40/60 | 15.5 | 107 | 15.1 | 104 | 2.2% |
| 60/40 | 16.4 | 113 | 16.2 | 112 | 1.4% |
| 80/20 | 17.2 | 119 | 17.1 | 118 | 0.5% |
| 90/10 | 17.5 | 121 | 17.5 | 121 | 0.2% |
| 99/1 | 17.8 | 123 | 17.8 | 123 | 0.0% |
| HFC-1234yf/propane | | | | | |
| 51.5/48.5 | 33.5 | 231 | 33.5 | 231 | 0.0% |
| 60/40 | 33.4 | 230 | 33.3 | 229 | 0.4% |
| 80/20 | 31.8 | 220 | 29.0 | 200 | 8.9% |
| 81/19 | 31.7 | 218 | 28.5 | 196 | 10.0% |
| 40/60 | 33.3 | 230 | 33.1 | 228 | 0.6% |
| 20/80 | 32.1 | 221 | 31.2 | 215 | 2.9% |
| 10/90 | 31.0 | 214 | 30.2 | 208 | 2.6% |
| 1/99 | 29.6 | 204 | 29.5 | 203 | 0.4% |
| HFC-1234yf/n-butane | | | | | |
| 98.1/1.9 | 17.9 | 123 | 17.9 | 123 | 0.0% |
| 99/1 | 17.9 | 123 | 17.9 | 123 | 0.0% |
| 100/0 | 17.8 | 123 | 17.8 | 123 | 0.0% |
| 80/20 | 16.9 | 116 | 16.1 | 111 | 4.4% |
| 70/30 | 16.2 | 112 | 14.4 | 99 | 10.8% |
| 71/29 | 16.3 | 112 | 14.6 | 101 | 9.9% |
| HFC-1234yf/isobutane | | | | | |
| 88.1/11.9 | 19.0 | 131 | 19.0 | 131 | 0.0% |
| 95/5 | 18.7 | 129 | 18.6 | 128 | 0.7% |
| 99/1 | 18.1 | 125 | 18.0 | 124 | 0.6% |
| 60/40 | 17.9 | 123 | 16.0 | 110 | 10.3% |
| 61/39 | 17.9 | 123 | 16.2 | 112 | 9.4% |
| HFC-1234yf/DME | | | | | |
| 53.5/46.5 | 13.1 | 90 | 13.1 | 90 | 0.0% |
| 40/60 | 13.3 | 92 | 13.2 | 91 | 0.7% |
| 20/80 | 14.1 | 97 | 13.9 | 96 | 1.3% |
| 10/90 | 14.3 | 99 | 14.3 | 98 | 0.5% |
| 1/99 | 14.5 | 100 | 14.5 | 100 | 0.0% |
| 80/20 | 14.5 | 100 | 14.0 | 96 | 3.3% |
| 90/10 | 15.8 | 109 | 15.3 | 105 | 3.5% |
| 99/1 | 17.6 | 121 | 17.5 | 121 | 0.6% |

TABLE 9-continued

| Composition wt % | Initial P (Psia) | Initial P (kPa) | After 50% Leak (Psia) | After 50% Leak (kPa) | Delta P (%) |
|---|---|---|---|---|---|
| HFC-1234yf/CF$_3$SCF$_3$ | | | | | |
| 1/99 | 12.1 | 83 | 12.0 | 83 | 0.2% |
| 10/90 | 12.9 | 89 | 12.7 | 87 | 2.0% |
| 20/80 | 13.8 | 95 | 13.4 | 92 | 2.8% |
| 40/60 | 15.1 | 104 | 14.7 | 101 | 2.7% |
| 60/40 | 16.2 | 112 | 15.9 | 110 | 1.9% |
| 80/20 | 17.1 | 118 | 16.9 | 117 | 0.9% |
| 90/10 | 17.5 | 120 | 17.4 | 120 | 0.5% |
| 99/1 | 17.8 | 123 | 17.8 | 123 | 0.0% |
| HFC-1234yf/CF$_3$I | | | | | |
| 1/99 | 12.0 | 83 | 12.0 | 83 | 0.2% |
| 10/90 | 12.9 | 89 | 12.7 | 87 | 1.7% |
| 20/80 | 13.7 | 94 | 13.3 | 92 | 2.6% |
| 40/60 | 15.1 | 104 | 14.7 | 101 | 2.7% |
| 60/40 | 16.2 | 111 | 15.8 | 109 | 2.0% |
| 80/20 | 17.1 | 118 | 16.9 | 116 | 1.1% |
| 90/10 | 17.5 | 120 | 17.4 | 120 | 0.5% |
| 99/1 | 17.8 | 123 | 17.8 | 123 | 0.1% |
| HFC-125/HFC-1234yf/isobutane (25° C.) | | | | | |
| 85.1/11.5/3.4 | 201.3 | 1388 | 201.3 | 1388 | 0.0% |
| HFC-125/HFC-1234yf/n-butane (25° C.) | | | | | |
| 67/32/1 | 194.4 | 1340 | 190.2 | 1311 | 2.2% |
| HFC-32/HFC-125/HFC-1234yf (25° C.) | | | | | |
| 40/50/10 | 240.6 | 1659 | 239.3 | 1650 | 0.5% |
| 23/25/52 | 212.6 | 1466 | 192.9 | 1330 | 9.3% |
| 15/45/40 | 213.2 | 1470 | 201.3 | 1388 | 5.6% |
| 10/60/30 | 213.0 | 1469 | 206.0 | 1420 | 3.3% |
| HFC-1225ye/trans-HFC-1234ze | | | | | |
| 63.0/37.0 | 11.7 | 81 | 11.7 | 81 | 0.0% |
| 80/20 | 11.6 | 80 | 11.6 | 80 | 0.0% |
| 90/10 | 11.6 | 80 | 11.6 | 80 | 0.1% |
| 99/1 | 11.5 | 79 | 11.5 | 79 | 0.0% |
| 60/40 | 11.7 | 81 | 11.7 | 81 | 0.0% |
| 40/60 | 11.6 | 80 | 11.6 | 80 | 0.1% |
| 20/80 | 11.5 | 79 | 11.4 | 79 | 0.2% |
| 10/90 | 11.3 | 78 | 11.3 | 78 | 0.1% |
| 1/99 | 11.2 | 77 | 11.2 | 77 | 0.1% |
| HFC-1225ye/HFC-1243zf | | | | | |
| 40.0/60.0 | 13.6 | 94 | 13.6 | 94 | 0.0% |
| 20/80 | 13.4 | 93 | 13.4 | 92 | 0.1% |
| 10/90 | 13.2 | 91 | 13.2 | 91 | 0.2% |
| 1/99 | 13.0 | 90 | 13.0 | 90 | 0.0% |
| 60/40 | 13.4 | 92 | 13.4 | 92 | 0.4% |
| 80/20 | 12.8 | 88 | 12.6 | 87 | 1.4% |
| 90/10 | 12.3 | 85 | 12.1 | 83 | 1.5% |
| 99/1 | 11.6 | 80 | 11.5 | 79 | 0.3% |
| HFC-1225ye/HFC-134 | | | | | |
| 52.2/47.8 | 12.8 | 88 | 12.8 | 88 | 0.0% |
| 80/20 | 12.4 | 85 | 12.3 | 85 | 0.6% |
| 90/10 | 12.0 | 83 | 11.9 | 82 | 0.8% |
| 99/1 | 11.5 | 79 | 11.5 | 79 | 0.2% |
| 40/60 | 12.7 | 88 | 12.7 | 87 | 0.2% |
| 20/80 | 12.3 | 85 | 12.2 | 84 | 0.8% |
| 10/90 | 12.0 | 83 | 11.9 | 82 | 0.9% |
| 1/99 | 11.6 | 80 | 11.6 | 80 | 0.2% |
| HFC-1225ye/HFC-134a | | | | | |
| 1/99 | 15.5 | 107 | 15.5 | 107 | 0.0% |
| 10/90 | 15.2 | 105 | 15.2 | 105 | 0.3% |
| 20/80 | 15.0 | 103 | 14.9 | 103 | 0.5% |
| 40/60 | 14.4 | 99 | 14.2 | 98 | 1.0% |
| 60/40 | 13.6 | 94 | 13.4 | 93 | 1.4% |
| 80/20 | 12.7 | 88 | 12.5 | 86 | 1.6% |
| 90/10 | 12.2 | 84 | 12.0 | 83 | 1.3% |
| 99/1 | 11.5 | 80 | 11.5 | 79 | 0.2% |
| HFC-1225ye/HFC-152a | | | | | |
| 7.3/92.7 | 14.5 | 100 | 14.5 | 100 | 0.0% |
| 1/99 | 14.5 | 100 | 14.5 | 100 | 0.0% |
| 40/60 | 14.2 | 98 | 14.2 | 98 | 0.4% |
| 60/40 | 13.7 | 95 | 13.6 | 93 | 1.1% |
| 80/20 | 12.9 | 89 | 12.7 | 87 | 1.5% |
| 90/10 | 12.2 | 84 | 12.1 | 83 | 1.1% |
| 99/1 | 11.5 | 80 | 11.5 | 79 | 0.1% |
| HFC-1225ye/HFC-161 | | | | | |
| 1/99 | 25.2 | 174 | 25.2 | 174 | 0.0% |
| 10/90 | 24.9 | 172 | 24.8 | 171 | 0.6% |
| 20/80 | 24.5 | 169 | 24.0 | 165 | 2.0% |
| 40/60 | 22.9 | 158 | 21.4 | 148 | 6.5% |
| 56/44 | 20.9 | 144 | 18.8 | 130 | 10.0% |
| 99/1 | 11.7 | 81 | 11.6 | 80 | 1.0% |
| 90/10 | 14.1 | 97 | 13.0 | 90 | 7.5% |
| 84/16 | 15.5 | 107 | 14.0 | 96 | 9.9% |
| 83/17 | 15.8 | 109 | 14.2 | 98 | 10.2% |
| HFC-1225ye/HFC-227ea | | | | | |
| 1/99 | 10.0 | 69 | 10.0 | 69 | 0.0% |
| 10/90 | 10.1 | 70 | 10.1 | 70 | 0.2% |
| 20/80 | 10.3 | 71 | 10.3 | 71 | 0.2% |
| 40/60 | 10.6 | 73 | 10.6 | 73 | 0.4% |
| 60/40 | 10.9 | 75 | 10.9 | 75 | 0.4% |
| 80/20 | 11.2 | 77 | 11.2 | 77 | 0.3% |
| 90/10 | 11.3 | 78 | 11.3 | 78 | 0.1% |
| 99/1 | 11.5 | 79 | 11.5 | 79 | 0.0% |
| HFC-1225ye/HFC-236ea | | | | | |
| 99/1 | 11.4 | 79 | 11.4 | 79 | 0.0% |
| 90/10 | 11.3 | 78 | 11.2 | 77 | 0.5% |
| 80/20 | 11.0 | 75 | 10.7 | 74 | 2.0% |
| 60/40 | 10.2 | 70 | 9.4 | 65 | 8.3% |
| 57/43 | 10.1 | 69 | 9.1 | 63 | 9.9% |
| 56/44 | 10.0 | 69 | 9.0 | 62 | 10.6% |
| HFC-1225ye/HFC-236fa | | | | | |
| 99/1 | 11.4 | 79 | 11.4 | 79 | 0.1% |
| 90/10 | 11.1 | 77 | 11.0 | 76 | 1.1% |
| 80/20 | 10.7 | 74 | 10.4 | 72 | 2.4% |
| 60/40 | 9.8 | 68 | 9.2 | 63 | 6.6% |
| 48/52 | 9.2 | 63 | 8.2 | 57 | 10.0% |
| HFC-1225ye/HFC-245fa | | | | | |
| 99/1 | 11.4 | 79 | 11.4 | 78 | 0.3% |
| 90/10 | 10.9 | 75 | 10.6 | 73 | 2.5% |
| 80/20 | 10.4 | 72 | 9.8 | 68 | 5.7% |
| 70/30 | 9.9 | 68 | 8.9 | 61 | 9.9% |
| 69/21 | 9.8 | 68 | 8.8 | 60 | 10.5% |
| HFC-1225ye/propane | | | | | |
| 29.7/70.3 | 30.4 | 209 | 30.4 | 209 | 0.0% |
| 20/80 | 30.3 | 209 | 30.2 | 208 | 0.2% |
| 10/90 | 30.0 | 207 | 29.9 | 206 | 0.4% |
| 1/99 | 29.5 | 203 | 29.5 | 203 | 0.1% |
| 60/40 | 29.5 | 203 | 28.5 | 197 | 3.3% |
| 72/28 | 28.4 | 195 | 25.6 | 176 | 9.8% |
| 73/27 | 28.2 | 195 | 25.2 | 174 | 10.8% |
| HFC-1225ye/n-butane | | | | | |
| 89.5/10.5 | 12.3 | 85 | 12.3 | 85 | 0.0% |
| 99/1 | 11.7 | 81 | 11.6 | 80 | 0.9% |
| 80/20 | 12.2 | 84 | 12.0 | 83 | 1.5% |
| 65/35 | 11.7 | 80 | 10.5 | 72 | 9.9% |
| 64/36 | 11.6 | 80 | 10.4 | 71 | 10.9% |
| HFC-1225ye/isobutane | | | | | |
| 79.3/20.7 | 13.9 | 96 | 13.9 | 96 | 0.0% |
| 90/10 | 13.6 | 94 | 13.3 | 92 | 2.4% |
| 99/1 | 11.9 | 82 | 11.6 | 80 | 2.8% |
| 60/40 | 13.5 | 93 | 13.0 | 89 | 4.1% |

TABLE 9-continued

| Composition wt % | Initial P (Psia) | Initial P (kPa) | After 50% Leak (Psia) | After 50% Leak (kPa) | Delta P (%) |
|---|---|---|---|---|---|
| 50/50 | 13.1 | 91 | 11.9 | 82 | 9.6% |
| 49/51 | 13.1 | 90 | 11.8 | 81 | 10.2% |
| HFC-1225ye/DME | | | | | |
| 82.1/17.9 | 10.8 | 74 | 10.8 | 74 | 0.0% |
| 90/10 | 10.9 | 75 | 10.9 | 75 | 0.3% |
| 99/1 | 11.4 | 78 | 11.4 | 78 | 0.2% |
| 60/40 | 11.5 | 79 | 11.2 | 77 | 2.4% |
| 40/60 | 12.8 | 88 | 12.1 | 84 | 4.8% |
| 20/80 | 13.9 | 96 | 13.5 | 93 | 3.0% |
| 10/90 | 14.3 | 98 | 14.1 | 97 | 1.1% |
| 1/99 | 14.5 | 100 | 14.4 | 100 | 0.1% |
| HFC-1225ye/CF$_3$I | | | | | |
| 1/99 | 11.9 | 82 | 11.9 | 82 | 0.0% |
| 10/90 | 11.9 | 82 | 11.8 | 82 | 0.1% |
| 20/80 | 11.8 | 81 | 11.8 | 81 | 0.0% |
| 40/60 | 11.7 | 80 | 11.7 | 80 | 0.0% |
| 60/40 | 11.6 | 80 | 11.6 | 80 | 0.0% |
| 80/20 | 11.5 | 79 | 11.5 | 79 | 0.0% |
| 90/10 | 11.5 | 79 | 11.5 | 79 | 0.0% |
| 99/1 | 11.5 | 79 | 11.5 | 79 | 0.0% |
| HFC-1225ye/CF$_3$SCF$_3$ | | | | | |
| 37.0/63.0 | 12.4 | 86 | 12.4 | 86 | 0.0% |
| 20/80 | 12.3 | 85 | 12.3 | 85 | 0.1% |
| 10/90 | 12.2 | 84 | 12.2 | 84 | 0.1% |
| 1/99 | 12.0 | 83 | 12.0 | 83 | 0.1% |
| 60/40 | 12.3 | 85 | 12.3 | 85 | 0.2% |
| 80/20 | 12.0 | 83 | 11.9 | 82 | 0.4% |
| 90/10 | 11.7 | 81 | 11.7 | 81 | 0.3% |
| 99/1 | 11.5 | 79 | 11.5 | 79 | 0.1% |
| HFC-1225ye/HFC-134a/HFC-152a (25° C.) | | | | | |
| 76/9/15 | 81.3 | 561 | 80.5 | 555 | 1.0% |
| HFC-1225ye/HFC-134a/HFC-161 (25° C.) | | | | | |
| 86/10/4 | 82.1 | 566 | 80.2 | 553 | 2.3% |
| HFC-1225ye/HFC-134a/isobutane (25° C.) | | | | | |
| 87/10/3 | 83.4 | 575 | 80.3 | 554 | 3.7% |
| HFC-1225ye/HFC-134a/DME (25° C.) | | | | | |
| 87/10/3 | 77.2 | 532 | 76.0 | 524 | 1.6% |
| HFC-1225ye/HFC-152a/isobutane (25° C.) | | | | | |
| 85/13/2 | 81.2 | 560 | 79.3 | 547 | 2.3% |
| HFC-1225ye/HFC-152a/DME (25° C.) | | | | | |
| 85/13/2 | 76.6 | 528 | 76.0 | 524 | 0.8% |
| HFC-1225ye/HFC-1234yf/HFC-134a (25° C.) | | | | | |
| 70/20/10 | 86.0 | 593 | 84.0 | 579 | 2.3% |
| 20/70/10 | 98.2 | 677 | 97.5 | 672 | 0.7% |
| HFC-1225ye/HFC-1234yf/HFC-152a (25° C.) | | | | | |
| 70/25/5 | 85.1 | 587 | 83.4 | 575 | 2.0% |
| 25/70/5 | 95.4 | 658 | 94.9 | 654 | 0.5% |
| HFC-1225ye/HFC-1234yf/HFC-125 (25° C.) | | | | | |
| 25/71/4 | 105.8 | 729 | 96.3 | 664 | 9.0% |
| 75/21/4 | 89.5 | 617 | 83.0 | 572 | 7.3% |
| 75/24/1 | 85.3 | 588 | 82.3 | 567 | 3.5% |
| 25/74/1 | 98.0 | 676 | 95.1 | 656 | 3.0% |
| HFC-1225ye/HFC-1234yf/CF$_3$I (25° C.) | | | | | |
| 40/40/20 | 87.5 | 603 | 86.0 | 593 | 1.7% |
| 45/45/10 | 89.1 | 614 | 87.7 | 605 | 1.6% |
| HFC-1225ye/HFC-134a/HFC-152a/HFC-32 (25° C.) | | | | | |
| 74/8/17/1 | 86.1 | 594 | 81.5 | 562 | 5.3% |
| HFC-125/HFC-1225ye/isobutane (25° C.) | | | | | |
| 85.1/11.5/3.4 | 186.2 | 1284 | 179.2 | 1236 | 3.8% |
| HFC-32/HFC-125/HFC-1225ye (25° C.) | | | | | |
| 30/40/30 | 212.7 | 1467 | 194.6 | 1342 | 8.5% |
| trans-HFC-1234ze/cis-HFC-1234ze | | | | | |
| 99/1 | 11.1 | 77 | 11.1 | 76 | 0.4% |
| 90/10 | 10.5 | 72 | 10.1 | 70 | 3.4% |
| 80/20 | 9.8 | 68 | 9.1 | 63 | 7.1% |
| 73/27 | 9.3 | 64 | 8.4 | 58 | 9.9% |
| 72/28 | 9.3 | 64 | 8.3 | 57 | 10.3% |
| trans-HFC-1234ze/HFC-1243zf | | | | | |
| 17.0/83.0 | 13.0 | 90 | 13.0 | 90 | 0.0% |
| 10/90 | 13.0 | 90 | 13.0 | 90 | 0.0% |
| 1/99 | 13.0 | 90 | 13.0 | 90 | 0.0% |
| 40/60 | 12.9 | 89 | 12.9 | 89 | 0.1% |
| 60/40 | 12.6 | 87 | 12.5 | 86 | 0.6% |
| 80/20 | 12.1 | 83 | 12.0 | 82 | 0.8% |
| 90/10 | 11.7 | 80 | 11.6 | 80 | 0.7% |
| 99/1 | 11.2 | 77 | 11.2 | 77 | 0.1% |
| trans-HFC-1234ze/HFC-134 | | | | | |
| 45.7/54.3 | 12.5 | 86 | 12.5 | 86 | 0.0% |
| 60/40 | 12.4 | 85 | 12.4 | 85 | 0.2% |
| 80/20 | 12.0 | 83 | 11.9 | 82 | 0.7% |
| 90/10 | 11.7 | 80 | 11.6 | 80 | 0.7% |
| 99/1 | 11.2 | 77 | 11.2 | 77 | 0.1% |
| 20/80 | 12.2 | 84 | 12.2 | 84 | 0.4% |
| 10/90 | 11.9 | 82 | 11.9 | 82 | 0.6% |
| 1/99 | 11.6 | 80 | 11.6 | 80 | 0.1% |
| trans-HFC-1234ze/HFC-134a | | | | | |
| 9.5/90.5 | 15.5 | 107 | 15.5 | 107 | 0.0% |
| 1/99 | 15.5 | 107 | 15.5 | 107 | 0.0% |
| 40/60 | 15.1 | 104 | 15.0 | 103 | 0.9% |
| 60/40 | 14.3 | 99 | 14.0 | 96 | 2.5% |
| 80/20 | 13.1 | 90 | 12.6 | 87 | 4.0% |
| 90/10 | 12.3 | 85 | 11.9 | 82 | 3.3% |
| 99/1 | 11.3 | 78 | 11.3 | 78 | 0.5% |
| trans-HFC-1234ze/HFC-152a | | | | | |
| 21.6/78.4 | 14.6 | 101 | 14.6 | 101 | 0.0% |
| 10/90 | 14.6 | 101 | 14.6 | 101 | 0.0% |
| 1/99 | 14.5 | 100 | 14.5 | 100 | 0.0% |
| 40/60 | 14.5 | 100 | 14.5 | 100 | 0.1% |
| 60/40 | 14.1 | 97 | 13.9 | 96 | 1.1% |
| 80/20 | 13.2 | 91 | 12.8 | 88 | 2.5% |
| 90/10 | 12.4 | 85 | 12.0 | 83 | 2.6% |
| 99/1 | 11.3 | 78 | 11.3 | 78 | 0.4% |
| trans-HFC-1234ze/HFC-161 | | | | | |
| 1/99 | 25.2 | 174 | 25.2 | 174 | 0.0% |
| 10/90 | 25.0 | 172 | 24.8 | 171 | 0.6% |
| 20/80 | 24.5 | 169 | 24.0 | 165 | 2.1% |
| 40/60 | 22.8 | 157 | 21.2 | 146 | 7.0% |
| 52/48 | 21.3 | 147 | 19.2 | 132 | 9.9% |
| 53/47 | 21.2 | 146 | 19.0 | 131 | 10.2% |
| 99/1 | 11.5 | 79 | 11.3 | 78 | 1.2% |
| 90/10 | 13.8 | 95 | 12.6 | 87 | 8.6% |
| 88/12 | 14.3 | 99 | 12.9 | 89 | 9.5% |
| 87/13 | 14.5 | 100 | 13.1 | 90 | 10.0% |
| trans-HFC-1234ze/HFC-227ea | | | | | |
| 59.2/40.8 | 11.7 | 81 | 11.7 | 81 | 0.0% |
| 40/60 | 11.6 | 80 | 11.5 | 79 | 0.3% |
| 20/80 | 11.1 | 76 | 10.9 | 75 | 1.3% |
| 10/90 | 10.6 | 73 | 10.5 | 72 | 1.3% |
| 1/99 | 10.0 | 69 | 10.0 | 69 | 0.2% |
| 80/20 | 11.6 | 80 | 11.5 | 80 | 0.2% |
| 90/10 | 11.4 | 79 | 11.4 | 78 | 0.3% |
| 99/1 | 11.2 | 77 | 11.2 | 77 | 0.0% |
| trans-HFC-1234ze/HFC-236ea | | | | | |
| 99/1 | 11.2 | 77 | 11.2 | 77 | 0.0% |
| 90/10 | 11.0 | 76 | 11.0 | 76 | 0.4% |

TABLE 9-continued

| Composition wt % | Initial P (Psia) | Initial P (kPa) | After 50% Leak (Psia) | After 50% Leak (kPa) | Delta P (%) |
|---|---|---|---|---|---|
| 80/20 | 10.8 | 75 | 10.6 | 73 | 1.6% |
| 60/40 | 10.2 | 70 | 9.5 | 66 | 6.6% |
| 54/46 | 9.9 | 69 | 9.0 | 62 | 9.5% |
| 53/47 | 9.9 | 68 | 8.9 | 61 | 10.1% |
| trans-HFC-1234ze/HFC-236fa | | | | | |
| 99/1 | 11.2 | 77 | 11.2 | 77 | 0.1% |
| 90/10 | 10.9 | 75 | 10.8 | 75 | 0.8% |
| 80/20 | 10.6 | 73 | 10.4 | 71 | 2.0% |
| 60/40 | 9.8 | 67 | 9.3 | 64 | 5.4% |
| 44/56 | 9.0 | 62 | 8.1 | 56 | 9.7% |
| 43/57 | 8.9 | 62 | 8.0 | 55 | 10.1% |
| trans-HFC-1234ze/HFC-245fa | | | | | |
| 99/1 | 11.2 | 77 | 11.1 | 77 | 0.2% |
| 90/10 | 10.7 | 74 | 10.5 | 73 | 2.0% |
| 80/20 | 10.3 | 71 | 9.8 | 68 | 4.7% |
| 70/30 | 9.8 | 68 | 9.0 | 62 | 8.2% |
| 67/33 | 9.7 | 67 | 8.7 | 60 | 9.7% |
| 66/34 | 9.6 | 66 | 8.7 | 60 | 10.2% |
| trans-HFC-1234ze/propane | | | | | |
| 28.5/71.5 | 30.3 | 209 | 30.3 | 209 | 0.0% |
| 10/90 | 30.0 | 206 | 29.9 | 206 | 0.3% |
| 1/99 | 29.5 | 203 | 29.5 | 203 | 0.1% |
| 40/60 | 30.2 | 208 | 30.1 | 207 | 0.4% |
| 60/40 | 29.3 | 202 | 28.3 | 195 | 3.4% |
| 71/29 | 28.4 | 196 | 25.7 | 177 | 9.3% |
| 72/28 | 28.3 | 195 | 25.4 | 175 | 10.2% |
| trans-HFC-1234ze/n-butane | | | | | |
| 88.6/11.4 | 11.9 | 82 | 11.9 | 82 | 0.0% |
| 95/5 | 11.7 | 81 | 11.7 | 80 | 0.7% |
| 99/1 | 11.4 | 78 | 11.3 | 78 | 0.6% |
| 70/30 | 11.5 | 79 | 11.0 | 76 | 4.2% |
| 62/38 | 11.2 | 77 | 10.2 | 70 | 9.3% |
| 61/39 | 11.2 | 77 | 10.0 | 69 | 10.1% |
| trans-HFC-1234ze/isobutane | | | | | |
| 77.9/22.1 | 12.9 | 89 | 12.9 | 89 | 0.0% |
| 90/10 | 12.6 | 87 | 12.4 | 85 | 1.6% |
| 99/1 | 11.4 | 79 | 11.3 | 78 | 1.1% |
| 60/40 | 12.6 | 87 | 12.3 | 85 | 2.4% |
| 39/61 | 11.7 | 81 | 10.6 | 73 | 9.8% |
| 38/62 | 11.7 | 81 | 10.5 | 72 | 10.1% |
| trans-HFC-1234ze/DME | | | | | |
| 84.1/15.9 | 10.8 | 74 | 10.8 | 74 | 0.0% |
| 90/10 | 10.8 | 75 | 10.8 | 75 | 0.0% |
| 99/1 | 11.1 | 77 | 11.1 | 77 | 0.0% |
| 60/40 | 11.5 | 79 | 11.3 | 78 | 2.2% |
| 40/60 | 12.7 | 88 | 12.2 | 84 | 4.4% |
| 20/80 | 13.9 | 96 | 13.5 | 93 | 2.9% |
| 10/90 | 14.3 | 98 | 14.1 | 97 | 1.0% |
| 1/99 | 14.5 | 100 | 14.5 | 100 | 0.0% |
| trans-HFC-1234ze/CF$_3$SCF$_3$ | | | | | |
| 34.3/65.7 | 12.7 | 87 | 12.7 | 87 | 0.0% |
| 20/80 | 12.6 | 87 | 12.6 | 87 | 0.2% |
| 10/90 | 12.4 | 85 | 12.3 | 85 | 0.3% |
| 1/99 | 12.0 | 83 | 12.0 | 83 | 0.1% |
| 60/40 | 12.4 | 86 | 12.4 | 85 | 0.5% |
| 80/20 | 12.0 | 82 | 11.8 | 81 | 1.1% |
| 90/10 | 11.6 | 80 | 11.5 | 79 | 0.9% |
| 99/1 | 11.2 | 77 | 11.2 | 77 | 0.2% |
| trans-HFC-1234ze/CF$_3$I | | | | | |
| 1/99 | 11.9 | 82 | 11.9 | 82 | 0.0% |
| 10/90 | 11.9 | 82 | 11.9 | 82 | 0.0% |
| 20/80 | 11.8 | 81 | 11.8 | 81 | 0.0% |
| 40/60 | 11.6 | 80 | 11.6 | 80 | 0.1% |
| 60/40 | 11.4 | 79 | 11.4 | 79 | 0.1% |
| 80/20 | 11.3 | 78 | 11.3 | 78 | 0.1% |
| 90/10 | 11.3 | 78 | 11.2 | 77 | 0.1% |
| 99/1 | 11.2 | 77 | 11.2 | 77 | 0.0% |
| HFC-32/HFC-125/trans-HFC-1234ze (25° C.) | | | | | |
| 30/40/30 | 221.5 | 1527 | 209.4 | 1444 | 5.5% |
| 30/50/20 | 227.5 | 1569 | 220.2 | 1518 | 3.2% |
| HFC-125/trans-HFC-1234ze/n-butane (25° C.) | | | | | |
| 66/32/2 | 180.4 | 1244 | 170.3 | 1174 | 5.6% |
| HFC-1243zf/HFC-134 | | | | | |
| 63.0/37.0 | 13.5 | 93 | 13.5 | 93 | 0.0% |
| 80/20 | 13.4 | 93 | 13.4 | 92 | 0.1% |
| 90/10 | 13.2 | 91 | 13.2 | 91 | 0.2% |
| 99/1 | 13.0 | 90 | 13.0 | 90 | 0.0% |
| 40/60 | 13.3 | 92 | 13.3 | 91 | 0.5% |
| 20/80 | 12.7 | 88 | 12.6 | 87 | 1.3% |
| 10/90 | 12.3 | 84 | 12.1 | 83 | 1.5% |
| 1/99 | 11.6 | 80 | 11.6 | 80 | 0.3% |
| HFC-1243zf/HFC-134a | | | | | |
| 25.1/74.9 | 15.9 | 110 | 15.9 | 110 | 0.0% |
| 10/90 | 15.8 | 109 | 15.8 | 109 | 0.1% |
| 1/99 | 15.5 | 107 | 15.5 | 107 | 0.1% |
| 40/60 | 15.8 | 109 | 15.8 | 109 | 0.2% |
| 60/40 | 15.3 | 106 | 15.1 | 104 | 1.2% |
| 80/20 | 14.4 | 99 | 14.1 | 97 | 2.1% |
| 90/10 | 13.8 | 95 | 13.5 | 93 | 1.7% |
| 99/1 | 13.1 | 90 | 13.0 | 90 | 0.2% |
| HFC-1243zf/HFC-152a | | | | | |
| 40.7/59.3 | 15.2 | 104 | 15.2 | 104 | 0.0% |
| 20/80 | 15.0 | 103 | 15.0 | 103 | 0.2% |
| 10/90 | 14.8 | 102 | 14.7 | 102 | 0.3% |
| 1/99 | 14.5 | 100 | 14.5 | 100 | 0.1% |
| 60/40 | 15.0 | 103 | 14.9 | 103 | 0.3% |
| 80/20 | 14.4 | 99 | 14.2 | 98 | 1.1% |
| 90/10 | 13.8 | 95 | 13.6 | 94 | 1.2% |
| 99/1 | 13.1 | 90 | 13.1 | 90 | 0.2% |
| HFC-1243zf/HFC-161 | | | | | |
| 1/99 | 25.2 | 174 | 25.2 | 174 | 0.0% |
| 10/90 | 24.9 | 172 | 24.8 | 171 | 0.3% |
| 20/80 | 24.5 | 169 | 24.2 | 167 | 0.9% |
| 40/60 | 23.3 | 160 | 22.6 | 156 | 2.9% |
| 60/40 | 21.5 | 148 | 20.1 | 139 | 6.3% |
| 78/22 | 18.8 | 130 | 16.9 | 117 | 10.0% |
| 90/10 | 16.2 | 111 | 14.6 | 101 | 9.5% |
| 99/1 | 13.4 | 92 | 13.1 | 90 | 1.7% |
| HFC-1243zf/HFC-227ea | | | | | |
| 78.5/21.5 | 13.1 | 90 | 13.1 | 90 | 0.0% |
| 90/10 | 13.1 | 90 | 13.1 | 90 | 0.0% |
| 99/1 | 13.0 | 90 | 13.0 | 90 | 0.0% |
| 60/40 | 13.0 | 90 | 13.0 | 89 | 0.2% |
| 40/60 | 12.6 | 87 | 12.5 | 86 | 1.1% |
| 20/80 | 11.8 | 81 | 11.5 | 79 | 2.7% |
| 10/90 | 11.1 | 76 | 10.7 | 74 | 2.8% |
| 1/99 | 10.1 | 69 | 10.0 | 69 | 0.6% |
| HFC-1243zf/HFC-236ea | | | | | |
| 99/1 | 13.0 | 89 | 13.0 | 89 | 0.0% |
| 90/10 | 12.8 | 88 | 12.7 | 87 | 0.5% |
| 80/20 | 12.5 | 86 | 12.3 | 84 | 1.8% |
| 60/40 | 11.7 | 81 | 11.0 | 76 | 6.6% |
| 53/47 | 11.4 | 79 | 10.3 | 71 | 9.9% |
| 52/48 | 11.4 | 78 | 10.2 | 70 | 10.5% |
| HFC-1243zf/HFC-236fa | | | | | |
| 99/1 | 13.0 | 89 | 12.9 | 89 | 0.1% |
| 90/10 | 12.6 | 87 | 12.5 | 86 | 1.0% |
| 80/20 | 12.2 | 84 | 11.9 | 82 | 2.5% |
| 60/40 | 11.3 | 78 | 10.5 | 73 | 6.6% |
| 49/51 | 10.6 | 73 | 9.6 | 66 | 9.9% |
| 48/52 | 10.6 | 73 | 9.5 | 65 | 10.2% |

TABLE 9-continued

| Composition wt % | Initial P (Psia) | Initial P (kPa) | After 50% Leak (Psia) | After 50% Leak (kPa) | Delta P (%) |
|---|---|---|---|---|---|
| HFC-1243zf/HFC-245fa | | | | | |
| 99/1 | 12.9 | 89 | 12.9 | 89 | 0.2% |
| 90/10 | 12.5 | 86 | 12.2 | 84 | 2.1% |
| 80/20 | 12.0 | 83 | 11.4 | 79 | 4.6% |
| 70/30 | 11.5 | 79 | 10.6 | 73 | 7.9% |
| 66/34 | 11.3 | 78 | 10.2 | 70 | 9.6% |
| 65/35 | 11.2 | 77 | 10.1 | 69 | 10.2% |
| HFC-1243zf/propane | | | | | |
| 32.8/67.2 | 31.0 | 213 | 31.0 | 213 | 0.0% |
| 10/90 | 30.3 | 209 | 30.1 | 207 | 0.7% |
| 1/99 | 29.5 | 204 | 29.5 | 203 | 0.1% |
| 60/40 | 30.1 | 208 | 29.2 | 201 | 3.2% |
| 72/28 | 29.0 | 200 | 26.1 | 180 | 10.2% |
| 71/29 | 29.2 | 201 | 26.5 | 182 | 9.3% |
| HFC-1243zf/n-butane | | | | | |
| 90.3/9.7 | 13.5 | 93 | 13.5 | 93 | 0.0% |
| 99/1 | 13.1 | 90 | 13.1 | 90 | 0.2% |
| 62/38 | 12.6 | 87 | 11.4 | 79 | 9.4% |
| 61/39 | 12.6 | 87 | 11.3 | 78 | 10.3% |
| HFC-1243zf/isobutane | | | | | |
| 80.7/19.3 | 14.3 | 98 | 14.3 | 98 | 0.0% |
| 90/10 | 14.1 | 97 | 14.0 | 96 | 0.9% |
| 99/1 | 13.2 | 91 | 13.1 | 90 | 0.7% |
| 60/40 | 13.8 | 95 | 13.4 | 92 | 3.2% |
| 45/55 | 13.1 | 91 | 11.9 | 82 | 9.5% |
| 44/56 | 13.1 | 90 | 11.8 | 81 | 10.1% |
| HFC-1243zf/DME | | | | | |
| 72.7/27.3 | 12.0 | 83 | 12.0 | 83 | 0.0% |
| 90/10 | 12.4 | 85 | 12.3 | 85 | 0.5% |
| 99/1 | 12.9 | 89 | 12.9 | 89 | 0.1% |
| 60/40 | 12.2 | 84 | 12.1 | 84 | 0.5% |
| 40/60 | 13.0 | 90 | 12.7 | 88 | 2.2% |
| 20/80 | 14.0 | 96 | 13.7 | 95 | 2.0% |
| 10/90 | 14.3 | 99 | 14.2 | 98 | 0.6% |
| 1/99 | 14.5 | 100 | 14.5 | 100 | 0.0% |
| cis-HFC-1234ze/HFC-236ea (25° C.) | | | | | |
| 20.9/79.1 | 30.3 | 209 | 30.3 | 209 | 0.0% |
| 10/90 | 30.2 | 208 | 30.2 | 208 | 0.0% |
| 1/99 | 29.9 | 206 | 29.9 | 206 | 0.0% |
| 40/60 | 30.0 | 207 | 30.0 | 207 | 0.2% |
| 60/40 | 29.2 | 201 | 28.9 | 199 | 0.9% |
| 80/20 | 27.8 | 191 | 27.4 | 189 | 1.4% |
| 90/10 | 26.8 | 185 | 26.5 | 183 | 1.1% |
| 99/1 | 25.9 | 178 | 25.8 | 178 | 0.2% |
| cis-HFC-1234ze/HFC-236fa (25° C.) | | | | | |
| 1/99 | 39.3 | 271 | 39.3 | 271 | 0.0% |
| 10/90 | 38.6 | 266 | 38.4 | 265 | 0.3% |
| 20/80 | 37.6 | 259 | 37.3 | 257 | 0.9% |
| 40/60 | 35.4 | 244 | 34.5 | 238 | 2.5% |
| 60/40 | 32.8 | 226 | 31.4 | 216 | 4.3% |
| 78/22 | 29.6 | 204 | 28.2 | 195 | 4.8% |
| 90/10 | 27.8 | 192 | 26.9 | 185 | 3.4% |
| 99/1 | 26.0 | 179 | 25.8 | 178 | 0.5% |
| cis-HFC-1234ze/HFC-245fa (25° C.) | | | | | |
| 76.2/23.7 | 26.2 | 180 | 26.2 | 180 | 0.0% |
| 90/10 | 26.0 | 179 | 26.0 | 179 | 0.0% |
| 99/1 | 25.8 | 178 | 25.8 | 178 | 0.0% |
| 60/40 | 26.0 | 179 | 25.9 | 179 | 0.2% |
| 40/60 | 25.3 | 174 | 25.0 | 173 | 0.9% |
| 20/80 | 23.9 | 164 | 23.5 | 162 | 1.7% |
| 10/90 | 22.8 | 157 | 22.5 | 155 | 1.5% |
| 1/99 | 21.6 | 149 | 21.5 | 149 | 0.2% |
| cis-HFC-1234ze/n-butane | | | | | |
| 51.4/48.6 | 6.1 | 42 | 6.1 | 42 | 0.0% |
| 80/20 | 5.8 | 40 | 5.2 | 36 | 9.3% |
| 81/19 | 5.8 | 40 | 5.2 | 36 | 10.4% |
| 40/60 | 6.1 | 42 | 6.0 | 41 | 0.7% |
| 20/80 | 5.8 | 40 | 5.6 | 39 | 3.3% |
| 10/90 | 5.6 | 38 | 5.4 | 37 | 3.1% |
| 1/99 | 5.3 | 36 | 5.2 | 36 | 0.6% |
| cis-HFC-1234ze/isobutane | | | | | |
| 26.2/73.8 | 8.7 | 60 | 8.7 | 60 | 0.0% |
| 10/90 | 8.7 | 60 | 8.6 | 59 | 0.3% |
| 1/99 | 8.5 | 59 | 8.5 | 59 | 0.0% |
| 40/60 | 8.7 | 60 | 8.6 | 60 | 0.5% |
| 60/40 | 8.4 | 58 | 8.0 | 55 | 4.3% |
| 70/30 | 8.1 | 56 | 7.3 | 50 | 10.3% |
| 69/31 | 8.2 | 56 | 7.4 | 51 | 9.4% |
| cis-HFC-1234ze/2-methylbutane (25° C.) | | | | | |
| 86.6/13.4 | 27.3 | 188 | 27.3 | 188 | 0.0% |
| 90/10 | 27.2 | 187 | 27.2 | 187 | 0.1% |
| 99/1 | 26.0 | 180 | 25.9 | 179 | 0.5% |
| 60/40 | 25.8 | 178 | 24.0 | 166 | 6.9% |
| 55/45 | 25.3 | 174 | 22.8 | 157 | 10.0% |
| cis-HFC-1234ze/n-pentane (25° C.) | | | | | |
| 92.9/9.1 | 26.2 | 181 | 26.2 | 181 | 0.0% |
| 99/1 | 25.9 | 178 | 25.9 | 178 | 0.1% |
| 80/20 | 25.6 | 177 | 25.2 | 174 | 1.8% |
| 70/30 | 24.8 | 171 | 23.5 | 162 | 5.6% |
| 64/36 | 24.3 | 167 | 22.0 | 152 | 9.2% |
| 63/37 | 24.2 | 167 | 21.8 | 150 | 9.9% |
| HFC-1234ye/HFC-134 (25° C.) | | | | | |
| 1/99 | 75.9 | 523 | 75.8 | 523 | 0.1% |
| 10/90 | 73.8 | 509 | 73.0 | 503 | 1.1% |
| 20/80 | 71.3 | 491 | 69.0 | 476 | 3.1% |
| 38/62 | 66.0 | 455 | 59.6 | 411 | 9.7% |
| 39/61 | 65.7 | 453 | 58.9 | 406 | 10.2% |
| HFC-1234ye/HFC-236ea (−25° C.) | | | | | |
| 24.0/76.0 | 3.4 | 23 | 3.4 | 23 | 0.0% |
| 10/90 | 3.3 | 23 | 3.3 | 23 | 0.3% |
| 1/99 | 3.3 | 23 | 3.3 | 23 | 0.0% |
| 40/60 | 3.3 | 23 | 3.3 | 23 | 0.0% |
| 60/40 | 3.2 | 22 | 3.2 | 22 | 0.9% |
| 80/20 | 3.1 | 21 | 3.0 | 21 | 1.6% |
| 90/10 | 2.9 | 20 | 2.9 | 20 | 1.4% |
| 99/1 | 2.8 | 19 | 2.8 | 19 | 0.0% |
| HFC-1234ye/HFC-236fa (25° C.) | | | | | |
| 1/99 | 39.2 | 270 | 39.2 | 270 | 0.1% |
| 10/90 | 37.7 | 260 | 37.3 | 257 | 1.1% |
| 20/80 | 36.1 | 249 | 35.2 | 243 | 2.5% |
| 40/60 | 32.8 | 226 | 31.0 | 213 | 5.7% |
| 60/40 | 29.3 | 202 | 26.7 | 184 | 8.8% |
| 78/22 | 25.4 | 175 | 23.1 | 159 | 9.1% |
| 90/10 | 23.2 | 160 | 21.7 | 150 | 6.3% |
| 99/1 | 21.0 | 145 | 20.8 | 144 | 0.8% |
| HFC-1234ye/HFC-245fa (25° C.) | | | | | |
| 42.5/57.5 | 22.8 | 157 | 22.8 | 157 | 0.0% |
| 20/80 | 22.5 | 155 | 22.4 | 155 | 0.3% |
| 10/90 | 22.1 | 152 | 22.0 | 152 | 0.3% |
| 1/99 | 21.5 | 148 | 21.5 | 148 | 0.0% |
| 60/40 | 22.6 | 156 | 22.6 | 156 | 0.2% |
| 80/20 | 22.0 | 152 | 21.9 | 151 | 0.6% |
| 90/10 | 21.5 | 148 | 21.3 | 147 | 0.6% |
| 99/1 | 20.8 | 144 | 20.8 | 143 | 0.1% |
| HFC-1234ye/cis-HFC-1234ze (25° C.) | | | | | |
| 1/99 | 25.7 | 177 | 25.7 | 177 | 0.0% |
| 10/90 | 25.6 | 176 | 25.6 | 176 | 0.0% |
| 20/80 | 25.3 | 175 | 25.3 | 174 | 0.1% |
| 40/60 | 24.7 | 170 | 24.5 | 169 | 0.5% |
| 60/40 | 23.7 | 163 | 23.5 | 162 | 1.0% |
| 78/22 | 22.4 | 155 | 22.2 | 153 | 1.2% |
| 90/10 | 21.7 | 149 | 21.5 | 148 | 0.9% |
| 99/1 | 20.9 | 144 | 20.8 | 144 | 0.1% |

TABLE 9-continued

| Composition wt % | Initial P (Psia) | Initial P (kPa) | After 50% Leak (Psia) | After 50% Leak (kPa) | Delta P (%) |
|---|---|---|---|---|---|
| HFC-1234ye/n-butane (25° C.) | | | | | |
| 41.2/58.8 | 38.0 | 262 | 38.0 | 262 | 0.0% |
| 20/80 | 37.3 | 257 | 37.0 | 255 | 0.8% |
| 10/90 | 36.4 | 251 | 36.1 | 249 | 0.9% |
| 1/99 | 35.4 | 244 | 35.3 | 243 | 0.2% |
| 60/40 | 37.4 | 258 | 36.9 | 254 | 1.4% |
| 70/30 | 36.5 | 252 | 34.9 | 241 | 4.4% |
| 78/22 | 35.3 | 243 | 31.8 | 219 | 9.9% |
| 79/21 | 35.1 | 242 | 31.3 | 216 | 10.9% |
| HFC-1234ye/cyclopentane (25° C.) | | | | | |
| 99/1 | 20.7 | 143 | 20.7 | 143 | 0.0% |
| 90/10 | 20.3 | 140 | 20.0 | 138 | 1.0% |
| 80/20 | 19.5 | 134 | 18.7 | 129 | 4.1% |
| 70/30 | 18.6 | 128 | 16.9 | 116 | 9.5% |
| 69/31 | 18.5 | 128 | 16.6 | 115 | 10.3% |
| HFC-1234ye/isobutane (25° C.) | | | | | |
| 16.4/83.6 | 50.9 | 351 | 50.9 | 351 | 0.0% |
| 10/90 | 50.9 | 351 | 50.9 | 351 | 0.0% |
| 1/99 | 50.5 | 348 | 50.5 | 348 | 0.0% |
| 40/60 | 50.1 | 345 | 49.6 | 342 | 1.0% |
| 60/40 | 47.8 | 330 | 45.4 | 313 | 5.2% |
| 68/32 | 46.4 | 320 | 42.0 | 289 | 9.5% |
| 69/31 | 46.2 | 318 | 41.4 | 286 | 10.3% |
| HFC-1234ye/2-methylbutane (25° C.) | | | | | |
| 80.3/19.7 | 23.1 | 159 | 23.1 | 159 | 0.0% |
| 90/10 | 22.8 | 157 | 22.6 | 156 | 1.1% |
| 99/1 | 21.2 | 146 | 20.9 | 144 | 1.0% |
| 60/40 | 22.5 | 155 | 21.7 | 149 | 3.6% |
| 47/53 | 21.5 | 148 | 19.4 | 134 | 9.6% |
| 46/54 | 21.4 | 148 | 19.2 | 133 | 10.1% |
| HFC-1234ye/n-pentane (25° C.) | | | | | |
| 87.7/12.3 | 21.8 | 150 | 21.8 | 150 | 0.0% |
| 95/5 | 21.5 | 149 | 21.4 | 148 | 0.5% |
| 99/1 | 21.0 | 145 | 20.9 | 144 | 0.4% |
| 60/40 | 20.5 | 141 | 18.9 | 131 | 7.7% |
| 57/43 | 20.3 | 140 | 18.3 | 126 | 9.7% |
| 56/44 | 20.2 | 139 | 18.1 | 125 | 10.4% |

The difference in vapor pressure between the original composition and the composition remaining after 50 weight percent is removed is less then about 10 percent for compositions of the present invention. This indicates that the compositions of the present invention would be azeotropic or near-azeotropic.

Example 2

Refrigeration Performance Data

Table 10 shows the performance of various refrigerant compositions of the present invention as compared to HFC-134a. In Table 10, Evap Pres is evaporator pressure, Cond Pres is condenser pressure, Comp Disch T is compressor discharge temperature, COP is energy efficiency, and CAP is capacity. The data are based on the following conditions.
Evaporator temperature 40.0° F. (4.4° C.)
Condenser temperature 130.0° F. (54.4° C.)
Subcool amount 10.0° F. (5.5° C.)
Return gas temperature 60.0° F. (15.6° C.)
Compressor efficiency is 100%
Note that the superheat is included in cooling capacity.

TABLE 10

| Composition (wt %) | Evap Pres (Psia) | Evap Pres (kPa) | Cond Pres (Psia) | Cond Pres (kPa) | Comp Disch T (F.) | Comp Disch T (C.) | Cap (Btu/min) | Cap (kW) | COP |
|---|---|---|---|---|---|---|---|---|---|
| HFC-134a | 50.3 | 346 | 214 | 1476 | 156 | 68.9 | 213 | 3.73 | 4.41 |
| HFC-1225ye | 37.6 | 259 | 165 | 1138 | 146 | 63.3 | 162 | 2.84 | 4.41 |
| HFC-1225ye/HFC-152a (85/15) | 39.8 | 274 | 173 | 1193 | 151 | 66.1 | 173 | 3.03 | 4.45 |
| HFC-1225ye/HFC-32 (95/5) | 46.5 | 321 | 197 | 1358 | 151 | 66.1 | 200 | 3.50 | 4.53 |
| HFC-1225ye/HFC-32 (96/4) | 44.2 | 305 | 189 | 1303 | 150 | 65.6 | 191 | 3.35 | 4.51 |
| HFC-1225ye/HFC-32 (97/3) | 43.1 | 297 | 184 | 1269 | 149 | 65.0 | 186 | 3.26 | 4.50 |
| HFC-1225ye/HFC-32 (94/6) | 47.3 | 326 | 200 | 1379 | 153 | 67.2 | 203 | 3.56 | 4.52 |
| HFC-1225ye/HFC-32 (93/7) | 48.8 | 336 | 205 | 1413 | 154 | 67.8 | 210 | 3.68 | 4.53 |
| HFC-1225ye/HFC-32 (90/10) | 53.0 | 365 | 222 | 1531 | 157 | 69.4 | 227 | 3.98 | 4.52 |
| HFC-1225ye/HFC-134a (90/10) | 39.5 | 272 | 172 | 1186 | 147 | 63.9 | 169 | 2.96 | 4.40 |
| HFC-1225ye/CO$_2$ (99/1) | 43.2 | 298 | 179 | 1234 | 146 | 63.3 | 177 | 3.10 | 4.63 |
| HFC-1225ye/HFC-134a/HFC-32 (88/9/3) | 44.5 | 307 | 190 | 1310 | 150 | 65.6 | 191 | 3.35 | 4.49 |
| HFC-1225ye/HFC-134a/HFC-32 (88/8/4) | 45.5 | 314 | 194 | 1338 | 151 | 66.1 | 195 | 3.42 | 4.49 |
| HFC-1225ye/HFC-134a/HFC-152a (76/9/15) | 41.0 | 283 | 178 | 1227 | 153 | 67.2 | 178 | 3.12 | 4.44 |
| HFC-1225ye/HFC-134a/HFC-161 (86/10/4) | 42.0 | 290 | 181 | 1248 | 150 | 65.6 | 179 | 3.13 | 4.42 |
| HFC-1225ye/HFC-134a/propane (87/10/3) | 47.0 | 324 | 195 | 1345 | 148 | 64.4 | 197 | 3.45 | 4.49 |
| HFC-1225ye/HFC-134a/i-butane (87/10/3) | 41.7 | 288 | 178 | 1227 | 146 | 63.3 | 175 | 3.06 | 4.39 |
| HFC-1225ye/HFC-134a/DME (87/10/3) | 38.7 | 267 | 169 | 1165 | 149 | 65.0 | 168 | 2.94 | 4.44 |
| HFC-1225ye/HFC-134a/CO$_2$ (88.5/11/.5) | 42.4 | 292 | 180 | 1241 | 147 | 63.9 | 182 | 3.18 | 4.51 |
| HFC-1225ye/HFC-134/HFC-32 (88/9/3) | 43.0 | 296 | 185 | 1276 | 150 | 65.6 | 187 | 3.27 | 4.51 |

TABLE 10-continued

| Composition (wt %) | Evap Pres (Psia) | Evap Pres (kPa) | Cond Pres (Psia) | Cond Pres (kPa) | Comp Disch T (F.) | Comp Disch T (C.) | Cap (Btu/min) | Cap (kW) | COP |
|---|---|---|---|---|---|---|---|---|---|
| HFC-1225ye/HFC-152a/HFC-32 (85/10/5) | 46.7 | 322 | 198 | 1365 | 155 | 68.3 | 203 | 3.55 | 4.53 |
| HFC-1225ye/HFC-152a/HFC-32 (81/15/4) | 45.5 | 314 | 193 | 1331 | 155 | 68.3 | 198 | 3.47 | 4.52 |
| HFC-1225ye/HFC-152a/HFC-32 (82/15/3) | 44.1 | 304 | 188 | 1296 | 155 | 68.3 | 192 | 3.36 | 4.50 |
| HFC-1225ye/HFC-152a/propane (85/13/2) | 44.4 | 306 | 185 | 1276 | 151 | 66.1 | 190 | 3.33 | 4.52 |
| HFC-1225ye/HFC-152a/i-butane (85/13/2) | 40.9 | 282 | 176 | 1214 | 150 | 65.6 | 175 | 3.06 | 4.44 |
| HFC-1225ye/HFC-152a/DME (85/13/2) | 39.0 | 269 | 170 | 1172 | 152 | 66.7 | 171 | 3.00 | 4.46 |
| HFC-1225ye/HFC-152a/$CO_2$ (84/15/1) | 44.8 | 309 | 185 | 1276 | 151 | 66.1 | 195 | 3.42 | 4.64 |
| HFC-1225ye/HFC-152a/$CO_2$ (84/15.5/0.5) | 42.3 | 292 | 179 | 1234 | 151 | 66.1 | 184 | 3.22 | 4.55 |
| HFC-1225ye/HFC-152a/$CF_3I$ (70/20/10) | 42.0 | 290 | 180 | 1241 | 155 | 68.3 | 181 | 3.17 | 4.46 |
| HFC-1234yf/HFC-32 (95/5) | 58.6 | 404 | 230 | 1586 | 149 | 65.0 | 228 | 4.00 | 4.36 |
| HFC-1234yf/HFC-134a (90/10) | 52.7 | 363 | 210 | 1448 | 145 | 62.8 | 206 | 3.61 | 4.33 |
| HFC-1234yf/HFC-152a (80/20) | 53.5 | 369 | 213 | 1468 | 150 | 65.6 | 213 | 3.73 | 4.38 |
| trans-HFC-1234ze/HFC-32 (95/5) | 42.6 | 294 | 183 | 1262 | 153 | 67.2 | 186 | 3.26 | 4.51 |
| trans-HFC-1234ze/HFC-32/$CF_3I$ (70/2/28) | 43.5 | 300 | 182 | 1255 | 154 | 67.8 | 184 | 3.22 | 4.46 |
| trans-HFC-1234ze/HFC-134a (90/10) | 38.1 | 263 | 166 | 1145 | 149 | 65.0 | 165 | 2.89 | 4.44 |
| trans-HFC-1234ze/HFC-152a (80/20) | 41.0 | 284 | 176 | 1214 | 154 | 67.8 | 177 | 3.10 | 4.48 |
| trans-HFC-1234ze/HFC-125 (96/4) | 38.6 | 266 | 167 | 1151 | 148 | 64.4 | 167 | 2.92 | 4.45 |
| HFC-1225ye/HFC-1234yf (51/49) | 46.0 | 317 | 190 | 1310 | 145 | 62.8 | 186 | 3.26 | 4.35 |
| HFC-1225ye/HFC-1234yf (60/40) | 44.0 | 303 | 187 | 1289 | 146 | 63.3 | 179 | 3.13 | 4.30 |
| HFC-1225ye/HFC-1234yf/HFC-134a (70/20/10) | 43.0 | 296 | 183 | 1261 | 147 | 63.9 | 179 | 3.13 | 4.38 |
| HFC-1225ye/HFC-1234yf/HFC-134a (20/70/10) | 50.7 | 350 | 205 | 1412 | 145 | 62.8 | 200 | 3.50 | 4.34 |
| HFC-1225ye/HFC-1234yf/HFC-32 (25/73/2) | 53.0 | 365 | 212 | 1464 | 146 | 63.3 | 210 | 3.68 | 4.37 |
| HFC-1225ye/HFC-1234yf/HFC-32 (75/23/2) | 45.3 | 312 | 190 | 1312 | 148 | 64.4 | 189 | 3.31 | 4.43 |
| HFC-1225ye/HFC-1234yf/HFC-32 (85/10/5) | 47.6 | 328 | 200 | 1379 | 151 | 66.1 | 203 | 3.56 | 4.50 |
| HFC-1234yf/HFC-32/$CF_3I$ (60/1/39)) | 56.2 | 387 | 217 | 1496 | 151 | 66.1 | 217 | 3.80 | 4.35 |
| HFC-1234yf/$CF_3I$ (60/40) comparative? | 54.1 | 373 | 210 | 1448 | 149 | 65.0 | 209 | 3.66 | 4.34 |
| HFC-1234yf/HFC-125/$CF_3I$ (70/4/26) | 56.8 | 392 | 220 | 1517 | 147 | 63.9 | 217 | 3.80 | 4.31 |
| HFC-1234yf/HFC-125/$CF_3I$ (80/4/16) | 56.4 | 389 | 219 | 1510 | 146 | 63.3 | 215 | 3.77 | 4.32 |
| HFC-1234yf/HFC-125 (96/4) | 55.1 | 380 | 217 | 1496 | 144 | 62.2 | 212 | 3.71 | 4.31 |
| HFC-1234yf/HFC-134a/$CF_3I$ (70/10/20) | 54.7 | 377 | 215 | 1482 | 148 | 64.4 | 211 | 3.70 | 4.32 |
| HFC-1234yf/HFC-152a/$CF_3I$ (50/10/40) | 55.1 | 380 | 214 | 1475 | 154 | 67.8 | 216 | 3.78 | 4.36 |

Several compositions have even higher energy efficiency (COP) than HFC-134a while maintaining lower discharge pressures and temperatures. Capacity for the compositions listed in Table 10 is also similar to R134a indicating these compositions could be replacement refrigerants for R134a in refrigeration and air-conditioning, and in mobile air-conditioning applications in particular. Results also show cooling capacity of HFC-1225ye can be improved with addition of other compounds such as HFC-32, HFC-134a, CO2 or HFC-1234yf. Those compositions containing hydrocarbon may also improve oil solubility with conventional mineral oil and alkyl benzene lubricants.

Example 3

Refrigeration Performance Data

Table 11 shows the performance of various refrigerant compositions of the present invention as compared to R404A and R422A. In Table 11, Evap Pres is evaporator pressure, Cond Pres is condenser pressure, Comp Disch T is compressor discharge temperature, EER is energy efficiency, and CAP is capacity. The data are based on the following conditions.

Evaporator temperature −17.8° C.
Condenser temperature 46.1° C.
Subcool amount 5.5° C.
Return gas temperature 15.6° C.
Compressor efficiency is 70%

Note that the superheat is included in cooling capacity.

TABLE 11

| | wt % | Evap Press (kPa) | Cond P Press (kPa) | Compr Disch T (C.) | CAP (kJ/m3) | EER |
|---|---|---|---|---|---|---|
| Existing Refrigerant Product | | | | | | |
| R22 | | 267 | 1774 | 144 | 1697 | 4.99 |
| R404A | | 330 | 2103 | 101.1 | 1769 | 4.64 |
| R507A | | 342 | 2151 | 100.3 | 1801 | 4.61 |
| R422A | | 324 | 2124 | 95.0 | 1699 | 4.54 |
| Candidate Replacement | | | | | | |
| HFC-125/HFC-1225ye/isobutane | 85.1/11.5/3.4 | 330 | 2137 | 93.3 | 1699 | 4.50 |
| HFC-125/trans-HFC-1234ze/isobutane | 86.1/11.5/2.4 | 319 | 2096 | 94.4 | 1669 | 4.52 |
| HFC-125/HFC-1234yf/isobutane | 87.1/11.5/1.4 | 343 | 2186 | 93.3 | 1758 | 4.52 |
| HFC-125/HFC-1225ye/n-butane | 85.1/11.5/3.4 | 322 | 2106 | 93.5 | 1674 | 4.52 |
| HFC-125/trans-HFC-1234ze/n-butane | 86.1/11.5/2.4 | 314 | 2083 | 94.8 | 1653 | 4.53 |
| HFC-125/HFC-1234yf/n-butane | 87.1/11.5/1.4 | 340 | 2173 | 93.4 | 1748 | 4.53 |
| HFC-32/HFC-125/HFC-1225ye | 10/10/'80 | 173 | 1435 | 107 | 1159 | 4.97 |
| HFC-32/HFC-125/HFC-1225ye | 25/25/50 | 276 | 2041 | 120 | 1689 | 4.73 |
| HFC-32/HFC-125/HFC-1225ye | 25/40/35 | 314 | 2217 | 119 | 1840 | 4.66 |
| HFC-32/HFC-125/HFC-1225ye | 30/10/60 | 265 | 1990 | 125 | 1664 | 4.78 |
| HFC-32/HFC-125/HFC-1225ye | 30/15/55 | 276 | 2046 | 125 | 1710 | 4.76 |
| HFC-32/HFC-125/HFC-1225ye | 30/20/50 | 287 | 2102 | 124 | 1757 | 4.73 |
| HFC-32/HFC-125/HFC-1225ye | 30/30/40 | 311 | 2218 | 124 | 1855 | 4.68 |
| HFC-32/HFC-125/HFC-1225ye | 30/35/35 | 324 | 2271 | 123 | 1906 | 4.66 |
| HFC-32/HFC-125/HFC-1225ye | 35/15/50 | 296 | 2157 | 129 | 1820 | 4.72 |
| HFC-32/HFC-125/HFC-1225ye | 35/20/45 | 308 | 2212 | 129 | 1868 | 4.70 |
| HFC-32/HFC-125/HFC-1225ye | 35/30/35 | 332 | 2321 | 127 | 1968 | 4.66 |
| HFC-32/HFC-125/HFC-1225ye | 35/40/25 | 357 | 2424 | 126 | 2068 | 4.64 |
| HFC-32/HFC-125/HFC-1225ye | 50/30/20 | 390 | 2584 | 138 | 2277 | 4.54 |
| HFC-32/HFC-125/HFC-1225ye | 40/30/30 | 353 | 2418 | 131 | 2077 | 4.66 |
| HFC-32/HFC-125/HFC-1225ye | 40/35/25 | 364 | 2465 | 131 | 2124 | 4.64 |
| HFC-32/HFC-125/HFC-1225ye | 45/30/25 | 372 | 2505 | 135 | 2180 | 4.66 |
| HFC-32/HFC-125/HFC-152a/HFC-1225ye | 10/20/10/60 | 190 | 1517 | 110 | 1255 | 4.97 |
| HFC-32/HFC-125/HFC-152a/HFC-1225ye | 15/25/10/50 | 221 | 1709 | 115 | 1422 | 4.90 |
| HFC-32/HFC-125/HFC-152a/HFC-1225ye | 20/20/15/45 | 229 | 1755 | 121 | 1485 | 4.90 |
| HFC-32/CF$_3$I/HFC-1225ye | 30/20/50 | 272 | 1984 | 130 | 1706 | 4.80 |
| HFC-32/CF$_3$I/HFC-1225ye | 40/10/50 | 299 | 2159 | 137 | 1860 | 4.73 |
| HFC-32/CF$_3$I/HFC-1225ye | 30/30/40 | 286 | 2030 | 133 | 1774 | 4.80 |
| HFC-32/CF$_3$I/HFC-1225ye | 30/60/10 | 314 | 2120 | 144 | 1911 | 4.75 |
| HFC-32/CF$_3$I/HFC-1225ye | 40/20/40 | 315 | 2214 | 139 | 1936 | 4.73 |

TABLE 11-continued

| | wt % | Evap Press (kPa) | Cond P Press (kPa) | Compr Disch T (C.) | CAP (kJ/m3) | EER |
|---|---|---|---|---|---|---|
| HFC-32/CF$_3$I/HFC-1225ye | 30/50/20 | 309 | 2101 | 139 | 1885 | 4.78 |
| HFC-32/CF$_3$I/HFC-1225ye | 40/40/20 | 346 | 2309 | 145 | 2079 | 4.71 |
| HFC-32/CF$_3$I/HFC-1225ye | 45/45/10 | 373 | 2432 | 152 | 2217 | 4.67 |
| HFC-32/CF$_3$I/HFC-1225ye | 45/10/45 | 319 | 2260 | 141 | 1964 | 4.71 |
| HFC-32/CF$_3$I/HFC-1225ye | 50/10/40 | 338 | 2353 | 145 | 2065 | 4.68 |
| HFC-32/CF$_3$I/HFC-1225ye | 50/20/30 | 356 | 2410 | 147 | 2150 | 4.68 |
| HFC-32/CF$_3$I/HFC-1225ye | 25/5/70 | 230 | 1781 | 122 | 1495 | 4.90 |
| HFC-32/CF$_3$I/HFC-1225ye | 60/30/10 | 409 | 2626 | 158 | 2434 | 4.66 |
| HFC-32/CF$_3$I/HFC-1225ye | 50/25/25 | 364 | 2437 | 149 | 2192 | 4.68 |
| HFC-32/CF$_3$I/HFC-1225ye | 50/20/30 | 356 | 2410 | 147 | 2156 | 4.68 |
| HFC-32/CF$_3$I/HFC-1225ye | 25/50/25 | 284 | 1964 | 134 | 1754 | 4.85 |
| HFC-32/CF$_3$I/HFC-1225ye | 45/30/25 | 353 | 2368 | 146 | 2124 | 4.71 |
| HFC-32/CF$_3$I/HFC-1234yf | 5/50/45 | 199 | 1377 | 107 | 1254 | 5.11 |
| HFC-32/CF$_3$I/HFC-1234yf | 5/30/65 | 197 | 1382 | 103 | 1241 | 5.11 |
| HFC-32/CF$_3$I/HFC-1234yf | 10/25/65 | 220 | 1542 | 107 | 1374 | 5.04 |
| HFC-32/CF$_3$I/HFC-1234yf | 20/10/70 | 255 | 1786 | 114 | 1577 | 4.95 |
| HFC-32/CF$_3$I/HFC-1234yf | 30/10/60 | 295 | 2020 | 123 | 1795 | 4.88 |
| HFC-32/CF$_3$I/HFC-1234yf | 30/20/50 | 305 | 2057 | 125 | 1843 | 4.85 |
| HFC-32/CF$_3$I/HFC-1234yf | 30/30/40 | 314 | 2091 | 128 | 1887 | 4.85 |
| HFC-32/CF$_3$I/HFC-1234yf | 20/40/40 | 275 | 1861 | 121 | 1679 | 4.92 |
| HFC-32/CF$_3$I/HFC-1234yf | 10/40/50 | 225 | 1558 | 111 | 1404 | 5.04 |
| HFC-32/CF$_3$I/HFC-1234yf | 50/20/30 | 378 | 2447 | 143 | 2238 | 4.73 |
| HFC-32/CF$_3$I/HFC-1234yf | 40/30/30 | 354 | 2305 | 137 | 2099 | 4.76 |
| HFC-32/CF$_3$I/HFC-1234yf | 40/40/20 | 360 | 2336 | 142 | 2136 | 4.74 |
| HFC-32/CF$_3$I/HFC-1234yf | 35/35/30 | 338 | 2217 | 135 | 2015 | 4.78 |
| HFC-32/CF$_3$I/HFC-1234yf | 35/30/35 | 334 | 2202 | 133 | 1996 | 4.80 |
| HFC-32/CF$_3$I/HFC-1234yf | 50/25/25 | 384 | 2468 | 145 | 2267 | 4.72 |
| HFC-32/CF$_3$I/HFC-1225ye/HFC-1234yf | 40/20/20/20 | 331 | 2246 | 136 | 1999 | 4.76 |
| HFC-32/CF$_3$I/HFC-1225ye/HFC-1234yf | 30/20/25/25 | 290 | 2029 | 127 | 1782 | 4.83 |
| HFC-32/CF$_3$I/HFC-1225ye/HFC-1234yf | 30/10/30/30 | 279 | 1987 | 125 | 1728 | 4.83 |
| HFC-32/HFC-125/HFC-1234yf/HFC-1225ye | 25/25/25/25 | 297 | 2089 | 118 | 1772 | 4.76 |
| HFC-32/HFC-125/HFC-1234yf/HFC-1225ye | 20/30/25/25 | 286 | 2025 | 113 | 1702 | 4.64 |
| HFC-32/HFC-125/HFC-1234yf/HFC-1225ye | 20/30/30/20 | 290 | 2033 | 113 | 1717 | 4.76 |
| HFC-32/HFC-125/HFC-1234yf/HFC-1225ye | 20/30/40/10 | 297 | 2048 | 112 | 1746 | 4.78 |
| HFC-32/HFC-125/HFC-1234yf/HFC-1225ye | 30/30/20/20 | 328 | 2251 | 122 | 1925 | 4.71 |
| HFC-32/HFC-125/HFC-1234yf/HFC-1225ye | 30/30/1/39 | 312 | 2217 | 123 | 1858 | 4.68 |
| HFC-32/HFC-125/HFC-1234yf/HFC-1225ye | 30/30/39/1 | 342 | 2275 | 120 | 1979 | 4.73 |
| HFC-32/HFC-125/HFC-1234yf/HFC-1225ye | 30/30/10/30 | 320 | 2235 | 123 | 1891 | 4.68 |
| HFC-32/HFC-125/HFC-1234yf/HFC-1225ye | 35/30/5/30 | 337 | 2330 | 127 | 1986 | 4.66 |
| HFC-32/HFC-125/HFC-1234yf/HFC-1225ye | 20/15/10/55 | 240 | 1818 | 115 | 1513 | 4.85 |
| HFC-32/HFC-125/HFC-1234yf/HFC-1225ye | 30/15/10/45 | 284 | 2066 | 124 | 1743 | 4.76 |
| HFC-32/HFC-125/HFC-1234yf/HFC-1225ye | 40/30/15/15 | 341 | 2364 | 132 | 2022 | 4.66 |
| HFC-32/HFC-125/CF$_3$I/HFC-1234yf/HFC-1225ye | 30/25/5/35/5 | 335 | 2240 | 121 | 1954 | 4.76 |
| HFC-32/HFC-125/CF$_3$I/HFC-1234yf | 30/25/5/40 | 338 | 2245 | 121 | 1966 | 4.76 |
| HFC-32/HFC-125/HFC-1234yf/HFC-1225ye/isobutane | 25/35/35/5 | 323 | 2195 | 115 | 1837 | 4.64 |

TABLE 11-continued

| | wt % | Evap Press (kPa) | Cond P Press (kPa) | Compr Disch T (C.) | CAP (kJ/m3) | EER |
|---|---|---|---|---|---|---|
| HFC-32/HFC-125/HFC-1225ye/isobutane | 25/38/35/2 | 318 | 2214 | 117 | 1837 | 4.64 |
| HFC-32/HFC-125/HFC-1225ye/propane | 25/38/35/2 | 330 | 2297 | 118 | 1892 | 4.59 |
| HFC-32/CF$_3$I/HFC-1225ye/DME | 50/20/25/5 | 321 | 2252 | 150 | 2010 | 4.76 |
| HFC-32/HFC-125/HFC-1225ye/DME | 35/30/30/5 | 293 | 2135 | 131 | 1823 | 4.76 |
| HFC-32/HFC-125/HFC-1225ye/DME | 35/33/30/2 | 320 | 2268 | 129 | 1925 | 4.68 |
| HFC-32/HFC-125/HFC-1225ye/DME | 35/35/28/2 | 324 | 2288 | 129 | 1943 | 4.68 |
| HFC-32/HFC-125/HFC-1234yf | 25/50/25 | 365 | 2376 | 115 | 2040 | 4.66 |
| HFC-32/HFC-125/HFC-1234yf | 30/30/40 | 343 | 2276 | 120 | 1982 | 4.73 |
| HFC-32/HFC-125/HFC-1234yf | 20/30/50 | 303 | 2059 | 112 | 1770 | 4.78 |
| HFC-32/HFC-125/CF$_3$I/HFC-1234yf | 25/25/10/40 | 323 | 2154 | 118 | 1884 | 4.78 |
| HFC-32/HFC-125/CF$_3$I/HFC-1225ye | 25/25/10/40 | 291 | 2088 | 121 | 1757 | 4.73 |
| HFC-32/HFC-125/CF$_3$I/HFC-1225ye | 20/30/10/40 | 279 | 2017 | 117 | 1680 | 4.73 |
| HFC-32/HFC-125/CF$_3$I/HFC-1225ye | 20/35/5/40 | 285 | 2056 | 116 | 1699 | 4.71 |
| HFC-32/HFC-1225ye | 20/80 | 200 | 1620 | 117 | 1331 | 4.91 |
| HFC-32/HFC-1225ye | 30/70 | 246 | 1879 | 126 | 1587 | 4.85 |
| HFC-32/HFC-1225ye | 40/60 | 284 | 2101 | 134 | 1788 | 4.74 |
| HFC-32/HFC-1225ye/CF$_3$I | 40/50/10 | 299 | 2159 | 137 | 1860 | 4.74 |
| HFC-32/HFC-1225ye/CF$_3$I | 50/40/10 | 337 | 2353 | 145 | 2065 | 4.69 |
| HFC-32/HFC-134a/HFC-1225ye | 30/20/50 | 242 | 1854 | 128 | 1578 | 4.88 |
| FC-32/HFC-134a/HFC-1225ye | 40/10/50 | 281 | 2078 | 135 | 1783 | 4.78 |
| FC-32/HFC-134a/HFC-1225ye | 40/20/40 | 277 | 2053 | 136 | 1775 | 4.81 |
| FC-32/HFC-134a/HFC-1225ye | 40/30/30 | 274 | 2029 | 137 | 1762 | 4.85 |
| FC-32/HFC-134a/HFC-1225ye | 40/40/20 | 269 | 2004 | 138 | 1747 | 4.86 |
| FC-32/HFC-134a/HFC-1225ye | 50/30/20 | 302 | 2189 | 145 | 1929 | 4.79 |
| HFC-32/HFC-134a/HFC-1225ye/CF$_3$I | 40/30/20/10 | 287 | 2081 | 139 | 1828 | 4.88 |
| HFC-32/HFC-134a/HFC-1225ye/CF$_3$I | 40/30/15/15 | 294 | 2106 | 140 | 1862 | 4.81 |
| HFC-32/HFC-134a/HFC-1225ye/CF$_3$I | 30/30/30/10 | 254 | 1891 | 130 | 1637 | 4.88 |
| HFC-32/HFC-125/HFC-134a/HFC-1225ye/CF$_3$I | 30/10/30/15/15 | 280 | 2016 | 131 | 1756 | 4.83 |
| HFC-32/HFC-125/HFC-134a/HFC-1225ye/CF$_3$I | 30/10/20/20/20 | 291 | 2064 | 131 | 1802 | 4.81 |
| HFC-32/HFC-134a/HFC-1225ye/HFC-1234yf | 30/30/20/20 | 253 | 1877 | 127 | 1628 | 4.91 |
| HFC-32/HFC-134a/HFC-1225ye/HFC-1234yf | 30/30/10/30 | 259 | 1892 | 126 | 1651 | 4.90 |
| HFC-32/HFC-134a/HFC-1225ye/HFC-1234yf | 35/25/5/35 | 280 | 2003 | 129 | 1762 | 4.87 |
| HFC-32/HFC-134a/HFC-1225ye/HFC-1234yf/CF$_3$I | 35/20/10/30/5 | 286 | 2032 | 130 | 1790 | 4.85 |
| HFC-32/HFC-134a/HFC-1234yf/CF$_3$I | 35/20/35/10 | 296 | 2063 | 130 | 1834 | 4.85 |
| HFC-32/HFC-134a/HFC-1234yf/CF$_3$I | 35/10/45/10 | 306 | 2095 | 128 | 1868 | 4.84 |
| HFC-32/HFC-134a/HFC-1234yf/CF$_3$I | 25/15/50/10 | 267 | 1878 | 121 | 1660 | 4.91 |
| HFC-32/HFC-134a/HFC-1234yf/CF$_3$I | 30/30/30/10 | 272 | 1939 | 128 | 1712 | 4.88 |
| HFC-32/HFC-134a/HFC-1234yf/CF$_3$I | 30/20/40/10 | 280 | 1968 | 126 | 1744 | 4.88 |
| HFC-32/HFC-134a/HFC-1234yf/CF$_3$I | 30/20/30/20 | 289 | 2003 | 129 | 1787 | 4.87 |

TABLE 11-continued

| wt % | Evap Press (kPa) | Cond P Press (kPa) | Compr Disch T (C.) | CAP (kJ/m3) | EER |
|---|---|---|---|---|---|
| HFC-32/HFC-134a/HFC-1234yf/CF$_3$I 30/20/20/30 | 297 | 2035 | 132 | 1831 | 4.87 |
| HFC-32/HFC-134a/HFC-1234yf/CF$_3$I 25/20/25/30 | 279 | 1928 | 127 | 1729 | 4.89 |
| HFC-32/HFC-134a/HFC-1234yf/CF$_3$I 40/20/20/20 | 320 | 2188 | 138 | 1967 | 4.81 |
| HFC-32/HFC-134a/HFC-1234yf/CF$_3$I 50/10/20/20 | 362 | 2396 | 145 | 2183 | 4.74 |
| HFC-32/HFC-134a/HFC-1234yf/CF$_3$I 50/10/30/10 | 351 | 2354 | 141 | 2127 | 4.76 |
| HFC-32/NH$_3$/HFC-1225ye 15/15/70 | 266 | 2004 | 152 | 1831 | 5.01 |
| HFC-32/NH$_3$/HFC-1225ye 20/20/60 | 289 | 2141 | 165 | 2008 | 5.00 |
| HFC-32/NH$_3$/HFC-1225ye 20/10/70 | 265 | 2002 | 144 | 1789 | 4.96 |
| HFC-32/NH$_3$/HFC-1225ye 25/25/50 | 302 | 2229 | 178 | 2118 | 5.00 |
| HFC-32/NH$_3$/HFC-1225ye 25/15/60 | 295 | 2171 | 158 | 2001 | 4.95 |
| HFC-32/NH$_3$/HFC-1225ye 30/10/60 | 297 | 2182 | 151 | 1968 | 4.89 |
| HFC-32/NH$_3$/HFC-1225ye/CF$_3$I 25/25/40/10 | 305 | 2246 | 182 | 2138 | 5.00 |
| HFC-32/NH$_3$/HFC-1225ye/CF$_3$I 20/20/50/10 | 296 | 2162 | 168 | 2048 | 5.00 |
| HFC-32/NH$_3$/HFC-1225ye/CF$_3$I 15/15/55/15 | 278 | 2041 | 156 | 1899 | 5.00 |
| HFC-32/NH$_3$/HFC-1225ye/CF$_3$I 20/10/55/15 | 280 | 2052 | 148 | 1868 | 4.95 |
| HFC-32/NH$_3$/HFC-1234yf/CF$_3$I 20/10/50/20 | 311 | 2125 | 143 | 2005 | 4.99 |
| HFC-32/NH$_3$/HFC-1234yf/CF$_3$I 10/10/20/60 | 280 | 1928 | 152 | 1857 | 5.05 |
| HFC-1225ye/R717 95/5 | 159 | 1317 | 113 | 1121 | 5.16 |
| HFC-1225ye/R717 90/10 | 194 | 1550 | 128 | 1368 | 5.14 |
| HFC-1225ye/R717 85/15 | 217 | 1698 | 141 | 1535 | 5.11 |
| HFC-1225ye/R717 80/20 | 243 | 1725 | 146 | 1750 | 5.43 |
| HFC-125/HFC-1225ye/R717 5/85/10 | 205 | 1613 | 127 | 1423 | 5.11 |
| HFC-125/HFC-1225ye/R717 10/80/10 | 212 | 1651 | 127 | 1455 | 5.09 |
| HFC-125/HFC-1225ye/R717 15/75/10 | 220 | 1687 | 127 | 1486 | 5.04 |
| HFC-125/HFC-1225ye/R717 20/70/10 | 227 | 1723 | 126 | 1516 | 5.02 |
| HFC-125/HFC-1225ye/R717 25/65/10 | 235 | 1757 | 126 | 1547 | 5.00 |
| HFC-125/HFC-1225ye/R717 20/65/15 | 248 | 1845 | 138 | 1674 | 5.04 |
| HFC-125/HFC-1225ye/R717 20/75/5 | 195 | 1525 | 112 | 1291 | 5.02 |
| R32/HFC-125/HFC-1225ye/R717 25/10/60/5 | 273 | 2029 | 135 | 1766 | 4.88 |
| R32/HFC-125/HFC-1225ye/R717 20/20/55/5 | 273 | 2011 | 130 | 1740 | 4.85 |
| R32/HFC-125/HFC-1225ye/R717 10/20/65/5 | 235 | 1787 | 121 | 1526 | 4.92 |
| R32/HFC-125/HFC-1225ye/R717 25/10/55/10 | 295 | 2148 | 146 | 1936 | 4.90 |
| R32/HFC-125/HFC-1225ye/R717 20/20/50/10 | 295 | 2125 | 142 | 1911 | 4.90 |
| R32/HFC-125/HFC-1225ye/R717 10/20/60/10 | 262 | 1938 | 134 | 1722 | 4.95 |
| R32/HFC-125/HFC-1225ye/R717 10/10/65/15 | 265 | 1974 | 147 | 1804 | 5.02 |
| R32/HFC-125/HFC-1225ye/R717 10/20/55/15 | 278 | 2028 | 146 | 1859 | 5.00 |
| R32/HFC-125/HFC-1225ye/R717 5/25/55/15 | 270 | 1967 | 141 | 1798 | 5.00 |
| R32/HFC-125/HFC-1234yf/R717 10/20/60/10 | 295 | 2025 | 129 | 1865 | 5.00 |
| R32/HFC-125/HFC-1234yf/R717 5/25/60/10 | 285 | 1958 | 125 | 1797 | 5.00 |

Several compositions have energy efficiency (EER) comparable top R404A and R422A. Discharge temperatures are also lower than R404A and R507A. Capacity for the compositions listed in Table 11 is also similar to R404A, R507A, and R422A indicating these compositions could be replacement refrigerants for R404A, R507A, or R422A in refrigeration and air-conditioning. Those compositions containing hydrocarbon may also improve oil solubility with conventional mineral oil and alkyl benzene lubricants.

Example 4

Refrigeration Performance Data

Table 12 shows the performance of various refrigerant compositions of the present invention as compared to HCFC-22, R410A, R407C, and R417A. In Table 12, Evap Pres is evaporator pressure, Cond Pres is condenser pressure, Comp Disch T is compressor discharge temperature, EER is energy efficiency, and CAP is capacity. The data are based on the following conditions.

Evaporator temperature 4.4° C.
Condenser temperature 54.4° C.
Subcool amount 5.5° C.
Return gas temperature 15.6° C.
Compressor efficiency is 100%
Note that the superheat is included in cooling capacity.

TABLE 12

|  | wt % | Evap Press (kPa)) | Cond Press (kPa) | Compr Disch T (C.) | CAP (kJ/m$^3$) | EER |
| --- | --- | --- | --- | --- | --- | --- |
| Existing Refrigerant Product | | | | | | |
| R22 |  | 573 | 2149 | 88.6 | 3494 | 14.73 |
| R410A |  | 911 | 3343 | 89.1 | 4787 | 13.07 |
| R407C |  | 567 | 2309 | 80.0 | 3397 | 14.06 |
| R417A |  | 494 | 1979 | 67.8 | 2768 | 13.78 |
| Candidate Replacement | | | | | | |
| HFC-32/HFC-125/HFC-1225ye | 30/40/30 | 732 | 2823 | 81.1 | 3937 | 13.20 |
| HFC-32/HFC-125/HFC-1225ye | 23/25/52 | 598 | 2429 | 78.0 | 3409 | 13.54 |
| HFC-32/HFC-125/trans-HFC-1234ze | 30/50/20 | 749 | 2865 | 81.7 | 3975 | 13.10 |
| HFC-32/HFC-125/trans-HFC-1234ze | 23/25/52 | 546 | 2252 | 78.9 | 3222 | 13.80 |
| HFC-32/HFC-125/HFC-1234yf | 40/50/10 | 868 | 3185 | 84.4 | 4496 | 13.06 |
| HFC-32/HFC-125/HFC-1234yf | 23/25/52 | 656 | 2517 | 76.7 | 3587 | 13.62 |
| HFC-32/HFC-125/HFC-1234yf | 15/45/40 | 669 | 2537 | 73.3 | 3494 | 13.28 |
| HFC-32/HFC-125/HFC-1234yf | 10/60/30 | 689 | 2586 | 71.3 | 3447 | 12.96 |
| HFC-125/HFC-1225ye/n-butane | 65/32/3 | 563 | 2213 | 66.1 | 2701 | 12.87 |
| HFC-125/trans-HFC-1234ze/n-butane | 66/32/2 | 532 | 2130 | 67.2 | 2794 | 13.08 |
| HFC-125/HFC-1234yf/n-butane | 67/32/1 | 623 | 2344 | 66.1 | 3043 | 12.85 |
| HFC-125/HFC-1225ye/isobutane | 65/32/3 | 574 | 2244 | 66.2 | 2874 | 12.79 |
| HFC-125/trans-HFC-1234ze/isobutane | 66/32/2 | 538 | 2146 | 67.4 | 2808 | 13.04 |
| HFC-125/HFC-1234yf/isobutane | 67/32/1 | 626 | 2352 | 66.3 | 3051 | 12.83 |

Compositions have energy efficiency (EER) comparable to R22, R407c, R417A, and R410A while maintaining low discharge temperatures. Capacity for the compositions listed in Table 12 is also similar to R22, R407c and R417A indicating these compositions could be replacement refrigerants for R22, R407c or R417A in refrigeration and air-conditioning.

Those compositions containing hydrocarbon may also improve oil solubility with conventional mineral oil and alkyl benzene lubricant.

Example 5

Refrigeration Performance Data

Table 13 shows the performance of various refrigerant compositions of the present invention as compared to HCFC-22 and R410A. In Table 13, Evap Pres is evaporator pressure, Cond Pres is condenser pressure, Comp Disch T is compressor discharge temperature, EER is energy efficiency, and CAP is capacity. The data are based on the following conditions.

Evaporator temperature 4° C.
Condenser temperature 43° C.
Subcool amount 6° C.
Return gas temperature 18° C.
Compressor efficiency is 70%
Note that the superheat is included in cooling capacity.

TABLE 13

| | Evap Press (kPa) | Cond Press (kPa) | Compr Disch Temp (C.) | CAP (kJ/m3) | EER |
|---|---|---|---|---|---|
| Existing refrigerant product | | | | | |
| R22 | 565 | 1648 | 90.9 | 3808 | 9.97 |
| R410A | 900 | 2571 | 88.1 | 5488 | 9.27 |
| Candidate replacement product (Composition wt %) | | | | | |
| HFC-32/HFC-1225ye (40/60) | 630 | 1948 | 86.7 | 4242 | 9.56 |
| HFC-32/HFC-1225ye (45/55) | 666 | 2041 | 88.9 | 4445 | 9.49 |
| HFC-32/HFC-1225ye (50/50) | 701 | 2127 | 91.0 | 4640 | 9.45 |
| HFC-32/HFC-1225ye/CF$_3$I (40/30/20) | 711 | 2104 | 90.6 | 4605 | 9.56 |
| HFC-32/HFC-1225ye/CF$_3$I (45/30/25) | 737 | 2176 | 92.2 | 4765 | 9.45 |
| HFC-32/HFC-1225ye/CF$_3$I (45/35/20) | 724 | 2151 | 91.4 | 4702 | 9.45 |
| HFC-32/HFC-134a/HFC-1225ye (40/30/30) | 607 | 1880 | 87.8 | 4171 | 9.69 |
| HFC-32/HFC-134a/HFC-1225ye (45/30/25) | 637 | 1958 | 89.9 | 4347 | 9.66 |
| HFC-32/HFC-134a/HFC-1225ye (45/35/20) | 631 | 1944 | 90.2 | 4326 | 9.69 |
| HFC-32/HFC-134a/HFC-1234yf/CF$_3$I (30/20/5/45) | 611 | 1845 | 89.6 | 4107 | 9.66 |
| HFC-32/HFC-134a/HFC-1234yf/CF$_3$I (25/20/10/45) | 575 | 1745 | 86.5 | 3891 | 9.76 |
| HFC-32/HFC-134a/HFC-1234yf/CF$_3$I (35/10/5/40) | 646 | 1939 | 91.2 | 4308 | 9.62 |
| HFC-32/HFC-134a/HFC-1225ye/HFC-1234yf (34/12/47/7) | 587 | 1822 | 84 | 4001 | 9.69 |
| HFC-32/HFC-134a/HFC-1225ye/HFC-1234yf (30/8/52/10) | 561 | 1752 | 81.9 | 3841 | 9.73 |
| HFC-32/HFC-134a/HFC-1225ye/HFC-1234yf (35/6/52/7) | 597 | 1852 | 84.3 | 4051 | 9.66 |
| HFC-32/HFC-1225ye (40/60) | 630 | 1948 | 86.7 | 4242 | 9.56 |
| HFC-32/HFC-1225ye (45/55) | 666 | 2041 | 88.9 | 4445 | 9.49 |
| HFC-32/HFC-1225ye (50/50) | 701 | 2127 | 91.0 | 4640 | 9.45 |
| HFC-32/HFC-1225ye (55/45) | 734 | 2206 | 93.0 | 4825 | 9.45 |
| HFC-32/HFC-1225ye (60/40) | 764 | 2280 | 94.9 | 5001 | 9.42 |
| HFC-32/HFC-1225ye/CF$_3$I (65/30/5) | 808 | 2376 | 97.5 | 5237 | 9.42 |
| HFC-32/HFC-1225ye/CF$_3$I (65/17.5/17.5) | 845 | 2445 | 99.4 | 5408 | 9.39 |
| HFC-32/HFC-1225ye/CF$_3$I (65/5/30) | 879 | 2508 | 101.7 | 5565 | 9.49 |
| HFC-32/HFC-1225ye/CF3I(60/30/10) | 795 | 2337 | 96.3 | 5140 | 9.42 |
| HFC-32/HFC-1225ye/CF$_3$I (60/20/20) | 857 | 2319 | 92.5 | 5565 | 10.27 |
| HFC-32/HFC-1225ye/CF$_3$I (60/10/30) | 852 | 2442 | 99.5 | 5404 | 9.39 |
| HFC-32/HFC-1225ye/CF$_3$I (55/40/5) | 749 | 2235 | 93.6 | 4894 | 9.42 |
| HFC-32/HFC-1225ye/CF$_3$I (55/25/20) | 793 | 2319 | 95.7 | 5098 | 9.42 |
| HFC-32/HFC-1225ye/CF$_3$I (55/20/25) | 808 | 2345 | 96.5 | 5163 | 9.42 |
| HFC-32/HFC-1225ye/CF$_3$I (55/5/40) | 844 | 2413 | 99.4 | 5332 | 9.39 |
| HFC-32/HFC-1225ye/CF$_3$I (50/45/5) | 819 | 2350 | 98.3 | 5176 | 9.39 |
| HFC-32/HFC-1225ye/CF$_3$I (50/25/25) | 774 | 2264 | 94.4 | 4970 | 9.42 |
| HFC-32/HFC-1225ye/CF$_3$I (50/5/45) | 716 | 2156 | 91.6 | 4706 | 9.45 |
| HFC-32/HFC-1225ye/CF$_3$I (45/50/5) | 680 | 2069 | 89.5 | 4509 | 9.49 |
| HFC-32/HFC-1225ye/CF$_3$I (45/30/25) | 737 | 2176 | 92.2 | 4765 | 9.45 |
| HFC-32/HFC-1225ye/CF$_3$I (45/35/20) | 724 | 2151 | 91.4 | 4702 | 9.45 |
| HFC-32/HFC-1225ye/CF$_3$I (45/25/30) | 750 | 2200 | 93.0 | 4825 | 9.45 |
| HFC-32/HFC-1225ye/CF$_3$I (45/5/50) | 789 | 2276 | 97.3 | 4996 | 9.39 |
| HFC-32/HFC-1225ye/CF$_3$I (40/50/10) | 657 | 2003 | 87.9 | 4365 | 9.52 |
| HFC-32/HFC-1225ye/CF$_3$I (40/30/30) | 711 | 2104 | 90.6 | 4605 | 9.56 |
| HFC-32/HFC-1225ye/CF$_3$I (40/10/50) | 749 | 2178 | 94.7 | 4775 | 9.42 |
| HFC-32/HFC-1234yf/CF$_3$I (60/30/10) | 823 | 2372 | 93.9 | 5228 | 9.45 |
| HFC-32/HFC-1234yf/CF$_3$I (60/20/20) | 844 | 2415 | 96.0 | 5335 | 9.45 |
| HFC-32/HFC-1234yf/CF$_3$I (60/10/30) | 862 | 2459 | 98.5 | 5433 | 9.49 |
| HFC-32/HFC-1234yf/CF$_3$I (55/35/10) | 798 | 2305 | 91.7 | 5069 | 9.49 |
| HFC-32/HFC-1234yf/CF$_3$I (55/5/40) | 850 | 2419 | 98.9 | 5347 | 9.39 |
| HFC-32/HFC-1234yf/CF$_3$I (50/40/10) | 769 | 2232 | 89.4 | 4899 | 9.52 |
| HFC-32/HFC-1234yf/CF$_3$I (50/30/20) | 790 | 2275 | 91.3 | 5002 | 9.49 |
| HFC-32/HFC-1234yf/CF$_3$I (50/20/30) | 808 | 2313 | 93.4 | 5095 | 9.45 |
| HFC-32/HFC-1234yf/CF$_3$I (50/10/40) | 821 | 2345 | 96.2 | 5168 | 9.42 |
| HFC-32/HFC-1234yf/CF$_3$I (50/5/45) | 825 | 2357 | 97.8 | 5192 | 9.39 |
| HFC-32/HFC-1234yf/CF$_3$I (45/10/45) | 792 | 2274 | 95.0 | 4999 | 9.42 |
| HFC-32/HFC-1234yf/CF$_3$I (45/5/50) | 794 | 2283 | 96.8 | 5011 | 9.39 |
| HFC-32/HFC-1234yf/CF$_3$I (40/50/10) | 705 | 2067 | 85.0 | 4523 | 9.59 |
| HFC-32/HFC-1234yf/CF$_3$I (40/40/20) | 725 | 2108 | 86.5 | 4622 | 9.56 |
| HFC-32/HFC-1234yf/CF$_3$I (40/10/50) | 759 | 2192 | 93.8 | 4806 | 9.42 |
| HFC-32/HFC-1234yf/CF$_3$I (40/5/55) | 759 | 2197 | 95.7 | 4808 | 9.39 |
| HFC-32/HFC-134a/HFC-1225ye (60/30/10) | 713 | 2156 | 96.2 | 4807 | 9.56 |

TABLE 13-continued

| | Evap Press (kPa) | Cond Press (kPa) | Compr Disch Temp (C.) | CAP (kJ/m3) | EER |
|---|---|---|---|---|---|
| HFC-32/HFC-134a/HFC-1225ye (60/20/20) | 730 | 2196 | 95.8 | 4875 | 9.52 |
| HFC-32/HFC-134a/HFC-1225ye (60/10/30) | 747 | 2237 | 95.3 | 4941 | 9.49 |
| HFC-32/HFC-134a/HFC-1225ye (55/5/40) | 727 | 2187 | 93.1 | 4802 | 9.49 |
| HFC-32/HFC-134a/HFC-1225ye (55/20/25) | 704 | 2131 | 93.7 | 4723 | 9.56 |
| HFC-32/HFC-134a/HFC-1225ye (55/40/5) | 674 | 2060 | 94.7 | 4605 | 9.62 |
| HFC-32/HFC-134a/HFC-1225ye (50/5/45) | 695 | 2110 | 91.1 | 4623 | 9.49 |
| HFC-32/HFC-134a/HFC-1225ye (50/25/25) | 671 | 2045 | 91.9 | 4536 | 9.62 |
| HFC-32/HFC-134a/HFC-1225ye (50/45/5) | 645 | 1982 | 92.8 | 4433 | 9.69 |
| HFC-32/HFC-134a/HFC-1225ye (45/5/50) | 662 | 2027 | 89.0 | 4433 | 9.52 |
| HFC-32/HFC-134a/HFC-1225ye (45/25/30) | 642 | 1971 | 89.7 | 4367 | 9.66 |
| HFC-32/HFC-134a/HFC-1225ye (45/30/25) | 637 | 1958 | 89.9 | 4347 | 9.66 |
| HFC-32/HFC-134a/HFC-1225ye (45/35/20) | 631 | 1944 | 90.2 | 4326 | 9.69 |
| HFC-32/HFC-134a/HFC-1225ye (45/50/5) | 615 | 1903 | 90.9 | 4259 | 9.73 |
| HFC-32/HFC-134a/HFC-1225ye (40/10/50) | 623 | 1926 | 87.0 | 4224 | 9.62 |
| HFC-32/HFC-134a/HFC-1225ye (40/30/30) | 607 | 1880 | 87.8 | 4171 | 9.69 |
| HFC-32/HFC-134a/HFC-1225ye (40/50/10) | 589 | 1833 | 88.7 | 4101 | 9.76 |
| HFC-32/HFC-125/HFC-1225ye (60/5/35) | 784 | 2323 | 94.6 | 5087 | 9.42 |
| HFC-32/HFC-125/HFC-1225ye (60/10/30) | 803 | 2365 | 94.2 | 5173 | 9.42 |
| HFC-32/HFC-125/HFC-1225ye (60/15/25) | 822 | 2407 | 93.9 | 5256 | 9.39 |
| HFC-32/HFC-125/HFC-1225ye (50/10/40) | 742 | 2220 | 90.3 | 4820 | 9.42 |
| HFC-32/HFC-125/HFC-1225ye (50/5/45) | 721 | 2173 | 90.7 | 4730 | 9.45 |
| HFC-32/HFC-125/HFC-1225ye (50/15/35) | 762 | 2266 | 90.0 | 4911 | 9.42 |
| HFC-32/HFC-125/HFC-1225ye (40/15/45) | 692 | 2097 | 85.9 | 4518 | 9.45 |
| HFC-32/HFC-125/HFC-1225ye (40/10/50) | 671 | 2047 | 86.2 | 4425 | 9.49 |
| HFC-32/HFC-125/HFC-1225ye (35/15/50) | 654 | 2001 | 83.8 | 4304 | 9.49 |
| HFC-32/HFC-134a/HFC-1234yf/CF$_3$I (30/20/5/45) | 611 | 1845 | 89.6 | 4107 | 9.66 |
| HFC-32/HFC-134a/HFC-1234yf/CF$_3$I (25/20/10/45) | 575 | 1745 | 86.5 | 3891 | 9.76 |
| HFC-32/HFC-134a/HFC-1234yf/CF$_3$I (35/10/5/40) | 646 | 1939 | 91.2 | 4308 | 9.62 |
| HFC-32/HFC-134a/HFC-1225ye/HFC-1234yf (34/12/47/7) | 587 | 1822 | 84.0 | 4001 | 9.69 |
| HFC-32/HFC-134a/HFC-1225ye/HFC-1234yf (30/8/52/10) | 561 | 1752 | 81.9 | 3841 | 9.73 |
| HFC-32/HFC-134a/HFC-1225ye/HFC-1234yf (35/6/52/7) | 597 | 1852 | 84.3 | 4051 | 9.66 |
| HFC-32/HFC-1225ye/HFC-1234yf/CF$_3$I (65/5/10/20) | 862 | 2470 | 98.9 | 5470 | 9.42 |
| HFC-32/HFC-1225ye/HFC-1234yf/CF$_3$I (65/20/10/5) | 818 | 2389 | 96.7 | 5270 | 9.42 |
| HFC-32/HFC-1225ye/HFC-1234yf/CF$_3$I (65/10/5/20) | 857 | 2465 | 99.3 | 5456 | 9.39 |
| HFC-32/HFC-1225ye/HFC-1234yf/CF$_3$I (65/10/20/5) | 828 | 2401 | 95.9 | 5298 | 9.45 |
| HFC-32/HFC-1225ye/HFC-1234yf/CF$_3$I (60/30/5/5) | 785 | 2316 | 95.2 | 5090 | 9.42 |
| HFC-32/HFC-1225ye/HFC-1234yf/CF$_3$I (60/5/30/5) | 809 | 2345 | 93.3 | 5163 | 9.45 |
| HFC-32/HFC-1225ye/HFC-1234yf/CF$_3$I (60/5/5/30) | 860 | 2448 | 99.0 | 5419 | 9.39 |
| HFC-32/HFC-1225ye/HFC-1234yf/CF$_3$I (60/10/10/20) | 835 | 2405 | 96.8 | 5309 | 9.42 |

TABLE 13-continued

|  | Evap Press (kPa) | Cond Press (kPa) | Compr Disch Temp (C.) | CAP (kJ/m3) | EER |
|---|---|---|---|---|---|
| HFC-32/HFC-1225ye/HFC-1234yf/CF$_3$I (55/10/10/25) | 818 | 2358 | 95.6 | 5197 | 9.42 |
| HFC-32/HFC-1225ye/HFC-1234yf/CF$_3$I (55/5/5/35) | 839 | 2399 | 97.8 | 5298 | 9.42 |
| HFC-32/HFC-1225ye/HFC-1234yf/CF$_3$I (55/20/20/5) | 770 | 2263 | 92.1 | 4966 | 9.45 |
| HFC-32/HFC-1225ye/HFC-1234yf/CF$_3$I (55/5/35/5) | 783 | 2278 | 91.1 | 5005 | 9.49 |
| HFC-32/HFC-1225ye/HFC-1234yf/CF$_3$I (55/35/5/5) | 755 | 2243 | 93.2 | 4912 | 9.45 |
| HFC-32/HFC-1225ye/HFC-1234yf/CF$_3$I (50/5/5/40) | 816 | 2339 | 96.7 | 5153 | 9.42 |
| HFC-32/HFC-1225ye/HFC-1234yf/CF$_3$I (50/10/10/20) | 798 | 2303 | 94.3 | 5067 | 9.45 |
| HFC-32/HFC-1225ye/HFC-1234yf/CF$_3$I (50/20/20/10) | 752 | 2213 | 90.7 | 4848 | 9.49 |
| HFC-32/HFC-1225ye/HFC-1234yf/CF$_3$I (40/10/10/40) | 744 | 2161 | 91.6 | 4743 | 9.45 |
| HFC-32/HFC-1225ye/HFC-1234yf/CF$_3$I (40/15/15/30) | 728 | 2127 | 89.4 | 4663 | 9.52 |
| HFC-32/HFC-1225ye/HFC-1234yf/CF$_3$I (40/20/20/20) | 707 | 2087 | 87.7 | 4566 | 9.52 |
| HFC-32/HFC-125/HFC-1225ye/CF$_3$I (60/10/10/20) | 865 | 2481 | 97.0 | 5453 | 9.35 |
| HFC-32/HFC-125/HFC-1225ye/CF$_3$I (60/5/5/30) | 873 | 2488 | 99.1 | 5494 | 9.39 |
| HFC-32/HFC-125/HFC-1225ye/CF$_3$I (60/5/30/5) | 799 | 2352 | 95.2 | 5159 | 9.42 |
| HFC-32/HFC-125/HFC-1225ye/CF$_3$I (60/5/15/20) | 845 | 2437 | 97.4 | 5367 | 9.39 |
| HFC-32/HFC-125/HFC-1225ye/CF$_3$I (50/10/5/35) | 847 | 2414 | 95.2 | 5288 | 9.39 |
| HFC-32/HFC-125/HFC-1225ye/CF$_3$I (50/10/35/5) | 758 | 2250 | 90.9 | 4891 | 9.42 |
| HFC-32/HFC-125/HFC-1225ye/CF$_3$I (50/5/5/40) | 834 | 2384 | 96.7 | 5238 | 9.39 |
| HFC-32/HFC-125/HFC-1225ye/CF$_3$I (50/5/20/25) | 797 | 2315 | 93.9 | 5070 | 9.42 |
| HFC-32/HFC-125/HFC-1225ye/CF$_3$I (50/15/5/30) | 857 | 2440 | 93.9 | 5327 | 9.39 |
| HFC-32/HFC-125/HFC-1225ye/CF$_3$I (50/15/30/5) | 779 | 2297 | 90.5 | 4983 | 9.39 |
| HFC-32/HFC-125/HFC-1234yf/CF$_3$I (60/10/10/20) | 875 | 2494 | 96.1 | 5481 | 9.39 |
| HFC-32/HFC-125/HFC-1234yf/CF$_3$I (60/5/5/30) | 879 | 2494 | 98.6 | 5508 | 9.39 |
| HFC-32/HFC-125/HFC-1234yf/CF$_3$I (60/5/15/20) | 860 | 2455 | 96.0 | 5410 | 9.42 |
| HFC-32/HFC-125/HFC-1234yf/CF$_3$I (50/10/5/35) | 852 | 2421 | 94.7 | 5304 | 9.39 |
| HFC-32/HFC-125/HFC-1234yf/CF$_3$I (50/5/5/40) | 840 | 2391 | 96.2 | 5254 | 9.39 |
| HFC-32/HFC-125/HFC-1234yf/CF$_3$I (50/5/20/25) | 818 | 2340 | 92.3 | 5134 | 9.45 |
| HFC-32/HFC-125/HFC-1234yf/CF$_3$I (50/15/5/30) | 862 | 2447 | 93.4 | 5343 | 9.39 |
| HFC-32/HFC-125/HFC-1225/HFC-1234yf/CF$_3$I (50/5/20/20/5) | 759 | 2232 | 89.8 | 4873 | 9.49 |
| HFC-32/HFC-125/HFC-1225/HFC-1234yf/CF$_3$I (50/5/5/5/35) | 829 | 2370 | 95.2 | 5206 | 9.42 |
| HFC-32/HFC-125/HFC-1225/HFC-1234yf/CF$_3$I (50/10/20/15/5) | 775 | 2272 | 89.8 | 4948 | 9.45 |
| HFC-32/HFC-125/HFC-1225/HFC-1234yf/CF$_3$I (50/10/5/5/30) | 839 | 2397 | 93.8 | 5248 | 9.39 |
| HFC1225ye/R717 | 445 | 1433 | 82.2 | 3306 | 10.17 |
| HFC1225ye/R717 | 493 | 1569 | 89.0 | 3666 | 10.17 |
| HFC1225ye/R717 | 525 | 1660 | 95.0 | 3921 | 10.17 |
| HFC1225ye/R717 | 370 | 1217 | 74.1 | 2767 | 10.20 |
| HFC-32/HFC-1225ye/R717 | 594 | 1855 | 95.0 | 4312 | 10.00 |
| HFC-32/HFC-1225ye/R717 | 594 | 1855 | 91.2 | 4232 | 9.90 |
| HFC-32/HFC-1225ye/R717 | 542 | 1718 | 84.7 | 3846 | 9.86 |
| HFC-32/HFC-1225ye/R717 (10/85/5) | 462 | 1494 | 79.9 | 3361 | 10.00 |
| HFC-125/HFC-1225ye/R717 (5/80/15) | 513 | 1622 | 88.7 | 3778 | 10.14 |
| HFC-125/HFC-1225ye/R717 (10/75/15) | 526 | 1652 | 88.4 | 3834 | 10.10 |
| HFC-125/HFC-1225ye/R717 (12.5/72.5/15) | 533 | 1666 | 88.3 | 3861 | 10.07 |

TABLE 13-continued

| | Evap Press (kPa) | Cond Press (kPa) | Compr Disch Temp (C.) | CAP (kJ/m3) | EER |
|---|---|---|---|---|---|
| HFC-125/HFC-1225ye/R717 (15/70/15) | 539 | 1680 | 88.1 | 3888 | 10.07 |
| HFC-125/HFC-1225ye/R717 (20/75/5) | 444 | 1411 | 77.8 | 3142 | 10.00 |
| HFC-125/HFC-1225ye/R717 (10/85/5) | 410 | 1327 | 74.0 | 2984 | 10.10 |
| HFC-32/R125/HFC-1225ye/R717 (5/15/65/15) | 573 | 1776 | 90.1 | 4104 | 10.03 |
| HFC-32/R125/HFC-1225ye/R717 (5/17.5/60/17.5) | 591 | 1822 | 92.9 | 4242 | 10.03 |
| HFC-32/R125/HFC-1225ye/R717 (10/15/60/15) | 604 | 1861 | 92.1 | 4299 | 9.97 |
| HFC-32/R125/HFC-1225ye/R717 (20/10/60/10) | 625 | 1926 | 90.5 | 4370 | 9.83 |
| HFC-32/R125/HFC-1225ye/R717 (25/10/60/5) | 616 | 1905 | 86.3 | 4224 | 9.73 |
| HFC-32/R125/HFC-1225ye/R717 (20/10/65/5) | 579 | 1806 | 84.1 | 4009 | 9.76 |
| HFC-32/R125/HFC-1225ye/R717 (20/15/60/5) | 596 | 1845 | 83.9 | 4079 | 9.73 |

Compositions have energy efficiency (EER) comparable to R22 and R410A while maintaining reasonable discharge temperatures. Capacity for certain compositions listed in Table 13 is also similar to R22 indicating these compositions could be replacement refrigerants for R22 in refrigeration and air-conditioning. Additionally, there are compositions listed in Table 13 with capacity approaching or equivalent to that for R410A indicating that those compositions could be replacement refrigerants for R410A in refrigeration and air-conditioning.

Example 6

Flammability

Flammable compounds may be identified by testing under ASTM (American Society of Testing and Materials) E681-01, with an electronic ignition source. Such tests of flammability were conducted on HFC-1234yf, HFC-1225ye and mixtures of the present disclosure at 101 kPa (14.7 psia), 100° C. (212° F.), and 50 percent relative humidity, at various concentrations in air in order to determine the lower flammability limit (LFL) and upper flammability limit (UFL). The results are given in Table 13.

TABLE 14

| Composition | LFL (vol % in air) | UFL (vol % in air) |
|---|---|---|
| HFC-1225ye (100 wt %) | Non-flammable | Non-flammable |
| HFC-1234yf (100 wt %) | 5.0 | 14.5 |
| HFC-1234yf/1225ye (50/50 wt %) | 8.5 | 12.0 |
| HFC-1234yf/1225ye (40/60 wt %) | Non-flammable | Non-flammable |
| HFC-1225ye/HFC-32 (60/40 wt %) | 13.0 | 17.0 |
| HFC-1225ye/HFC-32 (65/35 wt %) | Non-flammable | Non-flammable |

The results indicate that while HFC-1234yf is flammable, addition of HFC-1225ye reduces the flammability. Therefore, compositions comprising about 1 weight percent to about 49 weight percent HFC-1234yf and about 99 weight percent to about 51 weight percent HFC-1225ye are preferred. Results also show HFC-1225ye reduces the flammability of HFC-32 and results in a non-flammable composition at 65/35 wt % HFC-1225ye/HFC-32.

What is claimed is:

1. A composition consisting of:
a refrigerant component
wherein said composition is an azeotropic or near-azeotropic composition consisting of about 91.0 weight percent HFC-1234yf and about 9.0 weight percent HFC-152a at a pressure of 17.9 psi (123 kPa) and a temperature of −25° C.

2. A method of producing cooling, said method comprising evaporating said composition of claim 1 in the vicinity of a body to be cooled and thereafter condensing said composition.

3. A method of producing heat, said method comprising condensing said composition of claim 1 in the vicinity of a body to be heated and thereafter evaporating said composition.

4. A method for replacing a high GWP refrigerant in a refrigeration, air-conditioning, or heat pump apparatus, wherein said high GWP refrigerant is selected from the group consisting of R134a, R22, R123, R11, R245fa, R114, R236fa, R124, R12, R410A, R407C, R417A, R422A, R507A, R502, and R404A, said method comprising providing the composition of claim 1 to said refrigeration, air-conditioning, or heat pump apparatus that uses, used or is designed to use said high GWP refrigerant.

5. A method of using the composition of claim 1 as a heat transfer fluid composition, said process comprisig comprises transporting said composition from a heat source to a heat sink.

6. A refrigeration, air-conditioning, or heat pump apparatus containing a composition as claimed in claim 1.

7. The apparatus of claim 6 comprising a stationary air-conditioning system, a stationary heat pump system or a stationary refrigeration system.

8. A method of forming a foam comprising:
a) adding to a foamable composition the composition of claim 1; and
b) reacting the foamable composition under conditions effective to form a foam.

9. A process for producing aerosol products comprising the step of adding the composition of claim 1 to active ingredients in an aerosol container, wherein said composition functions as a propellant.

* * * * *